US012804624B2

(12) United States Patent
Huang et al.

(10) Patent No.: US 12,804,624 B2
(45) Date of Patent: *Nov. 17, 2026

(54) METHOD AND APPARATUS OF INDICATING AGGREGATION NUMBER IN A WIRELESS COMMUNICATION SYSTEM

(71) Applicant: ASUSTek Computer Inc., Taipei City (TW)

(72) Inventors: Chun-Wei Huang, Taipei City (TW); Li-Chih Tseng, Taipei City (TW)

(73) Assignee: ASUSTek Computer Inc., Taipei City (TW)

( * ) Notice: Subject to any disclaimer, the term of this patent is extended or adjusted under 35 U.S.C. 154(b) by 252 days.

This patent is subject to a terminal disclaimer.

(21) Appl. No.: 18/768,252

(22) Filed: Jul. 10, 2024

(65) Prior Publication Data

US 2024/0389081 A1 Nov. 21, 2024

Related U.S. Application Data

(63) Continuation of application No. 17/545,531, filed on Dec. 8, 2021, now Pat. No. 12,069,627.

(Continued)

(51) Int. Cl.

*H04W 4/00* (2018.01)
*H04L 1/1812* (2023.01)

(Continued)

(52) U.S. Cl.

CPC ....... *H04W 72/0446* (2013.01); *H04L 1/1812* (2013.01); *H04L 5/0007* (2013.01); *H04W 72/20* (2023.01); *H04W 72/23* (2023.01)

(58) Field of Classification Search

CPC ............. H04W 72/0446; H04W 72/20; H04W 72/23

See application file for complete search history.

(56) References Cited

U.S. PATENT DOCUMENTS

| | | | | |
|---|---|---|---|---|
| 2020/0214084 A1* | 7/2020 | Panteleev | ............. | H04W 76/27 |
| 2020/0389897 A1* | 12/2020 | Mondal | ................. | H04L 5/0044 |

(Continued)

FOREIGN PATENT DOCUMENTS

| | | | | |
|---|---|---|---|---|
| CA | 3095194 A1 * | 4/2021 | .......... | H04W 72/569 |
| CA | 3157086 A1 * | 5/2021 | ............... | H04L 1/08 |

OTHER PUBLICATIONS

CATT: "Discussion on Remaining Issues of Multi-TRP/Panel Transmission", 3GPP TSG RAN WG1 Meeting #101, R1-2003627, e-Meeting, May 25-Jun. 5, 2020, 11 pages.

(Continued)

*Primary Examiner* — Elisabeth Benoit Magloire

(74) *Attorney, Agent, or Firm* — Cooper Legal Group LLC

(57) ABSTRACT

In an example, a User Equipment (UE) receives a message associated with Physical Downlink Shared Channel (PDSCH) parameter configuration. The message includes a first parameter indicating a first list of entries associated with time resource allocation for multiple PDSCHs, a second parameter indicating reception of multiple repetitions for a single PDSCH, and a third parameter indicating a second list of entries associated with time resource allocation. Each entry in the second list indicates a single time resource allocation. If the UE receives a Downlink Control Information (DCI) indicative of a first entry in the first list, the UE receives a plurality of PDSCHs based on a plurality of time resource allocations indicated by the first entry. A first repetition number for the plurality of PDSCHs is determined to be one. If the UE receives a DCI indicative of a second entry in the second list, the UE receives one or more PDSCHs with repetition based on a single time resource allocation indicated by the second entry. A second repetition (Continued)

number for the one or more PDSCHs is determined based on the second parameter.

20 Claims, 22 Drawing Sheets

Related U.S. Application Data

(60) Provisional application No. 63/122,610, filed on Dec. 8, 2020.

(51) Int. Cl.

| | |
|---|---|
| ***H04L 5/00*** | (2006.01) |
| ***H04W 72/0446*** | (2023.01) |
| ***H04W 72/20*** | (2023.01) |
| ***H04W 72/23*** | (2023.01) |

(56) References Cited

U.S. PATENT DOCUMENTS

| | | | | |
|---|---|---|---|---|
| 2021/0051652 | A1* | 2/2021 | Khoshnevisan | H04L 1/1893 |
| 2023/0156736 | A1* | 5/2023 | He | H04L 5/0044<br>370/329 |

OTHER PUBLICATIONS

Moderator (OPPO): Summary of Email Thread [101-e-NR-eMIMO-multiTRP-02], 3GPP TSG RAN WG1 #101, R1-2004908, e-Meeting, May 20-Jun. 5, 2020, 12 pages.

Corresponding Korean Patent Application No. 10-2021-0174805, Office Action dated Jun. 27, 2024, English Translation, 15 pages.

* cited by examiner

600

| | k2 | PUSCH-Allocation |
|---|---|---|
| 1 | 1 | {type-A, 1} {type-B, 2} {type-A, 3} {type-A, 104} |
| 2 | 2 | {type-A, 1} |
| 3 | 5 | {PUSCH-Allocation-r16} |
| 4 | 6 | {type, SLIV} {type, SLIV} {type, SLIV} {type, SLIV} |
| 5 | 2 | {type-A, 70} {type-A, 71} {type-A, 72} {type-A, 73} |
| . | | |
| 16 | | |

FIG. 6 aggregation factor (e.g., 2) <= #SLIV (e.g., 4)

HARQ process numbers for PUSCH in slots:

| | | | | | | | | |
|---|---|---|---|---|---|---|---|---|
| Option 1: | 3 | 4 | 5 | 6 | 3 | 4 | 5 | 6 |
| Option 2: | 3 | 4 | 3 | 4 | | | | |
| Option 3: | 3 | 3 | 5 | 5 | | | | |
| Option 4: | 3 | 3 | 4 | 4 | 5 | 5 | 6 | 6 |
| Option 5: | 3 | 3 | 4 | 4 | | | | |
| | Slot n+k2 | | | | | | | |

FIG. 11 aggregation factor (e.g., 2) <= #SLIV (e.g., 4)

SLIVs for PUSCH in slots:

| | | | | | | | | |
|---|---|---|---|---|---|---|---|---|
| Option 1: | 70 | 71 | 72 | 73 | 70 | 71 | 72 | 73 |
| Option 2: | 70 | 71 | 70 | 71 | | | | |
| Option 3: | 70 | 70 | 72 | 72 | | | | |
| Option 4: | 70 | 70 | 71 | 71 | 72 | 72 | 73 | 73 |
| Option 5: | 70 | 70 | 71 | 71 | | | | |

Slot n+k2

FIG. 13

#SLIV: odd number aggregation factor (e.g., 2) <= #SLIV (e.g., 3)

HARQ process numbers for PUSCH in slots:

| | Slot n+k2 | | | | | | | | |
|---|---|---|---|---|---|---|---|---|---|
| Option 1: | 3 | 4 | 5 | 3 | 4 | 5 | | | |
| Option 2: | 3 | 4 | 3 | | | | | | |
| Option 3: | 3 | 3 | 5 | | | | | | |
| Option 4: | 3 | 3 | 4 | 4 | 5 | 5 | | | |
| Option 5: | 3 | 3 | 4 | | | | | | |

FIG. 14

1700

| | | UE configured with *pusch-AggregationFactor* | UE not configured with *pusch-AggregationFactor* |
|---|---|---|---|
| Multi-TB list | Entry indicative of 1 SLIV | K=*pusch-AggregationFactor* | K=1 |
| | Entry indicative of more than 1 SLIVs | K=1 | K=1 |
| Single-TB list | Single SLIV | K=*pusch-AggregationFactor* | K=1 |

FIG. 17

METHOD AND APPARATUS OF INDICATING AGGREGATION NUMBER IN A WIRELESS COMMUNICATION SYSTEM

CROSS-REFERENCE TO RELATED APPLICATIONS

The present Application claims priority to and is a continuation of U.S. application Ser. No. 17/545,531, filed on Dec. 8, 2021, entitled "METHOD AND APPARATUS OF INDICATING AGGREGATION NUMBER IN A WIRELESS COMMUNICATION SYSTEM", the entire disclosure of which is incorporated herein in its entirety by reference. U.S. application Ser. No. 17/545,531 claims the benefit of U.S. Provisional Patent Application Ser. No. 63/122,610 filed on Dec. 8, 2020, the entire disclosure of which is incorporated herein in its entirety by reference.

FIELD

This disclosure generally relates to wireless communication networks, and more particularly, to a method and apparatus of indicating aggregation number in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a network, the network transmits, to a User Equipment (UE), a message associated with Physical Downlink Shared Channel (PDSCH) parameter configuration. The network is not allowed to concurrently include both a first parameter and a second parameter in the message. The message comprises either the first parameter or the second parameter. The first parameter is indicative of a list of entries associated with time resource allocation for multiple PDSCHs. The second parameter indicates an aggregation factor. The network transmits a Downlink Control Information (DCI) indicative of a first entry in the list, wherein the first entry is indicative of one or more time resource allocations. The network performs one or more transmissions on one or more time occasions, wherein a number of time occasions of the one or more time occasions is based on a number of time resource allocations of the one or more time resource allocations.

In an example from the perspective of a UE, the UE receives a configuration, from a network, for configuring a list associated with time resource allocation for multiple PDSCHs. The list comprises a first entry and a second entry. The first entry is indicative of a plurality of time resource allocations without repetition. The second entry indicates a single time resource allocation with repetition. The UE receives a DCI indicative of an entry in the list. The UE performs first reception based on the entry indicated by the DCI. If the entry indicated by the DCI is the first entry, the first reception comprises receiving a plurality of TBs without repetition based on the plurality of time resource allocations. If the entry indicated by the DCI is the second entry, the first reception comprises receiving a single TB with repetition based on the single time resource allocation.

In an example from the perspective of a UE, the UE receives a message associated with PDSCH parameter configuration. The message comprises a first parameter, a second parameter and a third parameter. The first parameter is indicative of a first list of entries associated with time resource allocation for multiple PDSCHs. The second parameter indicates reception of multiple repetitions for a single PDSCH. The third parameter is indicative of a second list of entries associated with time resource allocation. Each entry in the second list is indicative of a single time resource allocation. The first list, the second list and/or the second parameter are used for determining a repetition number. If the UE receives a first DCI indicative of a first entry in the first list, the UE receives a plurality of PDSCHs based on a plurality of time resource allocations indicated by the first entry, wherein a first repetition number for the plurality of PDSCHs is determined to be one. If the UE receives a second DCI indicative of a second entry in the second list, the UE receives one or more PDSCHs with repetition based on a single time resource allocation indicated by the second entry, wherein a second repetition number for the one or more PDSCHs is determined based on the second parameter.

BRIEF DESCRIPTION OF THE DRAWINGS

FIG. 6 illustrates a list for resource allocation for Physical Uplink Shared Channel (PUSCH), according to one exemplary embodiment.

FIG. 11 is a diagram illustrating examples of a pattern, according to one exemplary embodiment.

FIG. 13 is a diagram illustrating examples of a pattern, according to one exemplary embodiment.

FIG. 14 is a diagram illustrating examples of a pattern, according to one exemplary embodiment.

FIG. 17 is a table associated with example scenarios associated with determining a repetition number/aggregation number, according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3$^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: RP-193196; 3GPP TS 38.212 V16.3.0 (2020 September), "3GPP TSG RAN; NR Physical channels and modulation (Release 16)"; 3GPP TS 38.213 V16.3.0 (2020 September), "3GPP TSG RAN; NR Physical channels and modulation (Release 16)"; 3GPP TS 38.214 V16.3.0 (2020 September), "3GPP TSG RAN; NR Physical channels and modulation (Release 16)"; 3GPP TS 38.331 V16.2.0 (2020 September), "3GPP TSG RAN; NR Radio Resource Control (RRC) protocol specification (Release 16)"; 3GPP TS 37.213 V16.3.0 (2020 September), "3GPP TSG RAN; NR Physical layer procedures for shared spectrum channel access (Release 16)". The standards and documents listed above are hereby expressly incorporated by reference in their entirety.

Figure 1:
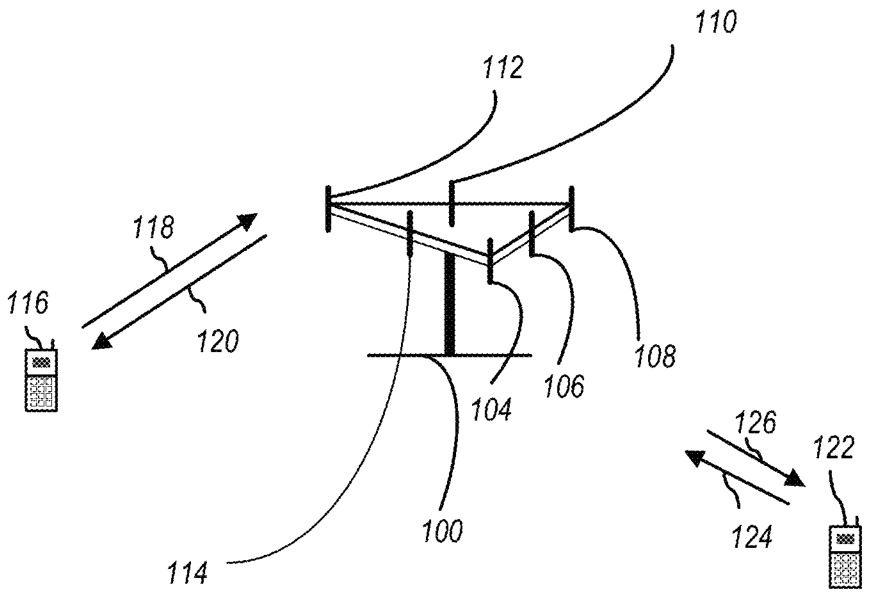
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
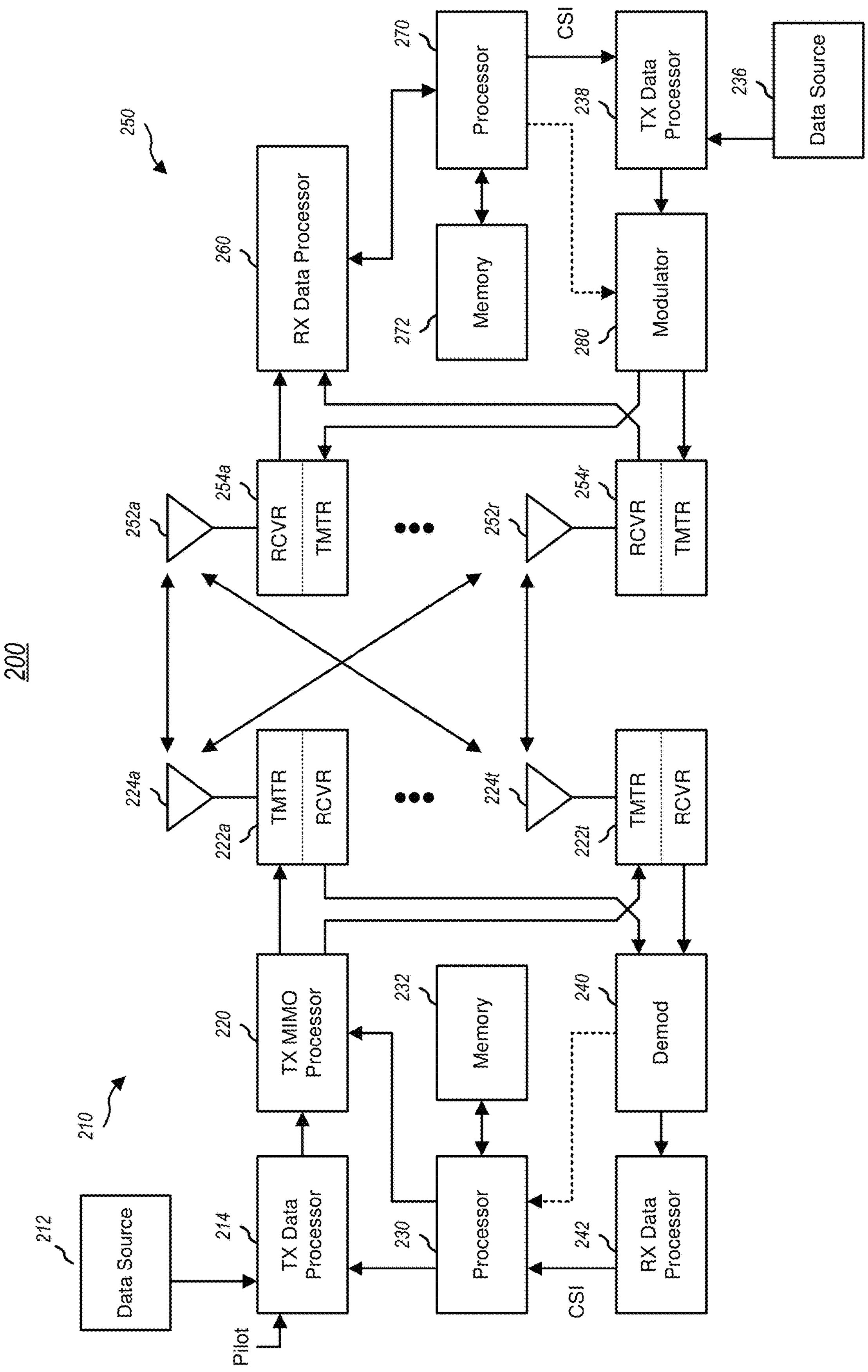
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222*a* through 222*t* may then be transmitted from $N_T$ antennas 224*a* through 224*t*, respectively.

At receiver system 250, the transmitted modulated signals are received by NR antennas 252*a* through 252*r* and the received signal from each antenna 252 may be provided to a respective receiver (RCVR) 254*a* through 254*r*. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the NR received symbol streams from NR receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254*a* through 254*r*, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
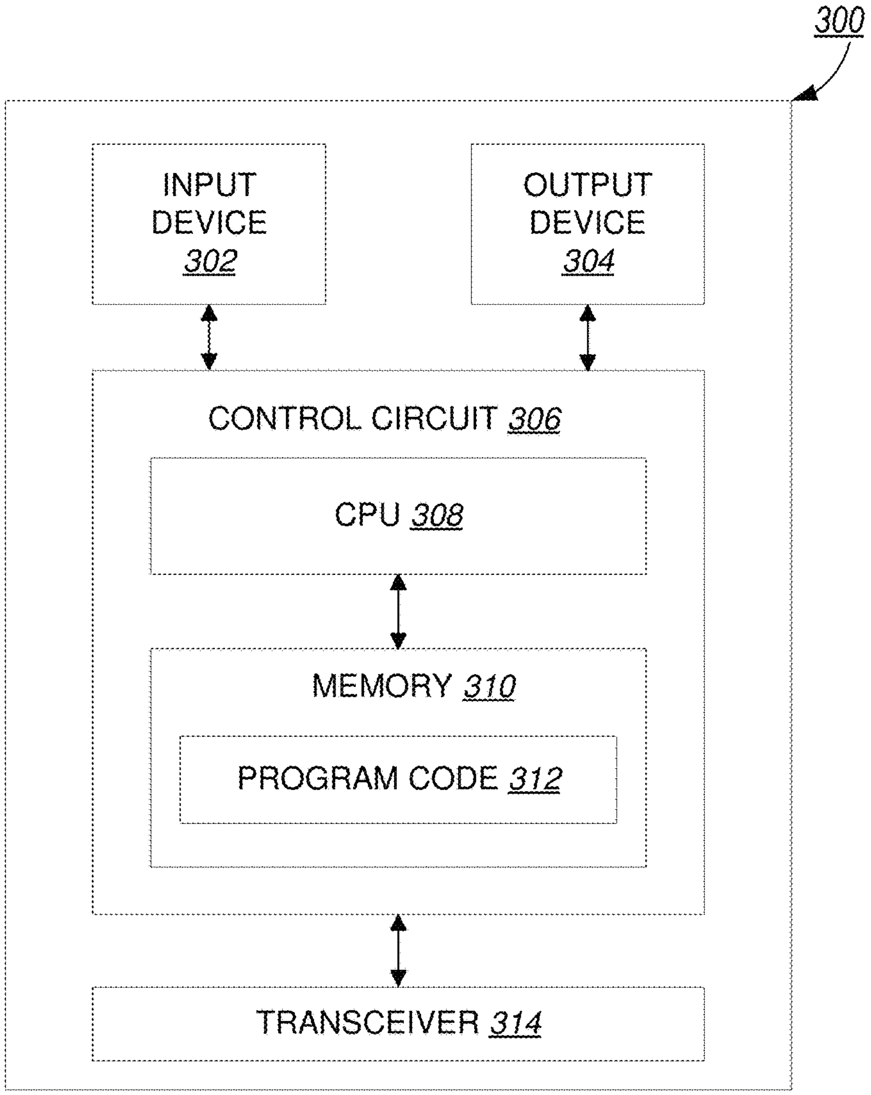
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
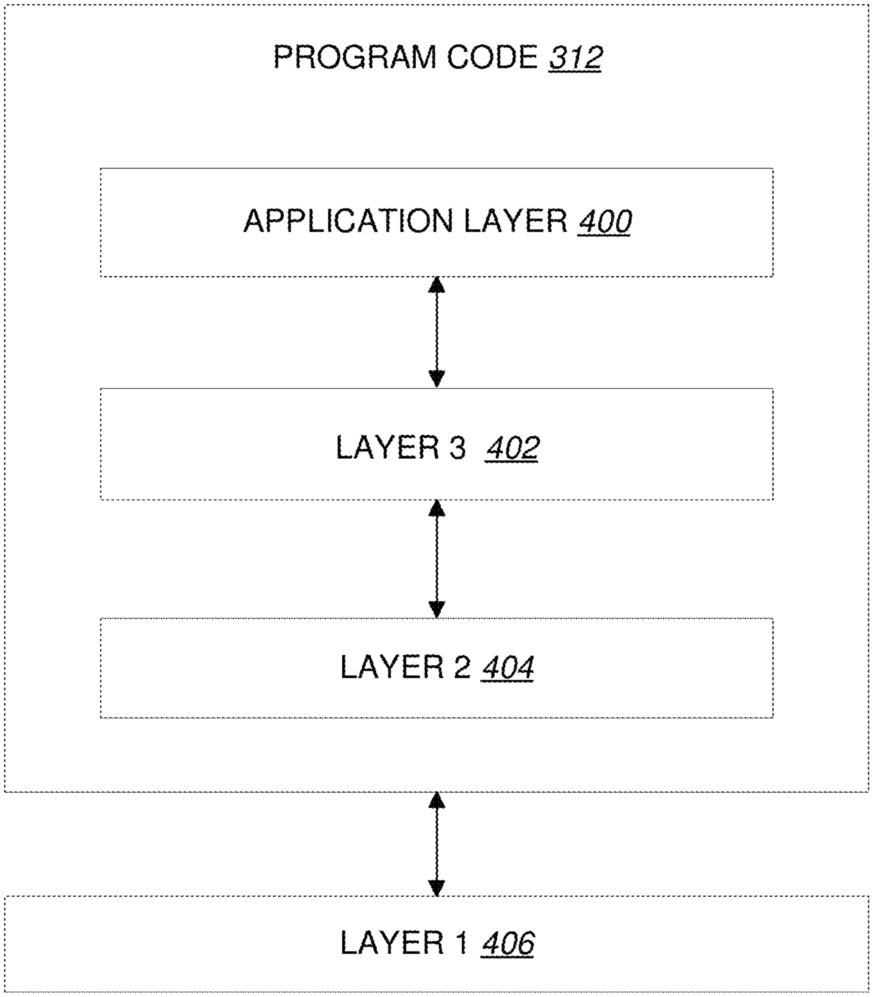
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

New Radio Unlicensed (NR-U) status report specifies 3GPP progress for NR-U from multiple working groups. One or more parts of the NR-U status report are quoted from RP-193196:

Agreement:

The TDRA table configuration allows indicating single or multiple continuous PUSCHs in any slot of the multiple scheduled slots.

For signaling the number of scheduled PUSCHs and TDRA in one DCI format 0_1 scheduling multiple PUSCHs, the TDRA table is extended such that each row indicates multiple PUSCHs (continuous in time-domain)

Each PUSCH has a separate SLIV and mapping type. The number of scheduled PUSCHs is signalled by the number of indicated valid SLIVs in the row of the TDRA table signalled in DCI.

Note: For the fallback DCI, Rel-15 TDRA table is used

Downlink Control Information (DCI) formats are discussed in 3GPP TS 38.212 V16.3.0, one or more parts of which are quoted below:

7.3.1.1.2 Format 0_1

DCI format 0_1 is used for the scheduling of one or multiple PUSCH in one cell, or indicating CG downlink feedback information (CG-DFI) to a UE.

The following information is transmitted by means of the DCI format 0_1 with CRC scrambled by C-RNTI or CS-RNTI or SP-CSI-RNTI or MCS-C-RNTI:

Identifier for DCI formats-1 bit

The value of this bit field is always set to 0, indicating an UL DCI format

Carrier indicator—0 or 3 bits, as defined in Clause 10.1 of [5, TS38.213].

DFI flag—0 or 1 bit

If DCI format 0_1 is used for indicating CG-DFI,

Otherwise, all the remaining fields are set as follows:

UL/SUL indicator-0 bit.

Bandwidth part indicator-0, 1 or 2 bits

Frequency domain resource assignment-number of bits determined by the following, where $$N_{RB}^{UL,BWP}$$

the size of the active UL bandwidth part:

If higher layer parameter useInterlacePUCCH-PUSCH in BWP-UplinkDedicated is not configured $$N_{RBG}$$

bits if only resource allocation type 0 is configured, where $$N_{RBG}$$

is defined in Clause 6.1.2.2.1 of [6, TS 38.214], $$\lceil \log_2(N_{RB}^{UL,BWP}(N_{RB}^{UL,BWP}+1)/2) \rceil$$

bits if only resource allocation type 1 is configured, or max $$\max(\lceil \log_2(N_{RB}^{UL,BWP}(N_{RB}^{UL,BWP}+1)/2) \rceil, N_{RBG})+1$$

bits if both resource allocation type 0 and 1 are configured.

If both resource allocation type 0 and 1 are configured, the MSB bit is used to indicate resource allocation type 0 or resource allocation type 1, where the bit value of 0 indicates resource allocation type 0 and the bit value of 1 indicates resource allocation type 1.

If the higher layer parameter useInterlacePUCCH-PUSCH in BWP-UplinkDedicated is configured 5+Y bits provide the frequency domain resource allocation according to Clause 6.1.2.2.3 of [6, TS 38.214] if the subcarrier spacing for the active UL bandwidth part is 30 kHz. The 5 MSBs provide the interlace allocation and the Y LSBs provide the RB set allocation.

6+Y bits provide the frequency domain resource allocation according to Clause 6.1.2.2.3 of [6, TS 38.214] if the subcarrier spacing for the active UL bandwidth part is 15 kHz. The 6 MSBs provide the interlace allocation and the Y LSBs provide the RB set allocation.

The value of Y is determined by $$\left\lceil \log_2\left(\frac{N_{RB-set,UL}^{BWP}(N_{RB-set,UL}^{BWP}+1)}{2}\right)\right\rceil$$

where $$N_{RB\text{-}set,UL}^{BWP}$$

is the number of RB sets contained in the active UL BWP as defined in clause 7 of [6, TS38.214].

Time domain resource assignment-0, 1, 2, 3, 4, 5, or 6 bits

If the higher layer parameter PUSCH-TimeDomainResourceAllocationList-ForDCIformat0_1 is not configured and if the higher layer parameter pusch-Time DomainAllocationListForMultiPUSCH is not configured and if the higher layer parameter pusch-TimeDomainAllocationList is configured, 0, 1, 2, 3, or 4 bits as defined in Clause 6.1.2.1 of [6, TS38.214]. The bitwidth for this field is determined as $\lceil \log_2(I) \rceil$ bits, where I is the number of entries in the higher layer parameter pusch-TimeDomainAllocationList;

If the higher layer parameter PUSCH-TimeDomainResourceAllocationList-ForDCIformat0_1 is configured or if the higher layer parameter pusch-TimeDomainAllocationListForMultiPUSCH is configured, 0, 1, 2, 3, 4, 5 or 6 bits as defined in Clause 6.1.2.1 of [6, TS38.214]. The bitwidth for this field is determined as $\lceil \log_2(I) \rceil$ bits, where/is the number of entries in the higher layer parameter PUSCH-TimeDomainResourceAllocationList-ForDCIformat0_1 or pusch-Time DomainAllocationListForMultiPUSCH;

otherwise the bitwidth for this field is determined as $\lceil \log_2 (I) \rceil$ bits, where I is the number of entries in the default table.

Frequency hopping flag-0 or 1 bit:

Modulation and coding scheme-5 bits as defined in Clause 6.1.4.1 of [6, TS 38.214]

New data indicator-1 bit if the number of scheduled PUSCH indicated by the Time domain resource assignment field is 1; otherwise 2, 3, 4, 5, 6, 7 or 8 bits determined based on the maximum number of schedulable PUSCH among all entries in the higher layer parameter pusch-TimeDomainAllocationListForMulti-PUSCH, where each bit corresponds to one scheduled PUSCH as defined in clause 6.1.4 in [6, TS 38.214].

Redundancy version—number of bits determined by the following:

2 bits as defined in Table 7.3.1.1.1-2 if the number of scheduled PUSCH indicated by the Time domain resource assignment field is 1;

otherwise 2, 3, 4, 5, 6, 7 or 8 bits determined by the maximum number of schedulable PUSCHs among all entries in the higher layer parameter pusch-Time DomainAllocationListForMultiPUSCH, where each bit corresponds to one scheduled PUSCH as defined in clause 6.1.4 in [6, TS 38.214] and redundancy version is determined according to Table 7.3.1.1.2-34.

HARQ process number-4 bits

. . .

. . .

. . .

. . .

ChannelAccess-CPext-CAPC-0, 1, 2, 3, 4, 5 or 6 bits. The bitwidth for this field is determined as $\lceil \log_2 (I) \rceil$ bits, where I is the number of entries in the higher layer parameter ul-dci-triggered-UL-ChannelAccess-CPext-CAPC-r16 for operation in a cell with shared spectrum channel access; otherwise 0 bit. One or more entries from Table 7.3.1.1.2-35 are configured by the higher layer parameter ul-dci-triggered-UL-ChannelAccess-CPext-CAPC-r16.

. . .

7.3.1.2.2 Format 1_1

DCI format 1_1 is used for the scheduling of PDSCH in one cell.

Time domain resource assignment-0, 1, 2, 3, or 4 bits as defined in Clause 5.1.2.1 of [6, TS 38.214]. The bitwidth for this field is determined as $\lceil \log_2 (I) \rceil$ bits, where/is the number of entries in the higher layer parameter pdsch-TimeDomainAllocationList if the higher layer parameter is configured; otherwise/is the number of entries in the default table.

HARQ process number-4 bits

Resource allocation is discussed in 3GPP TS 38.214 V16.3.0, one or more parts of which are quoted below:

6.1.2 Resource Allocation 6.1.2.1 Resource Allocation in Time Domain

When the UE is scheduled to transmit a transport block and no CSI report, or the UE is scheduled to transmit a transport block and a CSI report(s) on PUSCH by a DCI, the Time domain resource assignment field value m of the DCI provides a row index m+1 to an allocated table. The determination of the used resource allocation table is defined in Clause 6.1.2.1.1. The indexed row defines the slot offset $K_2$, the start and length indicator SLIV, or directly the start symbol S and the allocation length L, the PUSCH mapping type, and the number of repetitions (if numberOfRepetitions-r16 is present in the resource allocation table) to be applied in the PUSCH transmission.

For PUSCH repetition Type A, the starting symbol S relative to the start of the slot, and the number of consecutive symbols L counting from the symbol S allocated for the PUSCH are determined from the start and length indicator SLIV of the indexed row:

$$\text{if } (L-1) \leq 7 \text{ then}$$
$$SLIV = 14 \cdot (L-1) + S$$
$$\text{else}$$
$$SLIV = 14 \cdot (14 - L + 1) + (14 - 1 - S)$$
$$\text{where } 0 < L \leq 14 - S,$$

and

For PUSCH repetition Type B, the starting symbol S relative to the start of the slot, and the number of consecutive symbols L counting from the symbol S allocated for the PUSCH are provided by startSymbol-r16 and length-r16 of the indexed row of the resource allocation table, respectively.

For PUSCH repetition Type A, the PUSCH mapping type is set to Type A or Type B as defined in Clause 6.4.1.1.3 of [4, TS 38.211] as given by the indexed row.

For PUSCH repetition Type B, the PUSCH mapping type is set to Type B.

The UE shall consider the S and L combinations defined in table 6.1.2.1-1 as valid PUSCH allocations

TABLE 6.1.2.1-1

| Valid S and L combinations | | | | | | |
|---|---|---|---|---|---|---|
| PUSCH mapping | Normal cyclic prefix | | | Extended cyclic prefix | | |
| type | S | L | S + L | S | L | S + L |
| Type A (repetition Type A only) | 0 | {4, . . . , 14} | {4, . . . , 14} | 0 | {4, . . . , 12} | {4, . . . , 12} |
| Type B | {0, . . . , 13} | {1, . . . , 14} | {1, . . . , 14} for repetition Type A, {1, . . . , 27} for repetition Type B | {0, . . . , 11} | {1, . . . , 12} | {1, . . . , 12} for repetition Type A, {1, . . . , 23} for repetition Type B |

For PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as if numberOfRepetitions-r16 is present in the resource allocation table, the number of repetitions K is equal to numberOfRepetitions-r16;

elseif the UE is configured with pusch-AggregationFactor, the number of repetitions K is equal to pusch-AggregationFactor;

otherwise K=1.

For PUSCH repetition Type A, in case K>1, the same symbol allocation is applied across the K consecutive slots and the PUSCH is limited to a single transmission layer. The UE shall repeat the TB across the K consecutive slots applying the same symbol allocation in each slot. The redundancy version to be applied on the nth transmission occasion of the TB, where n=0, 1, . . . . K−1, is determined according to table 6.1.2.1-2.

TABLE 6.1.2.1-2

| Redundancy version for PUSCH transmission | | | | |
|---|---|---|---|---|
| $rv_{id}$ indicated by the DCI scheduling | $rv_{id}$ to be applied to $n^{th}$ transmission occasion (repetition Type A) or $n^{th}$ actual repetition (repetition Type B) | | | |
| the PUSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

For PUSCH repetition Type A, a PUSCH transmission in a slot of a multi-slot PUSCH transmission is omitted according to the conditions in Clause 9, Clause 11.1 and Clause 11.2A of [6, TS38.213].

. . . If pusch-TimeDomainAllocationList in pusch-Config contains row indicating resource allocation for two to eight contiguous PUSCHs, $K_2$ indicates the slot where UE shall transmit the first PUSCH of the multiple PUSCHs. Each PUSCH has a separate SLIV and mapping type. The number of scheduled PUSCHs is signalled by the number of indicated valid SLIVs in the row of the pusch-TimeDomainAllocationList signalled in DCI format 0_1.

6.1.2.1.1 Determination of the Resource Allocation Table to be Used for PUSCH

Table 6.1.2.1.1-1, Table 6.1.2.1.1-1A and Table 6.1.2.1.1-1B define which PUSCH time domain resource allocation configuration to apply.

Table 6.1.2.1.1-4 defines the subcarrier spacing specific values j. j is used in determination of $K_2$ in conjunction to table 6.1.2.1.1-2, for normal CP or table 6.1.2.1.1.-3 for extended CP, where $\mu_{PUSCH}$ is the subcarrier spacing configurations for PUSCH.

Table 6.1.2.1.1-5 defines the additional subcarrier spacing specific slot delay value for the first transmission of PUSCH scheduled by the RAR or by the fallback RAR. When the UE transmits a PUSCH scheduled by RAR or by the fallback RAR, the 4 value specific to the PUSCH subcarrier spacing U PUSCH is applied in addition to the $K_2$ value.

TABLE 6.1.2.1.1-1A

| Applicable PUSCH time domain resource allocation for DCI format 0_1 in UE specific search space scrambled with C-RNTI, MCS-C-RNTI, CS-RNTI or SP-CSI-RNTI | | | | |
|---|---|---|---|---|
| pusch-ConfigCommon includes pusch-TimeDomainAllocationList | pusch-Config includes pusch-TimeDomainAllocationList | pusch-Config includes pusch-TimeDomainAllocationListForDCI-Format0-1-r16 | pusch-Config includes pusch-TimeDomainAllocationList-ForMultiPUSCH | PUSCH time domain resource allocation to apply |
| No | No | No | No | Default A |
| Yes | No | No | No | pusch-TimeDomainAllocationList provided in pusch-ConfigCommon |
| No/Yes | Yes | No | No | pusch-TimeDomainAllocationList provided in pusch-Config |
| No/Yes | No/Yes | Yes | — | pusch-TimeDomainAllocationListForDCI-Format0-1-r16 provided in pusch-Config |
| No/Yes | No/Yes | — | Yes | pusch-TimeDomainAllocationList-ForMultiPUSCH provided in pusch-Config |

TABLE 6.1.2.1.1-1B

| Applicable PUSCH time domain resource allocation for DCI format 0_2 in UE specific search space scrambled with C-RNTI, MCS-C-RNTI, CS-RNTI or SP-CSI-RNTI | | | |
|---|---|---|---|
| pusch-ConfigCommon includes pusch-TimeDomainAllocationList | pusch-Config includes pusch-TimeDomainAllocationList | pusch-Config includes pusch-TimeDomainAllocationListForDCI-Format0-2-r16 | PUSCH time domain resource allocation to apply |
| No | No | No | Default A |
| Yes | No | No | pusch-TimeDomainAllocationList provided in pusch-ConfigCommon |
| No/Yes | Yes | No | pusch-TimeDomainAllocationList provided in pusch-Config |
| No/Yes | No/Yes | Yes | pusch-TimeDomainAllocationListForDCI-Format0-2-r16 provided in pusch-Config |

Information elements and/or fields are discussed in 3GPP TS 38.331 V16.2.0, one or more parts of which are quoted below:

BWP-Uplink

The IE BWP-Uplink is used to configure an additional uplink bandwidth part (not for the initial BWP).

BWP-Uplink Information Element

```
-- ASN1START
-- TAG-BWP-UPLINK-START
BWP-Uplink ::=                    SEQUENCE {
    bwp-Id                            BWP-Id,
    bwp-Common                        BWP-UplinkCommon
OPTIONAL,    -- Cond SetupOtherBWP
    bwp-Dedicated                     BWP-UplinkDedicated
OPTIONAL,    -- Cond SetupOtherBWP
```

-continued

```
    ...
}
-- TAG-BWP-UPLINK-STOP
-- ASN1STOP
```

BWP-UplinkCommon

The IE BWP-UplinkCommon is used to configure the common parameters of an uplink BWP. They are "cell specific" and the network ensures the necessary alignment with corresponding parameters of other UEs. The common parameters of the initial bandwidth part of the PCell are also provided via system information. For all other serving cells, the network provides the common parameters via dedicated signalling.

BWP-UplinkCommon Information Element

```
-- ASN1START
-- TAG-BWP-UPLINKCOMMON-START
BWP-UplinkCommon ::=                    SEQUENCE {
    genericParameters                       BWP,
    pusch-ConfigCommon                      SetupRelease { PUSCH-
ConfigCommon }                                      OPTIONAL,   -- Need
M
    pucch-ConfigCommon                  SetupRelease { PUCCH-
ConfigCommon }                              OPTIONAL,   -- Need
M
    ...,
    [ [
    useInterlacePUCCH-PUSCH-r16         ENUMERATED {enabled}
OPTIONAL,    -- Need R
    ] ]
}
-- TAG-BWP-UPLINKCOMMON-STOP
-- ASN1STOP
```

| BWP-UplinkCommon field descriptions |
| --- |
| pucch-ConfigCommon<br>Cell specific parameters for the PUCCH of this BWP. |
| pusch-ConfigCommon<br>Cell specific parameters for the PUSCH of this BWP. |
| useInterlacePUCCH-PUSCH<br>If the field is present, the UE uses uplink frequency domain resource allocation Type 2 for cell-specific PUSCH, e.g., PUSCH scheduled by RAR UL grant (see 38.213 clause 8.3 and 38.214 clause 6.1.2.2) and uses interlaced PUCCH Format 0 and 1 for cell-specific PUCCH (see TS 38.213 [13], clause 9.2.1). |

BWP-UplinkDedicated

The IE BWP-UplinkDedicated is used to configure the dedicated (UE specific) parameters of an uplink BWP.

BWP-UplinkDedicated Information Element

```
-- ASN1START
-- TAG-BWP-UPLINKDEDICATED-START
BWP-UplinkDedicated ::=                 SEQUENCE {
    pucch-Config                            SetupRelease { PUCCH-Config }
OPTIONAL,    -- Need M
    pusch-Config                            SetupRelease { PUSCH-Config }
OPTIONAL,    -- Need M
    configuredGrantConfig                   SetupRelease {
ConfiguredGrantConfig }                                 OPTIONAL,   -
- Need M
    srs-Config                              SetupRelease { SRS-Config }
OPTIONAL,    -- Need M
```

-continued

```
    ...,
    [ [
    cp-ExtensionC2-r16                      INTEGER (1..28)
OPTIONAL,   -- Need R
    cp-ExtensionC3-r16                      INTEGER (1..28)
OPTIONAL,   -- Need R
    useInterlacePUCCH-PUSCH-r16             ENUMERATED {enabled}
OPTIONAL,   -- Need R
    pucch-ConfigurationList-r16             SetupRelease { PUCCH-
ConfigurationList-r16 }                             OPTIONAL,   -- Need M
-- TAG-BWP-UPLINKDEDICATED-STOP
-- ASN1STOP
```

PUSCH-Config

The IE PUSCH-Config is used to configure the UE specific PUSCH parameters applicable to a particular BWP.

PUSCH-Config Information Element

```
-- ASN1START
-- TAG-PUSCH-CONFIG-START
PUSCH-Config ::=                        SEQUENCE {
    ...
    resourceAllocation                      ENUMERATED {
resourceAllocationType0, resourceAllocationType1, dynamicSwitch},
    pusch-TimeDomainAllocationList          SetupRelease { PUSCH-
TimeDomainResourceAllocationList }              OPTIONAL,   -- Need M
    pusch-AggregationFactor                 ENUMERATED { n2, n4, n8 }
OPTIONAL,   -- Need S
    ...
    resourceAllocationDCI-0-2-r16                       ENUMERATED
{ resourceAllocationType0, resourceAllocationType1, dynamicSwitch}
OPTIONAL,   -- Need M
    ...
    pusch-TimeDomainAllocationListDCI-0-2-r16
SetupRelease { PUSCH-TimeDomainResourceAllocationList-r16 }
OPTIONAL,   -- Need M
    -- End of the parameters for DCI format 0_2 introduced in V16.1.0
    -- Start of the parameters for DCI format 0_1 introduced in
V16.1.0
    pusch-TimeDomainAllocationListDCI-0-1-r16
SetupRelease { PUSCH-TimeDomainResourceAllocationList-r16 }
OPTIONAL,   -- Need M
    ...
    pusch-TimeDomainAllocationListForMultiPUSCH-r16  SetupRelease {
PUSCH-TimeDomainResourceAllocationList-r16 }
OPTIONAL,   -- Need M
    ...
-- TAG-PUSCH-CONFIG-STOP
-- ASN1STOP
```

| PUSCH-Config field descriptions |
|---|
| . . . |
| pusch-AggregationFactor<br>Number of repetitions for data (see TS 38.214 [19], clause 6.1.2.1). If the field is absent the UE applies the value 1. |
| . . . |
| pusch-TimeDomainAllocationList<br>List of time domain allocations for timing of UL assignment to UL data (see TS 38.214 [19], table 6.1.2.1.1-1). The field pusch-TimeDomainAllocationList applies to DCI formats 0_0 or DCI format 0_1 when the field pusch-TimeDomainAllocationListDCI-0-1 is not configured (see TS 38.214 [19], table 6.1.2.1.1-1 and table 6.1.2.1.1-1A). The network does not configure the pusch-TimeDomainAllocation (without suffix) simultaneously with the pusch-TimeDomainAllocation-r16. |
| pusch-TimeDomainAllocationListDCI-0-1<br>Configuration of the time domain resource allocation (TDRA) table for DCI format 0_1 (see TS 38.214 [19], clause 6.1, table 6.1.2.1.1-1A). |
| pusch-TimeDomainAllocationListDCI-0-2<br>Configuration of the time domain resource allocation (TDRA) table for DCI format 0_2 (see TS 38.214 [19], clause 6.1.2, table 6.1.2.1.1-1B). |

-continued

| PUSCH-Config field descriptions |
|---|
| pusch-TimeDomainAllocationListForMultiPUSCH<br>Configuration of the time domain resource allocation (TDRA) table for multiple PUSCH (see TS 38.214 [19], clause 6.1.2). The network configures at most 16 rows in this TDRA table in PUSCH-TimeDomainResourceAllocationList-r16 configured by this field.<br>. . .<br>resourceAllocation, resourceAllocationDCI-0-2<br>Configuration of resource allocation type 0 and resource allocation type 1 for non-fallback DCI (see TS 38.214 [19], clause 6.1.2). The field resourceAllocation applies to DCI format 0_1 and the field resourceAllocationDCI-0-2 applies to DCI format 0_2 (see TS 38.214 [19], clause 6.1.2).<br>resourceAllocationType1GranularityDCI-0-2<br>Configures the scheduling granularity applicable for both the starting point and length indication for resource allocation type 1 in DCI format 0_2. If this field is absent, the granularity is 1 PRB (see TS 38.214 [19], clause 6.1.2.2.2). |

PUSCH-TimeDomainResourceAllocationList

The IE PUSCH-TimeDomainResourceAllocation is used to configure a time domain relation between PDCCH and PUSCH. PUSCH-TimeDomainResourceAllocationList contains one or more of such PUSCH-TimeDomainResourceAllocations. The network indicates in the UL grant which of the configured time domain allocations the UE shall apply for that UL grant. The UE determines the bit width of the DCI field based on the number of entries in the PUSCH-TimeDomainResourceAllocationList. Value 0 in the DCI field refers to the first element in this list, value 1 in the DCI field refers to the second element in this list, and so on.

PUSCH-TimeDomainResourceAllocation Information Element

```
-- ASN1START
-- TAG-PUSCH-TIMEDOMAINRESOURCEALLOCATIONLIST-START
PUSCH-TimeDomainResourceAllocationList ::=   SEQUENCE
(SIZE(1..maxNrofUL-Allocations) ) OF PUSCH-TimeDomainResourceAllocation
PUSCH-TimeDomainResourceAllocation ::=   SEQUENCE {
      k2                                              INTEGER (0..32)
OPTIONAL,    -- Need S
      mappingType                                     ENUMERATED {typeA, typeB},
      startSymbolAndLength                            INTEGER (0..127)
}
PUSCH-TimeDomainResourceAllocationList-r16 ::=    SEQUENCE
(SIZE(1..maxNrofUL-Allocations-r16) ) OF PUSCH-
TimeDomainResourceAllocation-r16
PUSCH-TimeDomainResourceAllocation-r16 ::=    SEQUENCE {
      k2-r16                                          INTEGER (0..32)
OPTIONAL,    -- Need S
   puschAllocationList-r16                            SEQUENCE
(SIZE(1..maxNrofMultiplePUSCHs-r16) ) OF PUSCH-Allocation-r16,
   ...
}
PUSCH-Allocation-r16 ::=    SEQUENCE {
      mappingType-r16                                 ENUMERATED {typeA,
typeB}                    OPTIONAL,    -- Cond NotFormat01-02-Or-TypeA
      startSymbolAndLength-r16                        INTEGER (0..127)
OPTIONAL,    -- Cond NotFormat01-02-Or-TypeA
      startSymbol-r16                                 INTEGER (0..13)
OPTIONAL,    -- Cond RepTypeB
      length-r16                                      INTEGER (1..14)
OPTIONAL,    -- Cond RepTypeB
      numberOfRepetitions-r16                         ENUMERATED {n1, n2, n3,
n4, n7, n8, n12, n16} OPTIONAL,    -- Cond Format01-02
   ...
}
-- TAG-PUSCH-TIMEDOMAINRESOURCEALLOCATIONLIST-STOP
-- ASN1STOP
```

| PUSCH-TimeDomainResourceAllocationList field descriptions |
|---|
| k2<br>Corresponds to L1 parameter 'K2' (see TS 38.214 [19], clause 6.1.2.1) When the field is absent the UE applies the value 1 when PUSCH SCS is 15/30 kHz; the value 2 when PUSCH SCS is 60 kHz, and the value 3 when PUSCH SCS is 120 KHz.<br>length<br>Indicates the length allocated for PUSCH for DCI format 0_1/0_2 (see TS 38.214 [19], clause 6.1.2.1). |

-continued

| PUSCH-TimeDomainResourceAllocationList field descriptions |
|---|
| mappingType<br>Mapping type (see TS 38.214 [19], clause 6.1.2.1).<br>numberOfRepetitions<br>Number of repetitions for DCI format 0_1/0_2 (see TS 38.214 [19], clause 6.1.2.1).<br>puschAllocationList<br>One or multiple PUSCH continuous in time domain which share a common k2 (see TS 38.214 [19], clause 6.1.2.1). This list only has one element in pusch-TimeDomainAllocationListDCI-0-1-r16 and in pusch-TimeDomainAllocationListDCI-0-2-r16.<br>startSymbol<br>Indicates the index of start symbol for PUSCH for DCI format 0_1/0_2 (see TS 38.214 [19], clause 6.1.2.1).<br>startSymbolAndLength<br>An index giving valid combinations of start symbol and length (jointly encoded) as start and length indicator (SLIV). The network configures the field so that the allocation does not cross the slot boundary, (see TS 38.214 [19], clause 6.1.2.1). |

| Conditional Presence | Explanation |
|---|---|
| Format01-02 | In pusch-TimeDomainAllocationListForMultiPUSCH-r16, the field is absent.<br>In pusch-TimeDomainAllocationListDCI-0-1 and in pusch-TimeDomainAllocationListDCI-0-2, the field is mandatory present. |
| NotFormat01-02-Or-TypeA | In pusch-TimeDomainAllocationListForMultiPUSCH-r16, the field is mandatory present.<br>In pusch-TimeDomainAllocationListDCI-0-1, the field is optionally present if pusch-RepTypeIndicatorDCI-0-1 is set to pusch-RepTypeA, Need R. It is absent otherwise, Need R.<br>In pusch-TimeDomainAllocationListDCI-0-2, the field is optionally present if pusch-RepTypeIndicatorDCI-0-2 is set to pusch-RepTypeA, Need R. It is absent otherwise, Need R. |
| RepTypeB | In pusch-TimeDomainAllocationListForMultiPUSCH-r16, the field is absent.<br>In pusch-TimeDomainAllocationListDCI-0-1, the field is optionally present if pusch-RepTypeIndicatorDCI-0-1 is set to pusch-RepTypeB, Need R. It is absent otherwise, Need R.<br>In pusch-TimeDomainAllocationListDCI-0-2, the field is optionally present if pusch-RepTypeIndicatorDCI-0-2 is set to pusch-RepTypeB, Need R. It is absent otherwise, Need R. |

Channel access procedure is discussed in 3GPP TS 37.213 V16.3.0, one or more parts of which are quoted below:

4 Channel access procedure 4.0 General

Unless otherwise noted, the definitions below are applicable for the following terminologies used in this specification:

A channel refers to a carrier or a part of a carrier consisting of a contiguous set of resource blocks (RBs) on which a channel access procedure is performed in shared spectrum.

A channel access procedure is a procedure based on sensing that evaluates the availability of a channel for performing transmissions. The basic unit for sensing is a sensing slot with a duration $T_{sl}$=9 us. The sensing slot duration $T_{sl}$ is considered to be idle if an eNB/gNB or a UE senses the channel during the sensing slot duration, and determines that the detected power for at least 4 us within the sensing slot duration is less than energy detection threshold $X_{Thresh}$. Otherwise, the sensing slot duration $T_{sl}$ is considered to be busy.

A channel occupancy refers to transmission(s) on channel(s) by eNB/gNB/UE(s) after performing the corresponding channel access procedures in this clause.

A Channel Occupancy Time refers to the total time for which eNB/gNB/UE and any eNB/gNB/UE(s) sharing the channel occupancy perform transmission(s) on a channel after an eNB/gNB/UE performs the corresponding channel access procedures described in this clause. For determining a Channel Occupancy Time, if a transmission gap is less than or equal to 25 us, the gap duration is counted in the channel occupancy time. A channel occupancy time can be shared for transmission between an eNB/gNB and the corresponding UE(s).

A UL transmission burst is defined as a set of transmissions from a UE without any gaps greater than 16 us. Transmissions from a UE separated by a gap of more than 16 us are considered as separate UL transmission bursts. A UE can transmit transmission(s) after a gap within a UL transmission burst without sensing the corresponding channel(s) for availability.

One, some and/or all of the following terminology and assumptions may be used hereafter.

Base station (BS): a network central unit and/or a network node in New Radio (NR) which is used to control one or more transmission and reception points (TRPs) which are associated with one or more cells. Communication between a base station and one or more TRPs may be via fronthaul. Base station may be referred to as central unit (CU), eNB, gNB, and/or NodeB.

Cell: a cell comprises one or more associated TRPs (e.g., coverage of the cell may comprise coverage of some and/or all associated TRP(s)). One cell may be controlled by one base station. Cell may be referred to as TRP group (TRPG).

Uplink-control signal (UL-control signal): An UL-control signal may comprise at least one of a scheduling request (SR), channel state information (CSI), Hybrid Automatic Repeat Request (HARQ)-Acknowledgment (ACK)/Negative Acknowledgment (NACK) for a downlink (DL) transmission.

Slot: A slot is a scheduling unit in NR. A slot duration (e.g., a duration of a slot) may be 14 orthogonal frequency-division multiplexing (OFDM) symbols.

For operation with shared spectrum channel access in a serving cell, a UE may need to perform channel access and/or a Listen Before Talk (LBT) procedure before performing an uplink (UL) transmission (e.g., the UE may be required to perform the channel access and/or the LBT procedure in order to perform the uplink transmission). In order to reduce LBT attempts and/or channel access attempts (and/or in order to reduce control signaling overhead), a single Downlink Control Information (DCI) may schedule multi-PUSCHs. For example, multi-PUSCHs functionality for the single DCI scheduling the multi-PUSCHs may be introduced in order to reduce LBT attempts and/or channel access attempts (and/or in order to reduce control signaling overhead). In some examples, the multi-PUSCHs scheduled by the single DCI may comprise multiple PUSCHs scheduled by the single DCI. The single DCI may schedule the multi-PUSCHs continuously. For example, the multi-PUSCHs may be scheduled over consecutive (e.g., contiguous) time units and/or slots. In some examples, when multi-PUSCHs functionality is implemented (such that multi-PUSCHs can be scheduled by the single DCI, for example), a network (e.g., a gNB) does not need to perform channel access and/or LBT (for DCI transmission, for example) every time that the network schedules a Physical Uplink Shared Channel (PUSCH) (since the network may transmit the single DCI to schedule the multi-PUSCHs, wherein the network may not be required to transmit a separate DCI for each PUSCH of the multi-PUSCHs, for example). PUSCHs of the scheduled multi-PUSCHs may be used for transmitting Transport Blocks (TBs), Medium Access Control (MAC) Protocol Data Units (PDUs), and/or data traffic. For example, different PUSCHs of the scheduled multi-PUSCHs may be used for transmitting different TBs, different MAC PDUs, and/or different data traffic (e.g., a first PUSCH of the scheduled multi-PUSCHs may be used for transmitting a first TB, a first MAC PDU and/or first data traffic, and/or the second PUSCH of the scheduled multi-PUSCHs may be used for transmitting a second TB, a second MAC PDU and/or second data traffic, wherein the second TB, the second MAC PDU and/or the second data traffic are different from the first TB, the first MAC PDU and/or the first data traffic). Different PUSCHs of the scheduled multi-PUSCHs may be associated with different HARQ process numbers/IDs (e.g., a first PUSCH of the scheduled multi-PUSCHs may be associated with a first HARQ process number/ID and/or a second PUSCH of the scheduled multi-PUSCHs may be associated with a second HARQ process number/ID, wherein the second HARQ process number/ID may be different from the first HARQ process number/ID). As used herein, "HARQ process number/ID" may refer to a HARQ process number of a HARQ process (e.g., a number that identifies the HARQ process) and/or a HARQ process identification (ID) of the HARQ process. A HARQ process ID may be an example of a HARQ process number. As used herein, "multi-PUSCHs functionality" may refer to functionality of scheduling multiple PUSCHs using a single DCI (to reduce LBT attempts, channel access attempts and/or control signaling overhead, for example), wherein the multiple PUSCHs are used for transmitting at least one of different TBs, different MAC PDUs, different sets of data traffic, etc.

In Rel-16 (e.g., 3GPP release 16), a UE may be configured with a time domain allocation list (e.g., PUSCH-TimeDomainResourceAllocationList-r16). Each entry in the time domain allocation list may indicate a slot offset (e.g., one slot offset) and one or more time resource allocation configurations (e.g., a time resource allocation configuration of the one or more time resource allocation configurations may be a PUSCH-Allocation-r16). A number of time resource allocation configurations of the one or more time resource allocation configurations may indicate a number of PUSCHs (e.g., a number of scheduled PUSCHs for different TBs) that are scheduled by a DCI. A code-point of a time-related field in a DCI corresponds to an entry in the time domain allocation list (e.g., one code-point of one time-related field in the DCI corresponds to one entry in the time domain allocation list). The UE may be configured with pusch-TimeDomainAllocationListForMultiPUSCH-r16 such that an entry in the time domain allocation list indicates one or more Start and Length Indicator Values (SLIVs). Each SLIV of the one or more SLIVs may indicate a starting OFDM symbol and a number of consecutive OFDM symbols from the starting OFDM symbol (e.g., the number of consecutive OFDM symbols may correspond to a length including the starting OFDM symbol).

Figure 5:
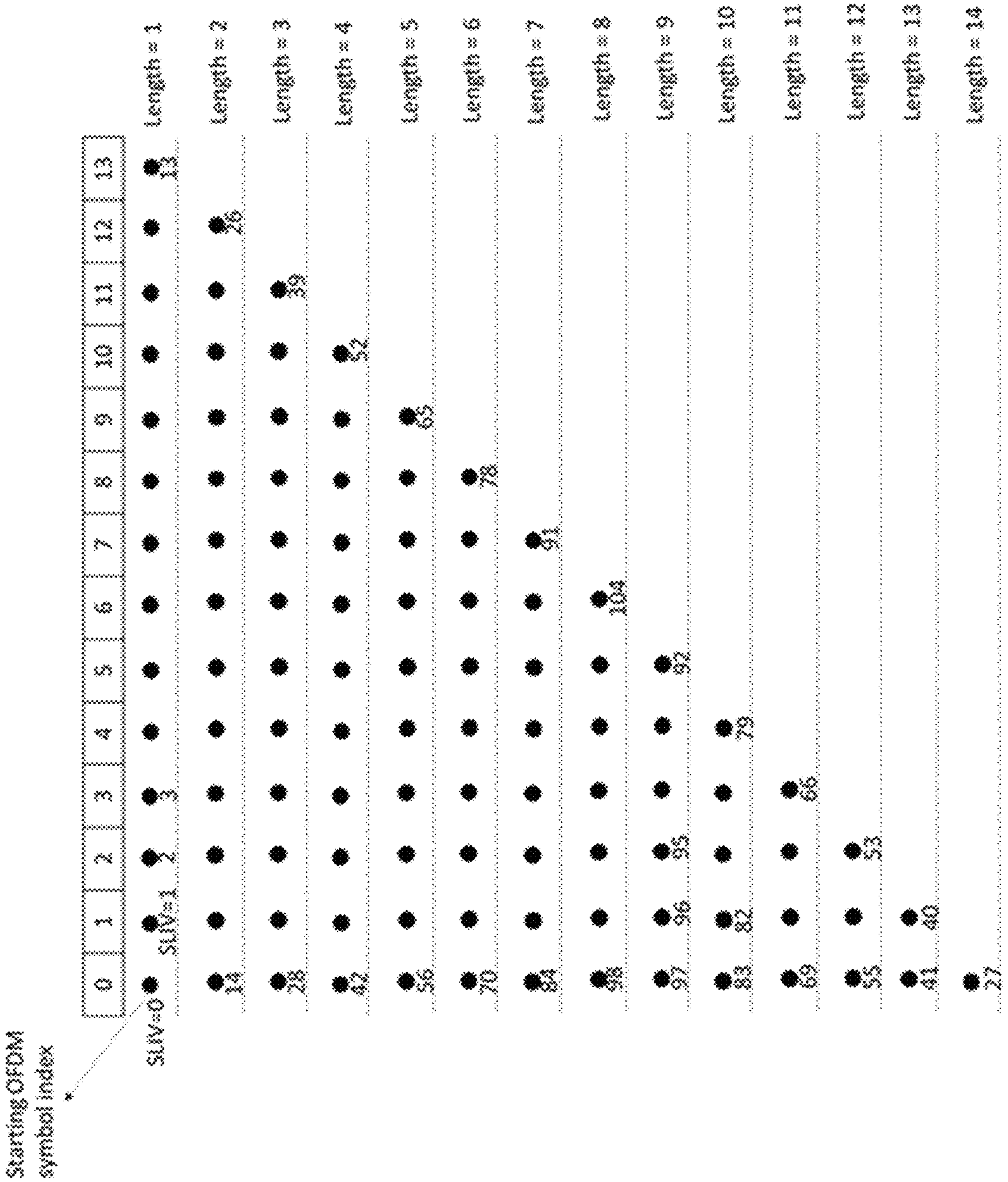
FIG. 5 is a diagram illustrating associations of Start and Length Indicator Values (SLIVs), starting orthogonal frequency-division multiplexing (OFDM) symbols and lengths, according to one exemplary embodiment.

An association of SLIV, starting OFDM symbol and length (e.g., length of consecutive OFDM symbols) is illustrated in FIG. 5. For example, SLIV=28 may mean and/or imply time resource allocation {#0~#2}. For example, as shown in FIG. 5, SLIV=28 corresponds to a starting OFDM symbol of 0 and a length of 3. The length may be a length of consecutive OFDM symbols (e.g., the length may correspond to a number of OFDM symbols of the OFDM symbols associated with the resource allocation, wherein the starting OFDM symbol is included in the length). Thus, based on the starting OFDM symbol of 0 and the length of 3, the time resource allocation (indicated by SLIV=28) may correspond to OFDM symbols {#0~#2}. Accordingly, in an example in which a transmission is performed in a slot based on SLIV=28, the transmission may be performed within the OFDM symbols {#0~#2}.

FIG. 6 illustrates a list 600 for resource allocation for PUSCH. A UE may be configured with the list 600. In some examples, each entry in the list (e.g., each row shown in FIG. 6) indicates a slot offset (k2) and a PUSCH-allocation. In some examples, the slot offset (k2) is between a slot of a scheduling Physical Downlink Control Channel (PDCCH) and a slot of a scheduled PUSCH (e.g., an initial scheduled PUSCH). For example, the slot offset (k2) may be a slot offset between the slot of the scheduling PDCCH and the slot of the scheduled PUSCH, wherein the scheduled PUSCH may be an initial PUSCH transmission of one or more PUSCH transmissions scheduled by the scheduling PDCCH. In some examples, a PUSCH-allocation may comprise one or more sets of resource allocation information, wherein each set of resource allocation information of the one or more sets of resource allocation information comprises an indication of a PUSCH mapping type and a SLIV. In FIG. 6, each set of resource allocation information is within a set of braces (e.g., "{PUSCH mapping type, SLIV}"). In this example, entry 5 includes four sets of resource allocation information, wherein each set of resource allocation information comprises an indication of a PUSCH mapping type and a SLIV (e.g., a first set of resource allocation information of entry 5 comprises an indication of a first PUSCH mapping type "type-A" and a first SLIV "70", a second set of resource allocation information of entry 5 comprises an indication of a second PUSCH mapping type "type-A" and a second SLIV "71", etc.).

Figure 7:
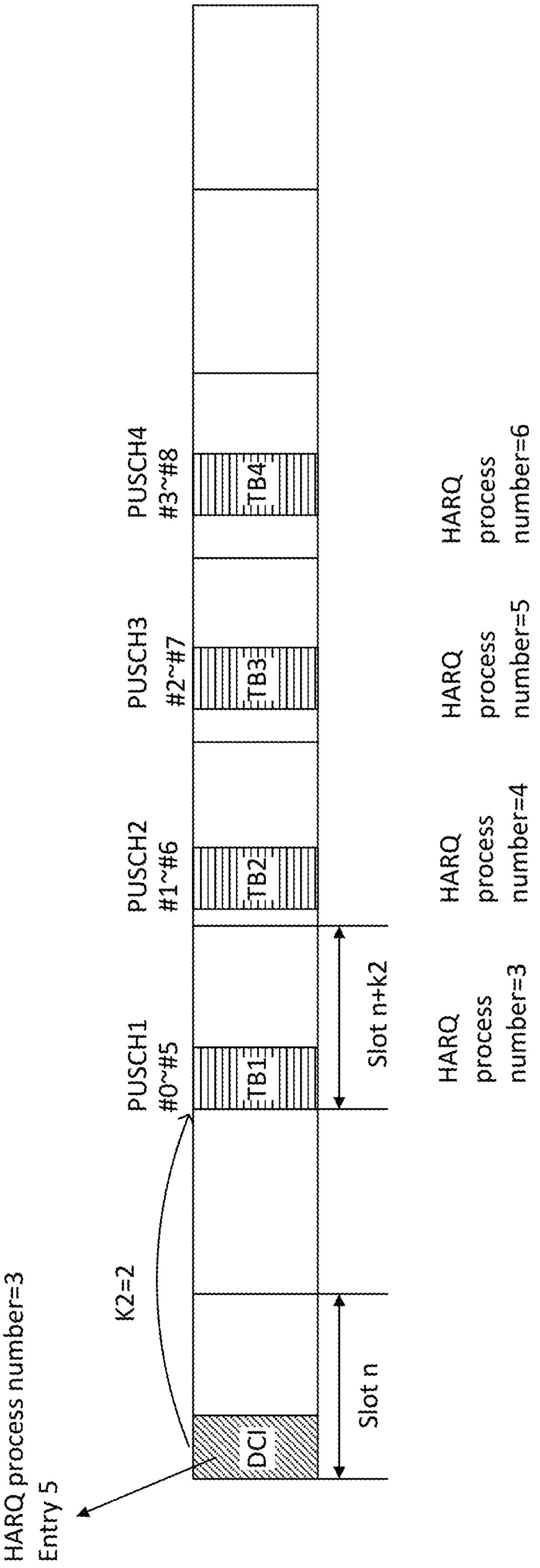
FIG. 7 is a diagram illustrating an exemplary scenario associated with implementation of multi-PUSCHs functionality, according to one exemplary embodiment.

FIG. 7 illustrates an example scenario associated with implementation of multi-PUSCHs functionality. In the example scenario of FIG. 7, the UE receives a DCI in slot n. A time domain resource allocation (TDRA) field in the DCI may be indicative of entry 5 of the list 600 of FIG. 6 (e.g., the UE is configured with the list 600). The UE may transmit PUSCH1 (e.g., an initial PUSCH of multiple PUSCHs scheduled by the DCI) in slot n+k2 (e.g., the slot n+k2 is slot n+2 since entry 5 of the list 600 indicates that k2=2), PUSCH2 (e.g., a second PUSCH, of the multiple PUSCHs, following the initial PUSCH) in slot n+k2+1, PUSCH3 (e.g., a third PUSCH, of the multiple PUSCHs, following the second PUSCH) in slot n+k2+2, and/or PUSCH4 (e.g., a fourth PUSCH, of the multiple PUSCHs, following the third PUSCH) in slot n+k2+3. Different PUSCHs may comprise different TBs associated with different HARQ process numbers. In an example shown in FIG. 7, the DCI may be indicative of HARQ process number 3. Based on the DCI being indicative of HARQ process number 3, HARQ process numbers for PUSCH1~4 may be {3, 4, 5, 6} (e.g., PUSCH 1 may be associated with HARQ process number 3, PUSCH 2 may be associated with HARQ process number 4, etc.). For example, a HARQ process number indicated by the DCI (e.g., HARQ process number 3) is associated with (e.g., applied to) an initial scheduled PUSCH (e.g., PUSCH1) of the multiple PUSCHs (scheduled by the DCI, for example). HARQ processes for remaining PUSCHs (e.g., PUSCH2~4) of the multiple PUSCHs (other than the initial PUSCH transmission) are based on the indicated HARQ process number 3. For example, for each PUSCH of the remaining PUSCHs, a preceding HARQ process number of a preceding PUSCH may be increased (e.g., incremented by 1) to determine a HARQ process number corresponding to the PUSCH. In an example, the HARQ process number corresponding to the PUSCH may be determined by performing a modulo operation in association with increasing the preceding HARQ process number of the preceding PUSCH to determine the HARQ process number corresponding to the PUSCH. For example, the HARQ process number corresponding to the PUSCH may be equal to (the preceding HARQ process number+1) modulo a number of HARQ process numbers. The number of HARQ process numbers may be 16. The number of HARQ process numbers may correspond to a number of HARQ process numbers (e.g., a total number of HARQ process numbers) supported and/or used by the UE and/or a number of HARQ process numbers (e.g., a total number of HARQ process numbers) that the UE is configured with (e.g., a number of HARQ process numbers that the UE can process, and/or a number of HARQ process numbers that the UE can simultaneously process).

In some examples, the list 600 of FIG. 6 may be used for Physical Downlink Shared Channel (PDSCH), wherein k2 can be replaced by k0, and PUSCH-allocation can be replaced by PDSCH-allocation. In an example, k0 is indicative of a slot offset between a slot of a scheduling PDCCH and a slot of a scheduled PDSCH (e.g., an initial scheduled PDSCH). For example, k0 may be a slot offset between the slot of the scheduling PDCCH and the slot of the scheduled PDSCH, wherein the scheduled PDSCH may be an initial PDSCH transmission of one or more PDSCH transmissions scheduled by the scheduling PDCCH. In an example in which the list 600 is used for PDSCH, PUSCH mapping type of the table 600 may be replaced by PDSCH mapping type. A design similar to a design for PUSCH can also applied in PDSCH. One or more of the techniques provided herein with respect to PUSCH may be applied in PDSCH.

Figure 8:
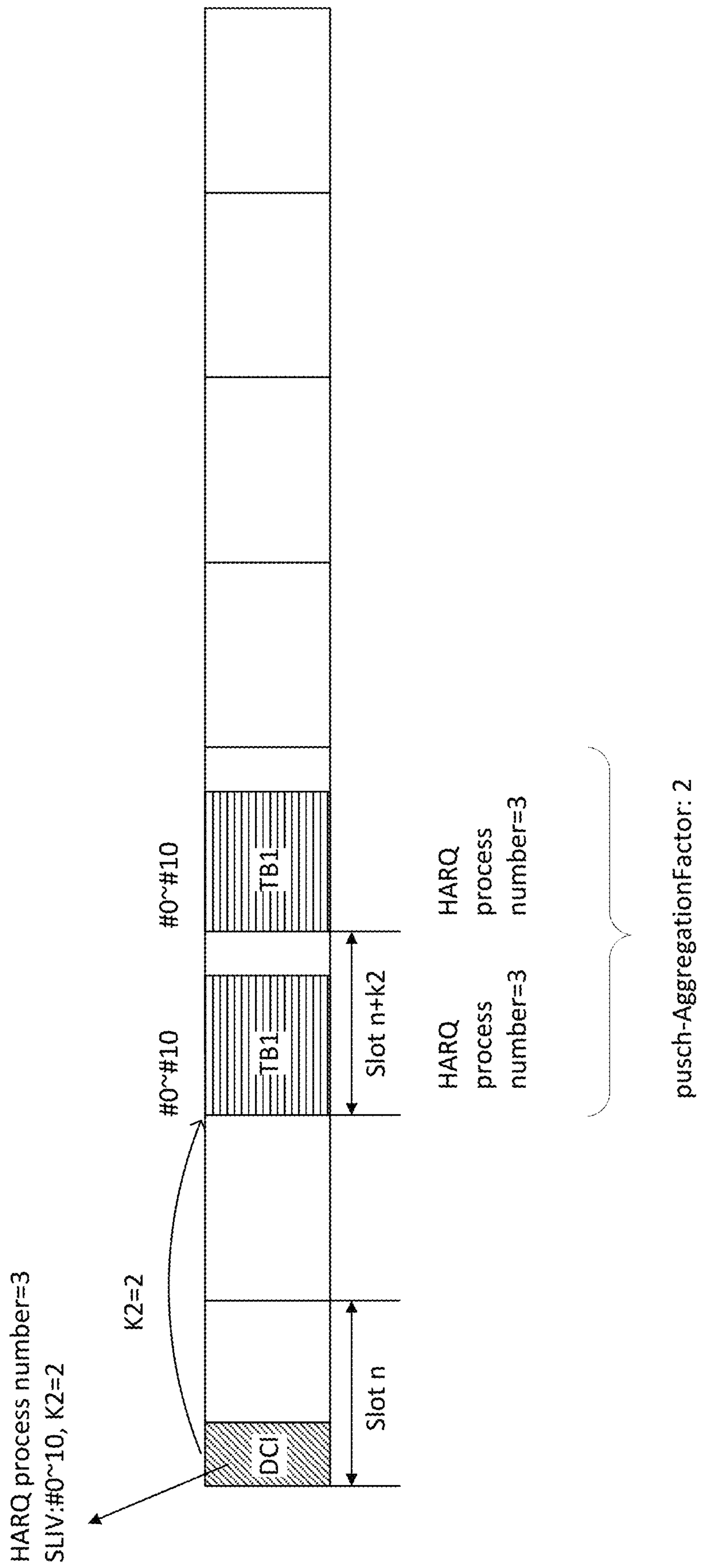
FIG. 8 is a diagram illustrating an exemplary scenario associated with PUSCH aggregation/repetition functionality, according to one exemplary embodiment.

In some examples, in order to improve (e.g., guarantee) PUSCH transmission reliability, PUSCH aggregation/repetition functionality may be implemented to apply slot aggregation of PUSCH and/or repetition of PUSCH for a single TB. As used herein, "PUSCH aggregation/repetition functionality" may refer to functionality of applying aggregation of PUSCH and/or repetition of PUSCH for a single TB (to improve PUSCH transmission reliability, for example). A UE may be configured with pusch-AggregationFactor for semi-statically repeating a PUSCH transmission for a single TB. For example, a scheduling unit for a single TB may be a number of consecutive slots indicated by pusch-AggregationFactor. An example scenario associated with PUSCH aggregation/repetition functionality is shown in FIG. 8. In the example scenario of FIG. 8, assuming UE is configured with pusch-AggregationFactor=2, in response to (e.g., upon) the UE receiving a DCI in slot n (wherein the DCI indicates resource allocation {#0~#10} for slot n+k2), the UE may consider the same resource allocation {#0~#10} that is allocated for the slot n+k2 to be allocated for a consecutive slot following the slot n+k2 (e.g., the consecutive slot is slot n+k2+1) according to pusch-AggregationFactor=2. The UE may be configured with another list (e.g., a second list, such as a list of PUSCH resource allocations) other than the list 600, wherein each entry in the second list indicates a resource allocation of PUSCH and a repetition number for PUSCH. The UE may receive a DCI indicating an entry from the second list to dynamically change the repetition number based on which entry is indicated. In an example, if an entry indicated by the DCI is indicative of a repetition number of 2, the UE may perform a scheduled PUSCH transmission with two repetitions (such as shown in the example scenario of FIG. 8, where TB1 is transmitted two times). For example, the repetition number may be based on (e.g., equal to) the aggregation factor, wherein the repetition number (and/or the aggregation factor) may correspond to a number of times the UE transmits the same data (e.g., the same TB).

However, in order to have the benefits of overhead reduction (e.g., reducing LBT attempts and/or channel access attempts) and the benefits of improved reliability (e.g., improved PUSCH transmission reliability) associated with repetition and/or aggregation, a single DCI scheduling multi-PUSCHs with dynamically and/or semi-statically indicating repetition number and/or slot aggregation number (and/or aggregation factor) needs further considerations.

An original portion of Section 6.1.2.1 of 3GPP TS 38.214 V16.3.0 is quoted below:

For PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as if numberOfRepetitions-r16 is present in the resource allocation table, the number of repetitions K is equal to numberOfRepetitions-r16;

elseif the UE is configured with pusch-AggregationFactor, the number of repetitions K is equal to pusch-AggregationFactor;

otherwise K=1.

If pusch-TimeDomainAllocationList in pusch-Config contains row indicating resource allocation for two to eight contiguous PUSCHs, $K_2$ indicates the slot where UE shall transmit the first PUSCH of the multiple PUSCHs. Each PUSCH has a separate SLIV and mapping type. The number of scheduled PUSCHs is signalled by the number of indicated valid SLIVs in the row of the pusch-Time Domain-AllocationList signalled in DCI format 0_1.

The UE may not be able to interpret and/or implement (and/or may be confused how to interpret and/or implement) the above quoted portion of Section 6.1.2.1 of 3GPP TS 38.214 V16.3.0.

For example, once the UE is using numberOfRepetitions-r16 or pusch-AggregationFactor (e.g., a pusch-AggregationFactor that is larger than 1), the UE may not be able to determine (and/or may be confused of) resource allocation for slot n+k2+1. The UE may not be able to determine (and/or may be confused of) resource allocation for slot n+k2+1 since, from a repetition point of view (e.g., implementation of PUSCH aggregation/repetition functionality), slots n+k2+1~n+k2+pusch-AggregationFactor−1 may be one or more repeated slots for slot n+k2 while from a multi-PUSCH point of view (e.g., implementation of multi-PUSCHs functionality), slots n+k2+1~n+k2+ #SLIV−1 may be used for other transmissions that are not repetitions of the PUSCH transmission of slot n+k2. In other words, for implementation of PUSCH aggregation/repetition functionality, each slot of one, some and/or all slots of slots n+k2+1~n+k2+pusch-AggregationFactor−1 may have the same and/or similar resource allocation as slot n+k2, the same and/or similar mapping type as slot n+k2 and/or may have transmission of the same TB as slot n+k2, whereas for implementation of multi-PUSCHs functionality, each slot of one, some and/or all slots of slots n+k2+1~n+k2+ #SLIV−1 may have resource allocation different from slot n+k2, mapping type different from slot n+k2 and/or transmission of a TB different from a TB transmitted in slot n+k2. Thus, how the UE considers and/or uses the scheduled resource allocation with repetition number and/or slot aggregation may need further considerations. Alternatively and/or additionally, the scheduled resource allocation may be scheduled by a dynamic grant.

Techniques of the present disclosure may be used in, but are not limited to being used in, unlicensed spectrum and/or in operation in shared spectrum channel access. Techniques of the present disclosure may be applied on licensed spectrum.

A first concept of the present disclosure is that, for a DCI scheduling multi-TB transmission and/or reception with TB repetition (e.g., same TB repetition), a pattern may be used for determining an association between a TB and a slot, and/or an association between a HARQ process number and a slot.

A second number may be configured and/or indicated by a network. For example, the UE may be configured with the second number (e.g., the network may transmit an indication, of the second number, to the UE). The second number may be a repetition factor and/or an aggregation factor (e.g., the repetition factor and/or the aggregation factor may be set to the second number).

The DCI may schedule and/or indicate a first number. The first number is a first number of TBs, a first number of HARQ process numbers, a first number of slots and/or a first number of SLIVs.

The DCI indicates a first HARQ process number (e.g., a specific HARQ process number). The first HARQ process number is applied on an initial scheduled slot scheduled by the DCI (e.g., the first HARQ process number is applied on an initial scheduled slot of one or more scheduled slots scheduled by the DCI).

The DCI may be DCI format 0_1, DCI format 0_2, DCI format 1_1, or DCI format 1_2.

In an example, the pattern corresponds to: (i) performing a first set of transmissions over a first set of slots, wherein a number of transmissions of the first set of transmissions and a number of slots of the first set of consecutive slots are equal to the first number of SLIVs, wherein HARQ process numbers associated with the first set of transmissions are increased (e.g., incremented by 1) for each transmission of the first set of transmissions, and/or (ii) performing one or more sets of transmissions over one or more sets of slots until a quantity of sets of transmissions, comprising the first set of transmissions and the one or more sets of transmissions, meets the second number corresponding to the aggregation factor, wherein the one or more sets of transmissions correspond to one or more repetitions of the first set of transmissions. In some examples, the HARQ process numbers are increased for each transmission of a set of transmissions with a modulo operation of a third number. The third number may be 16. The third number may correspond to a number of HARQ process numbers, such as a number of HARQ process numbers supported and/or used by the UE and/or a number of HARQ process numbers that the UE is configured with (e.g., a number of HARQ process numbers that the UE can process, and/or a number of HARQ process numbers that the UE can simultaneously process).

In an example in which the first number of SLIVs is 4 and the second number corresponding to the aggregation factor is 2, the pattern may correspond to: (i) performing a first set of transmissions over a first set of slots, wherein the first set of transmissions comprises 4 transmissions comprising: an initial transmission associated with the first HARQ process number (e.g., FIRSTHARQPROCESS), a second transmission, following the initial transmission, associated with a second HARQ process number (e.g., FIRSTHARQPROCESS+1), a third transmission, following the second transmission, associated with a third HARQ process number (e.g., FIRSTHARQPROCESS+2), and a fourth transmission, of the first set of transmissions, associated with a fourth HARQ process number (e.g., FIRSTHARQPROCESS+3), and (ii) performing a second set of transmissions over a second set of slots, wherein the second set of transmissions corresponds to a repetition of the first set of transmissions and wherein the second set of transmissions comprises 4 transmissions comprising: an initial transmission associated with the first HARQ process number, a second transmission, following the initial transmission of the second set of transmissions, associated with the second HARQ process number, a third transmission, following the second transmission of the second set of transmissions, associated with the third HARQ process number, and a fourth transmission, following the third transmission of the second set of transmissions, associated with the fourth HARQ process number. In the example, the pattern may end upon completion of the second set of transmissions since the second number corresponding to the aggregation factor is 2, and/or since a quantity of sets of transmissions of the first set of transmissions and the second set of transmissions is 2. In some examples, slots of the first set of slots and the second set of slots are consecutive slots (e.g., slots of the first set of slots may be contiguous with each other, slots of the second set of slots may be contiguous with each other, and/or a last slot of the first set of slots may be contiguous with an initial slot of the second set of slots). In some examples, for each transmission following an initial transmission of the first set of transmissions and/or for each transmission following an initial transmission of the second set of transmissions, a preceding HARQ process number associated with a preceding transmission is increased (e.g., incremented by 1) and/or a modulo operation of the third number is performed to determine a HARQ process number for the transmission. In an example in which the third number is 16, the second HARQ process number (associated with the second transmission of the first set of transmissions and the second transmission of the second set of transmissions) may be equal to (FIRSTHARQPROCESS+1) modulo (16).

For example, in an example in which the second number corresponding to the aggregation factor exceeds 1, the pattern may be two or more rounds of HARQ process numbers, wherein each round of HARQ process numbers comprises a number of HARQ process numbers equal to the first number of SLIVs, wherein HARQ process numbers of each round of HARQ process numbers are consecutively increased (e.g., incremented by 1 and/or increased with a modulo operation of the third number), wherein an initial HARQ process number of each round of HARQ process numbers is the first HARQ process number, and/or wherein a number of rounds of the two or more rounds of HARQ process numbers is equal to the second number corresponding to the aggregation factor. The pattern may be applied to a plurality of slots (e.g., a plurality of consecutive slots starting with slot n+k2). Each round of HARQ process numbers of the two or more rounds of HARQ process numbers may be applied to a set of slots of the plurality of slots. In an example in which the second number corresponding to the aggregation factor is 2 (and the pattern is two rounds of HARQ process numbers, for example) and the first number of SLIVs is 4, the plurality of slots may be 8 slots (e.g., 8 consecutive slots starting with slot n+k2, such as 8 slots that are contiguous with each other), wherein a first set of 4 slots of the plurality of slots may correspond to a first round of HARQ process numbers and a second set of 4 slots of the plurality of slots may correspond to a second round of HARQ process numbers, and/or wherein HARQ process numbers of the second round of HARQ process numbers match HARQ process numbers of the first round of HARQ process numbers. In an example in which the first HARQ process number is 3, the first set of 4 slots may be associated with HARQ process numbers {3, 4, 5, 6}, respectively, and/or the second set of 4 slots may be associated with the same HARQ process numbers {3, 4, 5, 6}, respectively.

The pattern may be determined based on (e.g., derived from) the first number of SLIVs and the second number corresponding to the aggregation factor.

In some examples, if the second number corresponding to the aggregation factor is larger than the first number of SLIVs, the pattern may be repetition of the first HARQ process number until a number of repetitions of the first HARQ process number is equal to the first number of SLIVs. For example, the pattern may correspond to performing first transmissions associated with the first HARQ process number over first slots, wherein a number of transmissions of the first transmissions and/or a number of slots of the first slots are equal to the first number of SLIVs. For example, the first slots may be consecutive slots (e.g., the first slots may be contiguous with each other). Alternatively and/or additionally, the pattern may be applied to the first slots by way of associating the first HARQ process number to each slot of the first slots. For example, in an example in which the first number of SLIVs is 4 and the second number corresponding to the aggregation factor greater than 4, the number of transmissions of the first transmissions may be 4 (e.g., the first number of SLIVs) and/or the number of slots of the first slots may be 4 (e.g., the first number of SLIVs).

In some examples, if the second number corresponding to the aggregation factor is smaller than or equal to the first number of SLIVs, the pattern may be one or more rounds of HARQ process numbers, wherein a first round (e.g., an initial round) of the one or more rounds comprises consecutively increasing HARQ process numbers starting with the first HARQ process number. A number of HARQ process numbers of the consecutively increasing HARQ process numbers of the first round (and/or a number of times that HARQ process numbers are increased in the first round) is equal to $$\frac{z}{x} - 1,$$

wherein z corresponds to the first number of SLIVs and x corresponds to the second number corresponding to the aggregation factor. In some examples, a ceil (e.g., ceiling) operation and/or a floor operation may be performed to determine the number of HARQ process numbers of the consecutively increasing HARQ process numbers of the first round (and/or the number of times that HARQ process numbers are increased in the first round). For example, a value $$\left(\text{e.g., } \frac{z}{x} - 1\right)$$

may be rounded up (e.g., rounded up, according to a ceil operation, to the lowest integer higher than the value) or rounded down (e.g., rounded down, according to a floor operation, to the highest integer lower than the value) to determine the number of HARQ process numbers of the consecutively increasing HARQ process numbers of the first round (and/or the number of times that HARQ process numbers are increased in the first round). A second round (e.g., a next round after the initial round) of the one or more rounds may comprise consecutively increasing HARQ process numbers starting with the first HARQ process number. A number of HARQ process numbers of the consecutively increasing HARQ process numbers of the second round. The number of HARQ process numbers of the consecutively increasing HARQ process numbers of the second round may be equal to the first number of SLIVs or the number of HARQ process numbers $$\left(\text{e.g., } \frac{z}{x} - 1\right)$$

of the first round. In an example, the number of HARQ process numbers of the second round is equal to a minimum (e.g., a lowest number) among the first number of SLIVs and the number of HARQ process numbers $$\left(\text{e.g., } \frac{z}{x} - 1\right)$$

of the first round.

In some examples, a length of the pattern (e.g., a number of slots of the pattern) may be (and/or may be based on) the first number of SLIVs.

Figure 9:
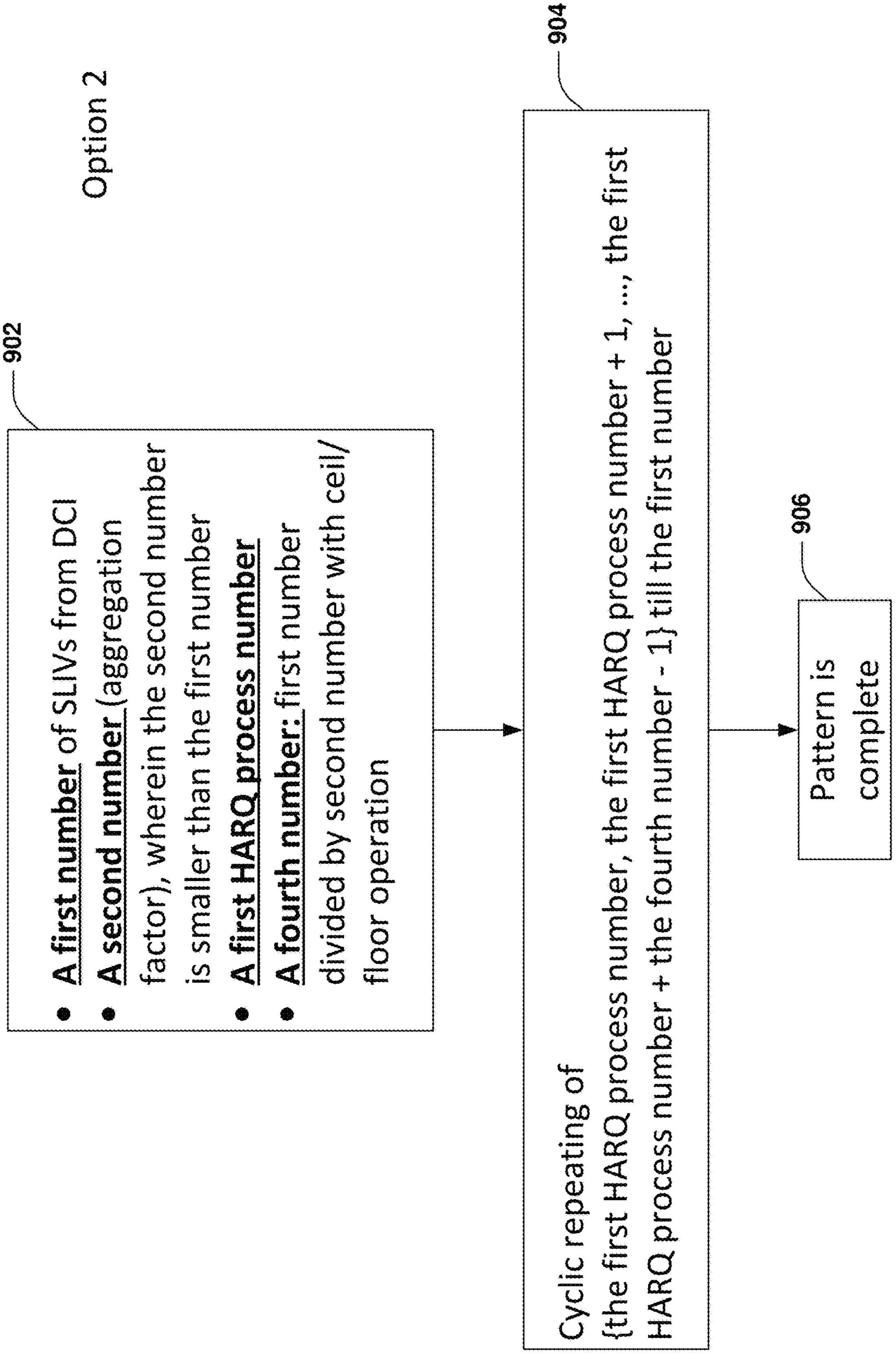
FIG. 9 is a diagram illustrating one or more operations associated with determining a pattern, according to one exemplary embodiment.

In some examples, the pattern is cyclic repetitions of HARQ process numbers from the first HARQ process number to a last HARQ process number. In some examples, the last HARQ process number may be equal to the first HARQ process number+a fourth number−1. Alternatively and/or additionally, a modulo operation with the third number (e.g., the number of HARQ process numbers supported and/or used by the UE and/or the number of HARQ process numbers that the UE is configured with) may be performed to determine the last HARQ process number. In an example in which the third number is 16, the last HARQ process number may be equal to (the first HARQ process number+the fourth number−1) modulo 16. In an example, each cyclic repetition of the cyclic repetitions may be a cyclic repetition of the first HARQ process number, a second HARQ process number corresponding to the first HARQ process number+1, . . . , the last HARQ process number corresponding to the first HARQ process number+the third number−1. Alternatively and/or additionally, one or more HARQ process numbers of the cyclic repetition (e.g., the one or more HARQ process numbers may comprise at least one of the second HARQ process number, . . . , the last HARQ process number) may be determined by performing one or more modulo operations with the third number. In an example in which the third number is 16, the second HARQ Process number may be equal to (the first HARQ process number+1) modulo 16. In some examples, the fourth number is equal to (and/or based on) the first number of SLIVs divided by the second number corresponding to the aggregation factor. In some examples, a ceil (e.g., ceiling) operation and/or a floor operation may be performed to determine the fourth number. For example, a value (e.g., the first number of SLIVs divided by the second number corresponding to the aggregation factor) may be rounded up (e.g., rounded up, according to a ceil operation, to the lowest integer higher than the value) or rounded down (e.g., rounded down, according to a floor operation, to the highest integer lower than the value) to determine the fourth number. In some examples, a number of cyclic repetitions of the cyclic repetitions in the pattern may be equal to the first number of SLIVs. Alternatively and/or additionally, a number of HARQ process numbers in the pattern (e.g., a total number of HARQ process numbers in the pattern, such as including one or more repetitions of one or more HARQ process numbers) may be equal to the first number of SLIVs. Alternatively and/or additionally, the cyclic repetitions may be applied to a plurality of slots (e.g., a plurality of consecutive slots starting with slot n+k2). Each cyclic repetition of the cyclic repetitions may be applied to a set of slots of the plurality of slots. In an example in which the first number of SLIVs is 4 (and the number of cyclic repetitions of the cyclic repetitions is 4, for example), a first set of slots of the plurality of slots may correspond to a first cyclic repetition of the cyclic repetitions (e.g., an initial slot of the first set of slots may be associated with the first HARQ process number, a second slot of the first set of slots may be associated with the second HARQ process number equal to the first HARQ process number+1, . . . , a last slot of the first set of slots may be associated with the last HARQ process number), a second set of slots of the plurality of slots may correspond to a second cyclic repetition of the cyclic repetitions (e.g., an initial slot of the second set of slots may be associated with the first HARQ process number, a second slot of the second set of slots may be associated with the second HARQ process number equal to the first HARQ process number+1, . . . , a last slot of the second set of slots may be associated with the last HARQ process number), a third set of slots of the plurality of slots may correspond to a third cyclic repetition of the cyclic repetitions (e.g., an initial slot of the third set of slots may be associated with the first HARQ process number, a second slot of the third set of slots may be associated with the second HARQ process number equal to the first HARQ process number+1, . . . , a last slot of the third set of slots may be associated with the last HARQ process number), and a fourth set of slots of the plurality of slots may correspond to a fourth cyclic repetition of the cyclic repetitions (e.g., an initial slot of the fourth set of slots may be associated with the first HARQ process number, a second slot of the fourth set of slots may be associated with the second HARQ process number equal to the first HARQ process number+1, . . . , a last slot of the fourth set of slots may be associated with the last HARQ process number). An example of the pattern is shown in FIG. 9. In the example shown in FIG. 9, the pattern may be performed based on at least some of information 902, and/or the pattern may comprise cyclic repeating 904 of {the first HARQ process number, the first HARQ process number+1, . . . , the first HARQ process number+the fourth number−1}, wherein the pattern is complete 906 upon a number of HARQ process numbers in the pattern (e.g., a total number of HARQ process numbers in the pattern, such as including one or more repetitions of one or more HARQ process numbers) reaching the first number of SLIVs.

In some examples, if the second number corresponding to the aggregation factor is smaller than or equal to the first number of SLIVs, the pattern may be one or more rounds of HARQ process numbers. An initial round of the one or more rounds comprises repetitions of the first HARQ process number, wherein a number of repetitions of the repetitions of the first HARQ process number is the second number corresponding to the aggregation factor (e.g., for the initial round of the one or more rounds, the first HARQ process number is repeated one or more times, wherein the one or more times is equal to the second number corresponding to the aggregation factor). Each round of one or more following rounds, of the one or more rounds, that follow the initial round may comprise repetitions of an associated HARQ process number, wherein a number of repetitions of the repetitions of the associated HARQ process number is a fifth number, and wherein the associated HARQ process number is equal to a sum of the second number corresponding to the aggregation factor and a preceding HARQ process number associated with a preceding round preceding the round (e.g., a preceding HARQ process number associated with a preceding round directly preceding the round, such as the first HARQ process number associated with the initial round). The fifth number may be a minimum (e.g., a lowest number) among: (i) the first number of SLIVs minus the second number corresponding to the aggregation factor, and (ii) the second number corresponding to the aggregation factor. For example, if the first number of SLIVs minus the second number corresponding to the aggregation factor is larger than the second number corresponding to the aggregation factor, the fifth number may be equal to the second number corresponding to the aggregation factor. Alternatively and/or additionally, if the first number of SLIVs minus the second number corresponding to the aggregation factor is smaller than the second number corresponding to the aggregation factor, the fifth number may be equal to the first number of SLIVs minus the second number corresponding to the aggregation factor. In an example, the one or more following rounds that follow the initial round comprise a second round following (e.g., directly following) the initial round and a third round following (e.g., directly following) the second round. The second round may comprise repetitions of a second HARQ process number (e.g., a first associated HARQ process number), wherein a number of repetitions of the repetitions of the second HARQ process number in the second round is the fifth number, and wherein the second HARQ process number is equal to a sum of the second number corresponding to the aggregation factor and the first HARQ process number. Alternatively and/or additionally, the third round may comprise repetitions of a third HARQ process number (e.g., a second associated HARQ process number), wherein a number of repetitions of the repetitions of the third HARQ process number in the third round is the fifth number, and wherein the third HARQ process number is equal to a sum of the second number corresponding to the aggregation factor and the second HARQ process number. In some examples, the length of the pattern (e.g., a number of slots of the pattern) may be (and/or may be based on) the first number of SLIVs. In some examples, the one or more rounds may be applied to a plurality of slots (e.g., a plurality of consecutive slots starting with slot n+k2). Each round of the one or more rounds may be applied to a set of slots of the plurality of slots. In an example, a first set of slots of the plurality of slots may correspond to the initial round of the one or more rounds (e.g., the first set of slots may be associated with the first HARQ process number, such as where each slot of the first set of slots is associated with a repetition of the first HARQ process number in the initial round and/or where a number of slots of the first set of slots is equal to the second number corresponding to the aggregation factor), a second set of slots of the plurality of slots may correspond to the second round of the one or more rounds (e.g., the second set of slots may be associated with the second HARQ process number, such as where each slot of the second set of slots is associated with a repetition of the second HARQ process number in the second round and/or where a number of slots of the second set of slots is equal to the fifth number), etc.

In some examples, the pattern comprises sequentially repeating the first HARQ process number and one or more associated HARQ process numbers. In some examples, each HARQ process number of the one or more associated HARQ process numbers may be equal to the first HARQ process number plus a factor of the second number corresponding to the aggregation factor. For example, the one or more associated HARQ process numbers may comprise at least one of a first associated HARQ process number equal to the first HARQ process number+ (1×the second number corresponding to the aggregation factor), a second associated HARQ process number equal to the first HARQ process number+ (2×the second number corresponding to the aggregation factor), a third associated HARQ process number equal to the first HARQ process number+ (3×the second number corresponding to the aggregation factor), etc.

Figure 10:
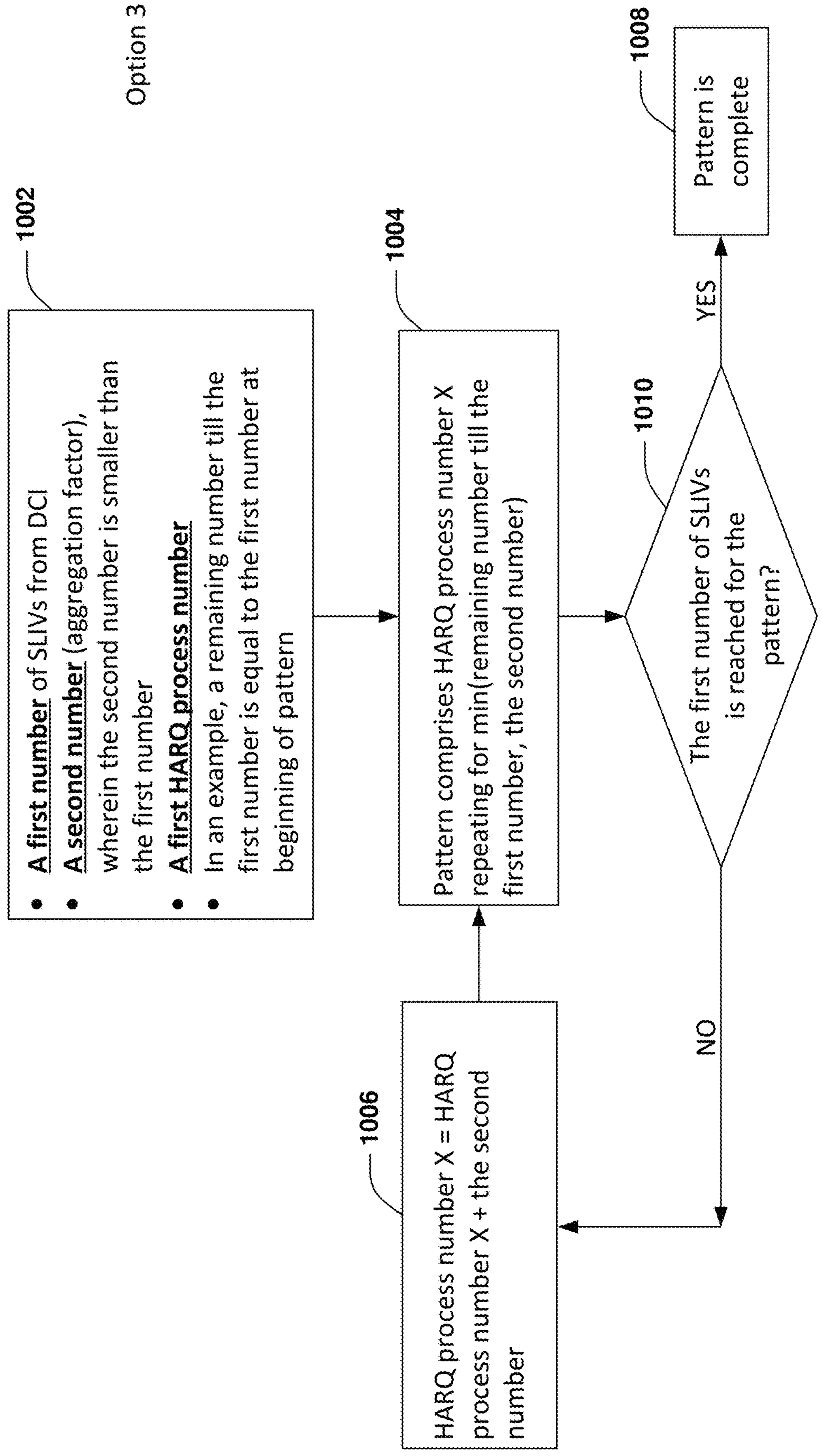
FIG. 10 is a diagram illustrating one or more operations associated with determining a pattern, according to one exemplary embodiment.

An example of the pattern is shown in FIG. 10. In the example shown in FIG. 10, the pattern may be performed based on at least some of information 1002. The pattern may comprise, in 1004, repeating of the first HARQ process number (e.g., HARQ process number X is set to the first HARQ process number for an initial instance of 1004), wherein a number of the repetitions of the first HARQ process number in 1004 is a minimum (e.g., a lowest number) among: (i) a remaining number until the first number of SLIVs (e.g., the remaining number until the first number of SLIVs may be equal to the first number of SLIVs at the beginning of the pattern), and (ii) the second number corresponding to the aggregation factor. In an example, the remaining number until the first number of SLIVs may be equal to the first number of SLIVs minus a number of HARQ process numbers in the pattern thus far (e.g., a total number of HARQ process numbers in the pattern thus far, such as including one or more repetitions of one or more HARQ process numbers). At 1010, if the first number of SLIVs is reached for the pattern (e.g., if the number of HARQ process numbers in the pattern reaches the first number of SLIVs), the pattern is completed 1008. Otherwise, if the first number of SLIVs is not reached for the pattern, at 1006, HARQ process number X may be updated by setting HARQ process number X to a HARQ process number equal to HARQ process number X+the second number corresponding to the aggregation factor (e.g., such that the updated HARQ process number X is repeated one or more times in 1004). Acts 1004 and/or 1006 may be performed until it is determined 1010 that the first number of SLIVs is reached for the pattern (indicating completion 1008 of the pattern). In an example in which the first number of SLIVs is 8, the second number corresponding to the aggregation factor is 2, and the first HARQ process number is 3, the pattern according to the example in FIG. 10 may be {3, 3, 5, 5, 7, 7, 9, 9}.

In some examples, the pattern comprises n repetitions of each HARQ process number of HARQ process numbers from the first HARQ process number to a last HARQ process number (e.g., n is equal to and/or based on the second number corresponding to the aggregation factor). In some examples, the last HARQ process number may be equal to the first HARQ process number+the first number (e.g., the first number of SLIVs)−1. In some examples, the HARQ process numbers may comprise each HARQ process number (e.g., each HARQ process number supported and/or used by the UE and/or each HARQ process number that the UE is configured with) from the first HARQ process number to the last HARQ process number (e.g., if the first HARQ process number is 3 and the last HARQ process number is 6, the HARQ process numbers may comprise HARQ process numbers 3, 4, 5, and 6). Alternatively and/or additionally, a modulo operation with the third number (e.g., the number of HARQ process numbers supported and/or used by the UE and/or the number of HARQ process numbers that the UE is configured with) may be performed to determine the last HARQ process number. In an example in which the third number is 16, the last HARQ process number may be equal to (the first HARQ process number+the first number−1) modulo 16. In an example, n repetitions of each HARQ process number of the HARQ process numbers may be performed in sequential order. For example, the pattern may comprise n repetitions of the first HARQ process number, followed by n repetitions of the first HARQ process number+1, . . . , followed by n repetitions of the last HARQ process number. In an example in which the first HARQ process number is 3 and the last HARQ process number is 6, the pattern may comprise n repetitions of HARQ process number 3, followed by n repetitions of HARQ process number 4, followed by n repetitions of HARQ process number 5, followed by n repetitions of HARQ process number 6 (e.g., if n=2, the pattern comprises {3, 3, 4, 4, 5, 5, 6, 6}). The pattern may be applied to a plurality of slots (e.g., a plurality of consecutive slots starting with slot n+k2). In an example in which the first HARQ process number is 3 and the last HARQ process number is 6, a first set of slots (e.g., a first set of n slots of the plurality of slots) may be associated with HARQ process number 3, a second set of slots (e.g., a second set of n slots of the plurality of slots) may be associated with HARQ process number 4, a third set of slots (e.g., a third set of n slots of the plurality of slots) may be associated with HARQ process number 5 and/or a fourth set of slots (e.g., a fourth set of n slots of the plurality of slots) may be associated with HARQ process number 6. An example is shown in Option 4 of FIG. 11, where for HARQ process number {3, 4, 5, 6}, each HARQ process number repeats two times (e.g., the pattern is HARQ process numbers {3, 3, 4, 4, 5, 5, 6, 6}).

In some examples, the pattern comprises sequential repetitions of each HARQ process number among HARQ process numbers comprising the first HARQ process number and one or more associated HARQ process numbers. For example, the pattern may comprise n repetitions of the first HARQ process number, followed by n repetitions of a second HARQ process number equal to the first HARQ process number+1, . . . , followed by n repetitions of a last HARQ process number equal to the first HARQ process number plus the first number (e.g., the first number of SLIVs) minus 1 (e.g., n is equal to and/or based on the second number corresponding to the aggregation factor). In an example, the pattern comprises sets of n repetitions of HARQ process numbers. An initial set of n repetitions of the first HARQ process number. For each set of n repetitions following the initial set of n repetitions, a preceding HARQ process number associated with a preceding set of n repetitions (e.g., a preceding HARQ process number associated with a preceding set of n repetitions directly preceding the set of n repetitions) may be increased (e.g., incremented by 1) to determine a HARQ process number for the set of n repetitions. The set of n repetitions are performed until a set of n repetitions of the last HARQ process number is completed. Each set of n repetitions of the sets of n repetitions may be applied to a set of slots of the plurality of slots. In an example, a first set of slots of the plurality of slots may correspond to the initial set of n repetitions (e.g., the first set of slots may be associated with the first HARQ process number, such as where each slot of the first set of slots is associated with a repetition of the first HARQ process number in the initial set of n repetitions and/or where a number of slots of the first set of slots is equal to n), a second set of slots of the plurality of slots may correspond to a second set of n repetitions (e.g., the second set of slots may be associated with a second HARQ process number equal to the first HARQ process number plus 1, such as where each slot of the second set of slots is associated with a repetition of the second HARQ process number in the second set of n repetitions and/or where a number of slots of the second set of slots is equal to n), etc.

In some examples, if the second number corresponding to the aggregation factor is smaller than or equal to the first number of SLIVs, the pattern may be one or more rounds of HARQ process numbers. An initial round of the one or more rounds comprises repetitions of the first HARQ process number, wherein a number of repetitions of the repetitions of the first HARQ process number is the second number corresponding to the aggregation factor (e.g., for the initial round of the one or more rounds, the first HARQ process number is repeated one or more times, wherein the one or more times is equal to the second number corresponding to the aggregation factor). For each round (of the one or more rounds) that follow the initial round, a preceding HARQ process number associated with a preceding round (e.g., a preceding HARQ process number associated with a preceding round directly preceding the round) may be increased (e.g., incremented by 1) to determine a HARQ process number for the round, and a set of m repetitions of the HARQ process number is performed in the round. In some examples, the one or more rounds are performed until a round comprising a set of repetitions of a last HARQ process number (e.g., a set of m repetitions of the last HARQ process number) is performed and/or completed. In some examples, the last HARQ process number is equal to the first HARQ process number plus the fourth number (e.g., the first number of SLIVs divided by the second number corresponding to the aggregation factor). In some examples, m may be a minimum (e.g., a lowest number) among: (i) the first number of SLIVs minus the second number corresponding to the aggregation factor, and (ii) the second number corresponding to the aggregation factor. In an example, one or more following rounds that follow the initial round comprise a second round following (e.g., directly following) the initial round and a third round following (e.g., directly following) the second round. The second round may comprise m repetitions of a second HARQ process number equal to the first HARQ process number+1. Alternatively and/or additionally, the third round may comprise m repetitions of a third HARQ process number equal to the second HARQ process number+1. In some examples, the length of the pattern (e.g., a number of slots of the pattern) may be (and/or may be based on) the first number of SLIVs. In some examples, the one or more rounds may be applied to a plurality of slots (e.g., a plurality of consecutive slots starting with slot n+k2). Each round of the one or more rounds may be applied to a set of slots of the plurality of slots. In an example, a first set of slots of the plurality of slots may correspond to the initial round of the one or more rounds (e.g., the first set of slots may be associated with the first HARQ process number, such as where each slot of the first set of slots is associated with a repetition of the first HARQ process number in the initial round and/or where a number of slots of the first set of slots is equal to the second number corresponding to the aggregation factor), a second set of slots of the plurality of slots may correspond to the second round of the one or more rounds (e.g., the second set of slots may be associated with the second HARQ process number, such as where each slot of the second set of slots is associated with a repetition of the second HARQ process number in the second round and/or where a number of slots of the second set of slots is equal to m), etc.

In some examples, the pattern comprises sequentially repeating the first HARQ process number and one or more HARQ process numbers. In some examples, the one or more HARQ process numbers may be consecutive HARQ process numbers that follow the first HARQ process number (e.g., with modulo operation).

Figure 12:
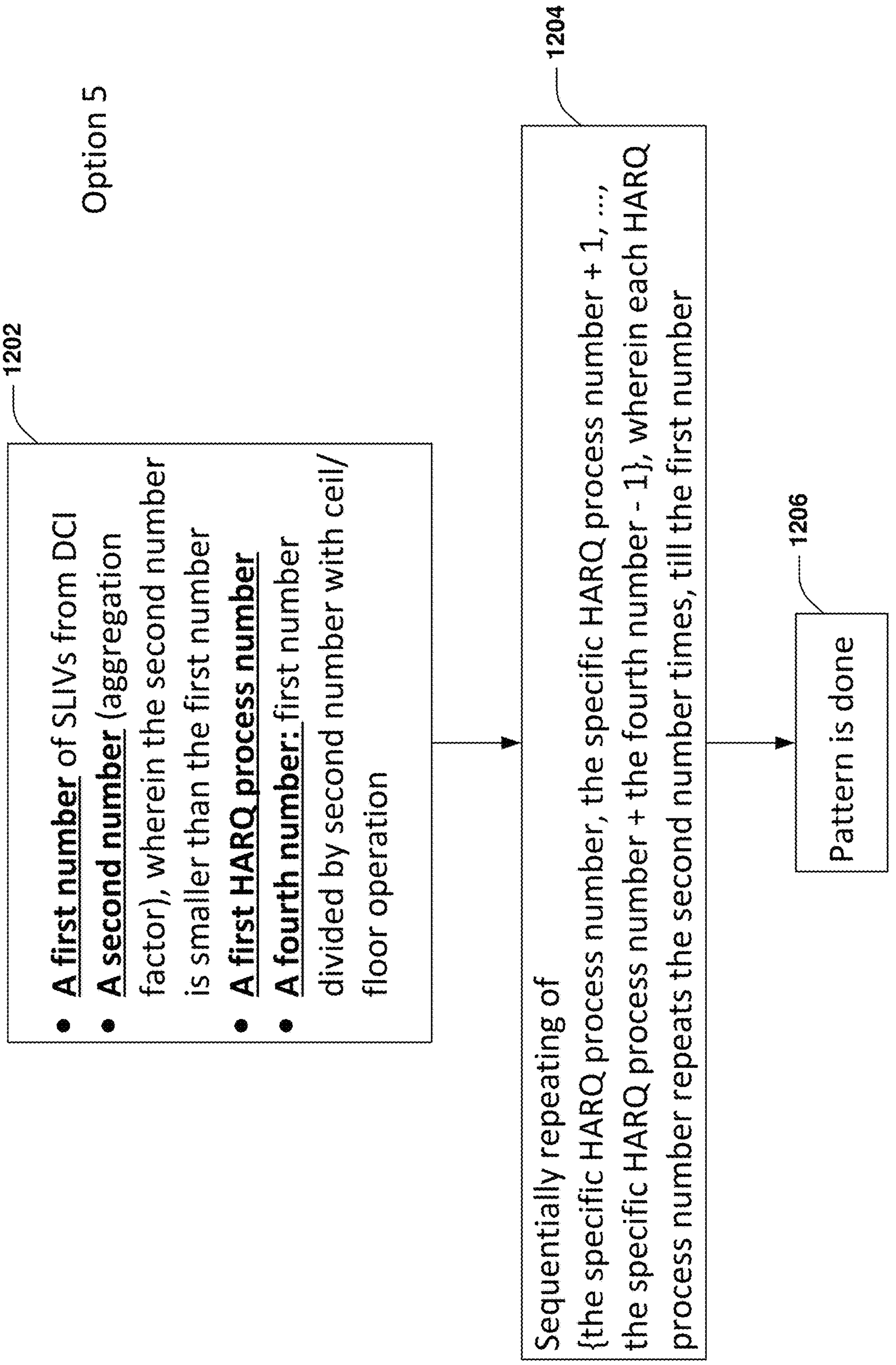
FIG. 12 is a diagram illustrating one or more operations associated with determining a pattern, according to one exemplary embodiment.

An example of the pattern is shown in FIG. 12. In the example shown in FIG. 12, the pattern may be performed based on at least some of information 1202. The pattern may comprise sequential repeating 1204 of each HARQ process number of at least some of HARQ process numbers {the first HARQ process number, the first HARQ process number+1, . . . , the first HARQ process number+the fourth number−1}, wherein each HARQ process number of at least some of the HARQ process numbers is repeated a number of times equal to the second number of times, and/or wherein the pattern is complete 1206 upon a number of HARQ process numbers in the pattern (e.g., a total number of HARQ process numbers in the pattern, such as including one or more repetitions of one or more HARQ process numbers) reaching the first number of SLIVs. In an example in which the first number of SLIVs is 8, the second number corresponding to the aggregation factor is 2, and the first HARQ process number is 3, the pattern according to the example in FIG. 12 may be {3, 3, 4, 4, 5, 5, 6, 6} (e.g., there are no HARQ process numbers 7~10 in the pattern).

In some examples, the DCI schedules resource allocation (e.g., time resource allocation) within slots for one or more TBs. In some examples, a resource allocation (e.g., a time resource allocation) within a slot is indicative of OFDM symbols (e.g., consecutive OFDM symbols) within the slot. For example, the resource allocation may be indicative of a starting OFDM symbol of the OFDM symbols and/or a length of consecutive OFDM symbols (e.g., the length may correspond to a number of OFDM symbols of the OFDM symbols associated with the resource allocation, wherein the starting OFDM symbol is included in the length). The DCI may schedule the same resource allocation (e.g., the same time resource allocation) within each slot for a TB of the one or more TBs. For example, OFDM symbols for transmission of a first TB, of the one or more TBs, in a first slot may be the same as OFDM symbols for transmission of the first TB in a second slot. Alternatively and/or additionally, the DCI may schedule the same resource allocation (e.g., the same time resource allocation) within each slot for multiple TBs of the one or more TBs. For example, OFDM symbols for transmission of a first TB, of the one or more TBs, in a first slot may be the same as OFDM symbols for transmission of a second TB, of the one or more TBs, in a second slot. Alternatively and/or additionally, the DCI may schedule different resource allocations (e.g., different time resource allocations) within slots for a TB of the one or more TBs. For example, OFDM symbols for transmission of a first TB, of the one or more TBs, in a first slot may be different from OFDM symbols for transmission of the first TB in a second slot. Alternatively and/or additionally, the DCI may schedule different resource allocations (e.g., different time resource allocations) within slots for multiple TBs of the one or more TBs. For example, OFDM symbols for transmission of a first TB, of the one or more TBs, in a first slot may be different from OFDM symbols for transmission of a second TB, of the one or more TBs, in a second slot.

FIG. 11 illustrates examples of the pattern (of resource allocation, for example) across a plurality of slots, where the second number corresponding to the aggregation factor (e.g., a slot aggregation number with which the UE is configured) is smaller than or equal to the first number of SLIVs. The UE receives a DCI in slot n, wherein the DCI indicates a slot offset (e.g., k2) for an initial scheduled transmission (e.g., an initial transmission scheduled by the DCI is scheduled for slot n+k2). In the example shown in FIG. 11, the second number corresponding to the aggregation factor is 2 (e.g., the UE is configured with a slot aggregation number "2"). In the example shown in FIG. 11, the first number of SLIVs is 4. For example, the first number of SLIVs is 4 based on the DCI indicating an entry (of the list 600 of FIG. 6, for example) comprising 4 SLIVs (e.g., the DCI may comprise an indication of entry index 5 corresponding to the entry 5 of the list 600 of FIG. 6). Alternatively and/or additionally, the DCI may be indicative of the first HARQ process number (for the initial scheduled transmission and/or the first scheduled SLIV, for example).

FIG. 11 shows example patterns of Options 1-5. For each option, FIG. 11 shows HARQ process numbers, of the pattern, associated with slots (e.g., consecutive slots) starting with slot n+k2.

In Option 1, the pattern may correspond to HARQ process numbers {3, 4, 5, 6, 3, 4, 5, 6} across the plurality of slots (e.g., the plurality of slots comprises 8 slots). For example, the plurality of slots (to which the pattern is applied) comprises a first set of slots comprising slots (e.g., 4 slots) from slot n+k2 to slot n+k2+3 associated with HARQ process numbers {3, 4, 5, 6}, respectively. The plurality of slots comprises a second set of slots comprising slots (e.g., 4 slots), wherein HARQ process numbers applied to the second set of slots, respectively, are the same as (e.g., a repetition of) the HARQ process numbers applied to the first set of slots. For example, repeated HARQ process numbers (associated with the second set of slots, for example) follow original HARQ process numbers (associated with the first set of slots, for example).

In Option 2, the pattern may correspond to HARQ process numbers {3, 4, 3, 4} across the plurality of slots (e.g., the plurality of slots comprises 4 slots). In some examples, a number (e.g., a total number, such as 4) of the HARQ process numbers (e.g., including repetitions of HARQ process numbers) of the pattern and/or a number of slots associated with the pattern are based on the first number of SLIVs (e.g., a number of SLIVs in the indicated entry, such as #SLIVs) being 4. For example, the number of the HARQ process numbers and/or the number of the slots may be equal to (and/or based on) the first number of SLIVs. In some examples, a number of unique HARQ process numbers of the HARQ process numbers may be determined based on (e.g., may be derived from) the first number of SLIVs (e.g., 4) divided by the aggregation factor (e.g., 2). In some examples, a ceil (e.g., ceiling) operation and/or a floor operation may be performed to determine the number of unique HARQ process numbers. For example, a value (e.g., the first number of SLIVs divided by the aggregation factor) may be rounded up (e.g., rounded up, according to a ceil operation, to the lowest integer higher than the value) or rounded down (e.g., rounded down, according to a floor operation, to the highest integer lower than the value) to determine the number of unique HARQ process numbers. In the example shown in FIG. 11, the number of unique HARQ process numbers of the pattern is 2 (where unique HARQ process numbers of the pattern are 3 and 4, for example).

In Option 3, the pattern may correspond to HARQ process numbers {3, 3, 5, 5} across the plurality of slots (e.g., the plurality of slots comprises 4 slots). In some examples, a number (e.g., a total number, such as 4) of the HARQ process numbers (e.g., including repetitions of HARQ process numbers) of the pattern and/or a number of slots associated with the pattern are based on the first number of SLIVs (e.g., a number of SLIVs in the indicated entry, such as #SLIVs) being 4. For example, the number of the HARQ process numbers and/or the number of the slots may be equal to (and/or based on) the first number of SLIVs. In some examples, HARQ process number 3 is repeated for one or more consecutive slots, wherein a number of slots of the one or more consecutive slots is equal to the aggregation factor (e.g., the one or more consecutive slots comprise slot n+k2). The one or more consecutive slots are followed by one or more second consecutive slots, wherein an associated HARQ process number is repeated for the one or more second consecutive slots. In the example, the one or more consecutive slots in which the first HARQ process number (e.g., 3) is repeated comprise slot n+k2 and slot n+k2+1, and the one or more second consecutive slots in which the associated HARQ process number is repeated comprise slot n+k2+2 and slot n+k2+3. In some examples, the associated HARQ process number is 5. For example, the associated HARQ process number associated with the one or more second consecutive slots may be equal to (and/or based on) the first HARQ process number (e.g., 3) plus the aggregation factor (e.g., 2). In some examples, UE does not use (and/or does not consider to use) HARQ process number 4 in the example shown in FIG. 11.

In Option 4, the pattern may correspond to HARQ process numbers {3, 3, 4, 4, 5, 5, 6, 6} across the plurality of slots (e.g., the plurality of slots comprises 8 slots). In some examples, for each HARQ process number of HARQ process numbers 3~6, the HARQ process number may repeated over slots amounting to the aggregation factor (e.g., 2 slots due to the aggregation factor being equal to 2). In some examples, a number of slots (e.g., 8) of the plurality of slots is based on the first number of SLIVs and the aggregation factor (e.g., the number of slots may be equal to the first number of SLIVs multiplied by the aggregation factor).

In Option 5, the pattern may correspond to HARQ process numbers {3, 3, 4, 4} across the plurality of slots (e.g., the plurality of slots comprises 4 slots). In some examples, a number (e.g., a total number, such as 4) of the HARQ process numbers (e.g., including repetitions of HARQ process numbers) of the pattern and/or a number of slots associated with the pattern are based on the first number of SLIVs (e.g., a number of SLIVs in the indicated entry, such as #SLIVs) being 4. For example, the number of the HARQ process numbers and/or the number of the slots may be equal to (and/or based on) the first number of SLIVs. In some examples, HARQ process number 3 is repeated for one or more consecutive slots, wherein a number of slots of the one or more consecutive slots is equal to the aggregation factor (e.g., the one or more consecutive slots comprise slot n+k2). The one or more consecutive slots are followed by one or more second consecutive slots, wherein a consecutive HARQ process number is repeated for the one or more second consecutive slots. In the example, the one or more consecutive slots in which the first HARQ process number (e.g., 3) is repeated comprise slot n+k2 and slot n+k2+1, and the one or more second consecutive slots in which the consecutive HARQ process number is repeated comprise slot n+k2+2 and slot n+k2+3. In some examples, the consecutive HARQ process number is 4. For example, the consecutive HARQ process number associated with the one or more second consecutive slots may be equal to (and/or based on) the first HARQ process number (e.g., 3) plus 1 (e.g., the consecutive HARQ process number may correspond to a HARQ process number consecutively following the first HARQ process number).

In some examples, the pattern may be specified and/or fixed in a standard.

In some examples, the pattern may be configured (e.g., pre-configured) by a network (e.g., the UE may be configured with the pattern by receiving a configuration and/or an indication of the pattern from the network).

In some examples, a same HARQ process number corresponds to a same TB. For example, if a first slot and a second slot are associated with the same HARQ process number, the same TB may be transmitted via the first slot and via the second slot.

In some examples, a same HARQ process number corresponds to a same SLIV. For example, if a first slot and a second slot are associated with the same HARQ process number, the first slot and the second slot may be associated with the same SLIV.

In some examples, a same HARQ process number corresponds to a same mapping type. For example, if a first slot and a second slot are associated with the same HARQ process number, the first slot and the second slot may be associated with the same mapping type.

FIG. 13 shows examples of the pattern (of resource allocation, for example) across a plurality of slots, where the second number corresponding to the aggregation factor (e.g., a slot aggregation number with which the UE is configured) is smaller than or equal to the first number of SLIVs. The UE receives a DCI in slot n, wherein the DCI indicates a slot offset (e.g., k2) for an initial scheduled transmission (e.g., an initial transmission scheduled by the DCI is scheduled for slot n+k2). In the example shown in FIG. 13, the second number corresponding to the aggregation factor is 2 (e.g., the UE is configured with a slot aggregation number "2"). In the example shown in FIG. 13, the first number of SLIVs is 4. For example, the first number of SLIVs is 4 based on the DCI indicating an entry (of the list 600 of FIG. 6, for example) comprising 4 SLIVs (e.g., the DCI may comprise an indication of entry index 5 corresponding to the entry 5 of the list 600 of FIG. 6). Alternatively and/or additionally, the DCI may be indicative of the first HARQ process number (for the initial scheduled transmission and/or the first scheduled SLIV, for example).

For each option, FIG. 13 shows SLIVs, of the pattern, associated with the plurality of slots (e.g., consecutive slots) starting with slot n+k2. In some examples, HARQ process numbers shown in each option of FIG. 11 may be associated with the SLIVs shown in each option of FIG. 13, respectively. The SLIVs are based on the entry (e.g., entry 5) indicated by the DCI received by the UE.

In some examples, HARQ process numbers according to Option 1 and/or Option 4 in FIG. 11 are associated with SLIVs according to Option 1 and/or Option 4 in FIG. 13, respectively.

In some examples, HARQ process numbers according to Option 2, Option 3 and/or Option 5 in FIG. 11 are associated with SLIVs according to Option 2, Option 3 and/or Option 5 in FIG. 13, respectively.

In some examples, UE may determine (e.g., derive) a length of the pattern (e.g., a number of slots of the pattern) based on a configuration (e.g., a pre-configuration) by the network.

In some examples, UE may determine (e.g., derive) the length of the pattern (e.g., a number of slots of the pattern) based on a fixed value and/or a value specified in a specification.

In an example, the length of the pattern is 6, the UE is configured with slot aggregation number "2", and the UE receives a DCI, wherein the DCI is indicative of 4 SLIVs (e.g., the first number of SLIVs is 4 based on an entry indicated by the DCI comprising 4 SLIVs), and the DCI is indicative of the first HARQ process number (for an initial scheduled SLIV, for example) being 3. In the example, if the pattern is determined according to Option 1, the UE may determine (e.g., derive, identify and/or consider) the pattern to be {3, 4, 5, 6, 3, 4} for Option 1. Alternatively and/or additionally, in the example, if the pattern is determined according to Option 2, the pattern may be {3, 4, 5, 3, 4, 5}. Alternatively and/or additionally, in the example, if the pattern is determined according to Option 3, the pattern may be {3, 3, 5, 5, 3, 3}. Alternatively and/or additionally, in the example, if the pattern is determined according to Option 4 the pattern may be {3, 3, 4, 4, 5, 5}. Alternatively and/or additionally, in the example, if the pattern is determined according to Option 5, the pattern may be {3, 3, 4, 4, 5, 5}.

Figure 15:
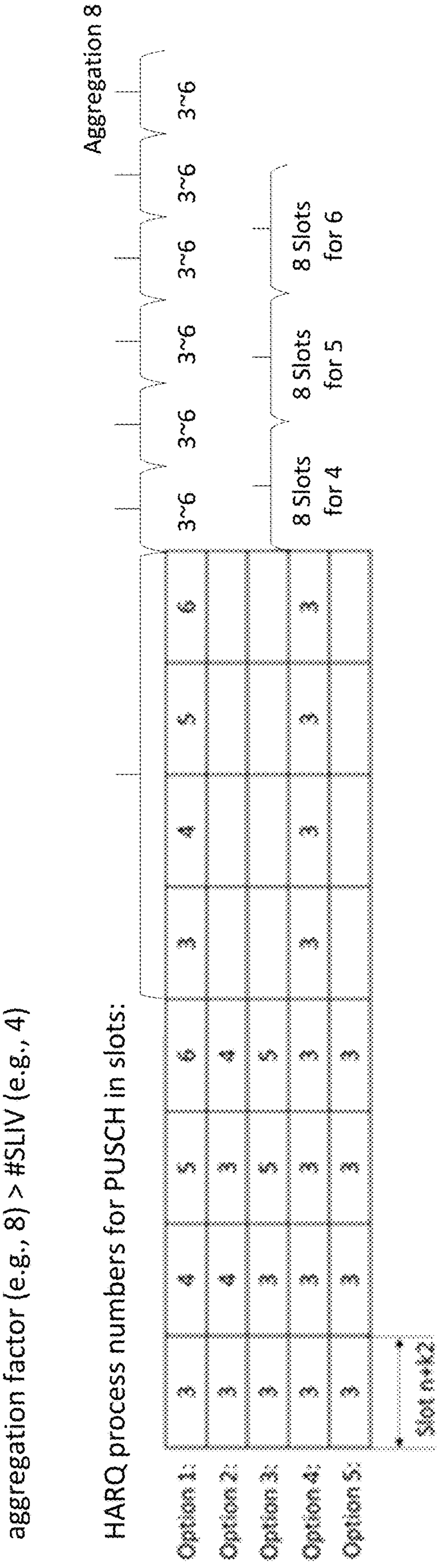
FIG. 15 is a diagram illustrating examples of a pattern, according to one exemplary embodiment.
Figure 16:
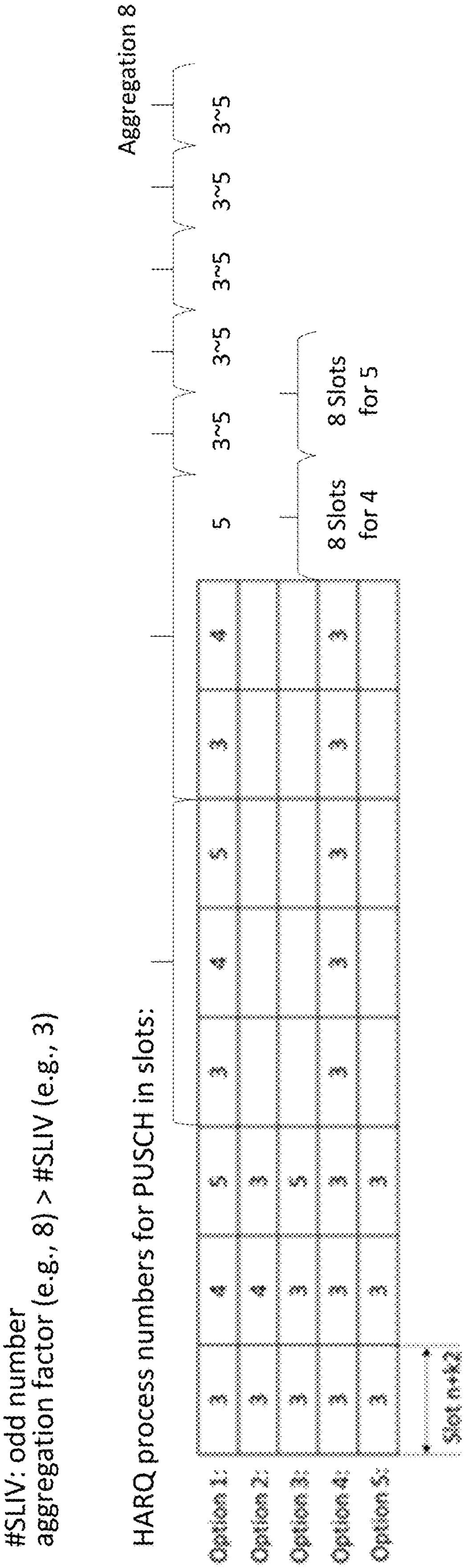
FIG. 16 is a diagram illustrating examples of a pattern, according to one exemplary embodiment.

FIGS. 14-16 show other examples of the pattern with respect to various options (e.g., Options 1-5). FIG. 14 shows examples of the pattern (of resource allocation, for example) across a plurality of slots, where the second number corresponding to the aggregation factor (e.g., a slot aggregation number with which the UE is configured) is smaller than or equal to the first number of SLIVs, and wherein the first number of SLIVs is an odd number. FIG. 15 shows examples of the pattern (of resource allocation, for example) across a plurality of slots, where the second number corresponding to the aggregation factor (e.g., a slot aggregation number with which the UE is configured) is larger than the first number of SLIVs. FIG. 16 shows examples of the pattern (of resource allocation, for example) across a plurality of slots, where the second number corresponding to the aggregation factor (e.g., a slot aggregation number with which the UE is configured) is larger than the first number of SLIVs, and wherein the first number of SLIVs is an odd number.

A second concept of the present disclosure is a limitation (e.g., a restriction) is applied. For example, the limitation may be applied to a UE and/or a network. The limitation may be that merely one of multi-PUSCHs functionality (e.g., multi-TB) or PUSCH aggregation/repetition functionality (e.g., PUSCH aggregation factor) can be configured and/or provided (for the UE, for example). For example, the limitation may be that the UE may not be configured and/or provided with both multi-PUSCHs functionality (e.g., multi-TB) and PUSCH aggregation/repetition functionality (e.g., PUSCH aggregation factor) concurrently (e.g., simultaneously). For example, the UE may be configured and/or provided with either multi-PUSCHs functionality (e.g., multi-TB) or PUSCH aggregation/repetition functionality (e.g., PUSCH aggregation factor).

In an example, if the UE is configured with a multi-PUSCHs functionality-related configuration (e.g., a multi-TB-related configuration), such as where pusch-TimeDomainAllocationListForMultiPUSCH-r16 is enabled, the UE is not expected (and/or does not expect) to be configured with PUSCH aggregation/repetition functionality. For example, the UE is not expected (and/or does not expect) to be configured with aggregation factor if the UE is configured with a multi-PUSCHs functionality-related configuration (e.g., a multi-TB-related configuration), such as where pusch-Time DomainAllocationListForMultiPUSCH-r16 is enabled. Alternatively and/or additionally, the UE is not expected (and/or does not expect) to be configured with repetition number if the UE is configured with a multi-PUSCHs functionality-related configuration (e.g., a multi-TB-related configuration), such as where pusch-TimeDomainAllocationListForMultiPUSCH-r16 is enabled.

In an example, if the UE is configured with PUSCH aggregation/repetition functionality (e.g., if the UE is configured with aggregation factor), the UE is not expected (and/or does not expect) to be configured with a multi-PUSCHs functionality-related configuration (e.g., a multi-TB-related configuration) (e.g., the UE is not expected and/or does not expect to enable pusch-TimeDomainAllocationListForMultiPUSCH-r16).

In some examples, the network is not configured to configure (e.g., the network is not allowed to configure, is prohibited from configuring, and/or is prevented from configuring) the UE with both a multi-PUSCHs functionality-related configuration (e.g., a multi-TB-related configuration) and a PUSCH aggregation/repetition configuration and/or parameter (e.g., an aggregation factor configuration and/or parameter), concurrently (e.g., simultaneously).

In some examples, in response to (and/or after) being configured with a multi-PDSCHs functionality-related configuration (e.g., a multi-TB-related configuration), the UE may ignore (and/or may not apply and/or implement) a PDSCH aggregation/repetition functionality-related configuration (e.g., an aggregation factor-related configuration). For example, the UE may ignore (e.g., the UE may not apply and/or implement) a PDSCH aggregation/repetition functionality-related configuration (e.g., an aggregation factor-related configuration) when the UE is configured with a multi-PDSCHs functionality-related configuration (e.g., a multi-TB-related configuration).

In some examples, in response to (and/or after) receiving a configuration of both multi-PDSCHs functionality (e.g., multi-TB) and PDSCH aggregation/repetition functionality (e.g., PDSCH aggregation factor), the UE may report (e.g., transmit) a message to the network for reconfiguration. For example, the UE may report the message to the network for reconfiguration in response to being configured with both multi-PDSCHs functionality (e.g., multi-TB) and PDSCH aggregation/repetition functionality (e.g., PDSCH aggregation factor) concurrently (e.g., simultaneously). In some examples, in response to receiving the message, the network may configure the UE with merely one of multi-PDSCHs functionality (e.g., multi-TB) and PDSCH aggregation/repetition functionality (e.g., PDSCH aggregation factor).

To enhance 3GPP specification for wireless communication in accordance with some embodiments herein, Enhancements 1-7 are provided herein. Enhancements 1-7 are reflective of implementation in accordance with some embodiments herein, and comprise additions to various sections of 3GPP specifications. According to some embodiments, one, some and/or all of Enhancements 1-7 may be implemented and/or a portion of one, some and/or all of Enhancements 1-7 may be implemented.

Enhancement 1 comprises an addition to 3GPP TS 38.331 V16.2.0. An original portion of 3GPP TS 38.331 V16.2.0, without any addition of Enhancement 1, is quoted in the following quotation (some parts of the original portion are not included in the quotation):

PUSCH-Config

The IE PUSCH-Config is used to configure the UE specific PUSCH parameters applicable to a particular BWP.

PUSCH-Config Information Element

```
-- ASN1START
-- TAG-PUSCH-CONFIG-START
PUSCH-Config ::=                SEQUENCE {
  . . .
  pusch-TimeDomainAllocationList          SetupRelease { PUSCH-
TimeDomainResourceAllocationList }        OPTIONAL,    -- Need M
  pusch-AggregationFactor                 ENUMERATED { n2, n4, n8 }
OPTIONAL,    -- Need S
. . .
```

pusch-AggregationFactor

Number of repetitions for data (see TS 38.214 [19], clause 6.1.2.1). If the field is absent the UE applies the value 1.

In Enhancement 1, addition 1 is made to the original portion of 3GPP TS 38.331 V16.2.0 in accordance with some embodiments of the present disclosure. To distinguish addition 1 from what is originally included in the original portion of 3GPP TS 38.331 V16.2.0, addition 1 is in bold, and is preceded by the term “ADDITION 1 STARTS:” and followed by the term “ADDITION 1 ENDS”.

Enhancement 1:

PUSCH-Config

The IE PUSCH-Config is used to configure the UE specific PUSCH parameters applicable to a particular BWP.

PUSCH-Config Information Element

```
-- ASN1START
-- TAG-PUSCH-CONFIG-START
PUSCH-Config ::=                        SEQUENCE {
    ...
    pusch-TimeDomainAllocationList          SetupRelease { PUSCH-
TimeDomainResourceAllocationList }              OPTIONAL,    -- Need M
    pusch-AggregationFactor                 ENUMERATED { n2, n4, n8 }
OPTIONAL,    -- Need S
...
```

pusch-AggregationFactor

Number of repetitions for data (see TS 38.214 [19], clause 6.1.2.1). If the field is absent the UE applies the value 1. ADDITION 1 STARTS: If pusch-TimeDomainAllocation-ListForMultiPUSCH-r16 is configured, the field is absent. Addition 1 Ends For example, Enhancement 1 provides that if pusch-TimeDomainAllocationListForMultiPUSCH-r16 is configured (for the UE, for example), a field (e.g., pusch-AggregationFactor field) is absent (e.g., absent from the PUSCH-Config information element). For example, the PUSCH-Config information element may be configured (by the network, for example) such that the field (e.g., pusch-AggregationFactor field) is absent when the UE is configured with pusch-TimeDomainAllocationListForMulti-PUSCH-r16.

Enhancement 2 comprises an addition (Addition 2) to Section 6.1.2.1 of 3GPP TS 38.214 V16.3.0. Section 6.1.2.1 of 3GPP TS 38.214 V16.3.0 is entitled Resource allocation in time domain.

Enhancement 2:

Addition 2 Starts:

If a UE is configured with higher layer parameter pusch-TimeDomainAllocationListForMultiPUSCH-r16, the UE does not expect to be configured with pusch-Aggregation-Factor.

Addition 2 Ends

Enhancement 3 comprises an addition to Section 6.1.2.1 of 3GPP TS 38.214 V16.3.0. An original portion of Section 6.1.2.1 of 3GPP TS 38.214 V16.3.0, without any addition of Enhancement 3, is quoted in the following quotation (some parts of the original portion are not included in the quotation):

6.1.2 Resource allocation 6.1.2.1 Resource allocation in time domain

. . .

For PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as

- if numberOfRepetitions-r16 is present in the resource allocation table, the number of repetitions K is equal to numberOfRepetitions-r16;
- elseif the UE is configured with pusch-AggregationFactor, the number of repetitions K is equal to pusch-AggregationFactor;
- otherwise K=1.

In Enhancement 3, addition 3 is made to the original portion of Section 6.1.2.1 of 3GPP TS 38.214 V16.3.0 in accordance with some embodiments of the present disclosure. To distinguish addition 3 from what is originally included in the original portion of Section 6.1.2.1 of 3GPP TS 38.214 V16.3.0, addition 3 is in bold, and is preceded by the term “ADDITION 3 STARTS:” and followed by the term “ADDITION 3 ENDS”.

Enhancement 3:

6.1.2 Resource Allocation 6.1.2.1 Resource Allocation in Time Domain

. . .

For PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as

- if numberOfRepetitions-r16 is present in the resource allocation table, the number of repetitions K is equal to numberOfRepetitions-r16;
- elseif the UE is configured with pusch-AggregationFactor ADDITION 3 STARTS; and pusch-TimeDomainAllocationListForMultiPUSCH-r16 is not configured ADDITION 3 ENDS, the number of repetitions K is equal to pusch-AggregationFactor;
- otherwise K=1.

For example, Enhancement 3 provides that, if the UE is configured with pusch-AggregationFactor and pusch-Time-DomainAllocationListForMultiPUSCH-r16 is not configured (for the UE, for example), a number of repetitions K may be set to pusch-AggregationFactor.

Enhancement 4 comprises an addition to 3GPP TS 38.331 V16.2.0. An original portion of 3GPP TS 38.331 V16.2.0, without any addition of Enhancement 4, is quoted in the following quotation (some parts of the original portion are not included in the quotation):

PUSCH-Config

The IE PUSCH-Config is used to configure the UE specific PUSCH parameters applicable to a particular BWP.

PUSCH-Config Information Element

```
-- ASN1START
-- TAG-PUSCH-CONFIG-START
PUSCH-Config ::=                        SEQUENCE {
    ...
    pusch-TimeDomainAllocationList          SetupRelease { PUSCH-
TimeDomainResourceAllocationList }              OPTIONAL,    -- Need M
    pusch-AggregationFactor                 ENUMERATED { n2, n4, n8 }
OPTIONAL,    -- Need S
```

In Enhancement 4, addition 4 is made to the original portion of 3GPP TS 38.331 V16.2.0 in accordance with some embodiments of the present disclosure. To distinguish addition 4 from what is originally included in the original portion of 3GPP TS 38.331 V16.2.0, addition 4 is in bold, and is preceded by the term "ADDITION 4 STARTS:" and followed by the term "ADDITION 4 ENDS".

Enhancement 4:

PUSCH-Config

The IE PUSCH-Config is used to configure the UE specific PUSCH parameters applicable to a particular BWP.

PUSCH-Config Information Element

```
-- ASN1START
-- TAG-PUSCH-CONFIG-START
PUSCH-Config ::=                    SEQUENCE {
    ...
    pusch-TimeDomainAllocationList              SetupRelease { PUSCH-
TimeDomainResourceAllocationList }              OPTIONAL,    -- Need M
    pusch-AggregationFactor                     ENUMERATED { n2, n4, n8 }
OPTIONAL,    -- Need S ADDITION 4 STARTS: , and Cond NotFormat01-02-Or-
TypeA ADDITION 4 ENDS
```

A third concept of the present disclosure is determining, based on a first number of SLIVs, whether to apply a second number corresponding to a slot aggregation factor. For example, whether to apply the second number (corresponding to the slot aggregation factor) is determined based on the first number of SLIVs. In an example, if the first number of SLIVs is equal to a first defined number (and/or if the first number of SLIVs is a number of a first defined set of numbers), the second number corresponding to the slot aggregation factor may be applied. Alternatively and/or additionally, if the first number of SLIVs is equal to a second defined number (and/or if the second number of SLIVs is a number of a second defined set of numbers), the second number corresponding to the slot aggregation factor may not be applied.

In some examples, the first defined number is 1. Alternatively and/or additionally, the first defined set of numbers may comprise 1.

In some examples, the first defined number is an integer that is divisible by the second number corresponding to the slot aggregation factor (e.g., dividing the first defined number by the second number corresponding to the slot aggregation factor leaves no remainder). Alternatively and/or additionally, the first defined set of numbers may comprise one or more integers that are divisible by the second number corresponding to the slot aggregation factor.

In an example, if the second number corresponding to the slot aggregation factor is 2, the first defined number may be 1. Alternatively and/or additionally, if the second number corresponding to the slot aggregation factor is 2, the first set of defined numbers may comprise 1 and/or one or more integers (e.g., one or more even integers) larger than or equal to 2.

A table 1700 associated with example scenarios is illustrated in FIG. 17. In some examples, if the UE is not configured with pusch-AggregationFactor (associated with PUSCH aggregation/repetition functionality, for example), a repetition number/aggregation number "K" is equal to one. The repetition number/aggregation number "K" may correspond to an aggregation factor (e.g., a PUSCH aggregation factor) and/or a repetition factor (e.g., a PUSCH repetition factor). If UE is configured with pusch-AggregationFactor (associated with PUSCH aggregation/repetition functionality, for example), and is configured with a first list (e.g., a multi-TB list associated with multi-PUSCHs functionality) with an entry (e.g., at least one entry) indicative of multiple SLIVs (such as the list 600 in FIG. 6), a repetition number/aggregation number "K" for the one entry is 1, and/or the repetition number/aggregation number "K" for the entry is not equal to (and/or is not based on) pusch-Aggregation-Factor. Alternatively and/or additionally, if UE is configured with pusch-AggregationFactor (associated with PUSCH aggregation/repetition functionality, for example), and is configured with a first list (e.g., a multi-TB list associated with multi-PUSCHs functionality) with an entry (e.g., at least one entry) indicative of multiple SLIVs (such as the list 600 in FIG. 6), a repetition number/aggregation number "K" for one or more entries in the list is 1, and/or the UE ignores and/or does not apply pusch-AggregationFactor for determining repetition number/aggregation number "K". For one or more entries, of the first list, that are indicative of a single SLIV (e.g., merely a single SLIV), a repetition number/aggregation number "K" may be equal to (and/or based on) pusch-AggregationFactor. If the UE is configured with pusch-AggregationFactor, and is configured with a second list (e.g., a single-TB list that is not associated with multi-PUSCHs functionality), a repetition number/aggregation number "K" is equal to (and/or based on) pusch-AggregationFactor (e.g., the repetition number/aggregation number "K" is equal to and/or based on pusch-AggregationFactor for each entry of the second list). A design similar to a design for PUSCH can also applied in PDSCH. One or more of the techniques provided herein with respect to PUSCH may be applied in PDSCH.

Enhancements 5-7 comprises additions to Section 6.1.2.1 of 3GPP TS 38.214 V16.3.0. An original portion of Section 6.1.2.1 of 3GPP TS 38.214 V16.3.0, without any additions of Enhancement 5-7, is quoted in the following quotation (some parts of the original portion are not included in the quotation):

6.1.2 Resource Allocation 6.1.2.1 Resource Allocation in Time Domain

. . .

For PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as

- if numberOfRepetitions-r16 is present in the resource allocation table, the number of repetitions K is equal to numberOfRepetitions-r16;
- elseif the UE is configured with pusch-AggregationFactor, the number of repetitions K is equal to pusch-AggregationFactor;
- otherwise K=1.

In Enhancement 5, addition 5 is made to the original portion of Section 6.1.2.1 of 3GPP TS 38.214 V16.3.0 in accordance with some embodiments of the present disclosure. To distinguish addition 5 from what is originally included in the original portion of Section 6.1.2.1 of 3GPP TS 38.214 V16.3.0, addition 5 is in bold, and is preceded by the term "ADDITION 5 STARTS:" and followed by the term "ADDITION 5 ENDS".

Enhancement 5:

6.1.2 Resource Allocation 6.1.2.1 Resource Allocation in Time Domain

. . .

For PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as if numberOfRepetitions-r16 is present in the resource allocation table, the number of repetitions K is equal to numberOfRepetitions-r16;

elseif the UE is configured with pusch-AggregationFactor ADDITION 5 STARTS; and the DCI indicates row in PUSCH-TimeDomainResourceAllocationList-r16, if any, in pusch-Config which the row indicates resource allocation for one PUSCH ADDITION 5 ENDS, the number of repetitions K is equal to pusch-AggregationFactor;

otherwise K=1.

For example, Enhancement 5 provides that, if the UE is configured with pusch-AggregationFactor and a DCI (received by the UE, for example) indicates a row (e.g., an entry) in pusch-TimeDomainAllocationListForMulti-PUSCH-r16 that indicates resource allocation for one PUSCH (e.g., not more than one PUSCH), a number of repetitions K may be set to pusch-AggregationFactor.

In Enhancement 6, addition 6 is made to the original portion of Section 6.1.2.1 of 3GPP TS 38.214 V16.3.0 in accordance with some embodiments of the present disclosure. To distinguish addition 6 from what is originally included in the original portion of Section 6.1.2.1 of 3GPP TS 38.214 V16.3.0, addition 6 is in bold, and is preceded by the term "ADDITION 6 STARTS:" and followed by the term "ADDITION 6 ENDS".

Enhancement 6:

6.1.2 Resource Allocation 6.1.2.1 Resource Allocation in Time Domain

. . .

For PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as if numberOfRepetitions-r16 is present in the resource allocation table, the number of repetitions K is equal to numberOfRepetitions-r16;

elseif the UE is configured with pusch-AggregationFactor ADDITION 5 STARTS; and the DCI schedules one PUSCH ADDITION 6 ENDS, the number of repetitions K is equal to pusch-AggregationFactor;

otherwise K=1.

For example, Enhancement 6 provides that, if the UE is configured with pusch-AggregationFactor and a DCI (received by the UE, for example) schedules one PUSCH (e.g., not more than one PUSCH), a number of repetitions K may be set to pusch-AggregationFactor.

In Enhancement 7, addition 7 is made to the original portion of Section 6.1.2.1 of 3GPP TS 38.214 V16.3.0 in accordance with some embodiments of the present disclosure. To distinguish addition 7 from what is originally included in the original portion of Section 6.1.2.1 of 3GPP TS 38.214 V16.3.0, addition 7 is in bold, and is preceded by the term "ADDITION 7 STARTS:" and followed by the term "ADDITION 7 ENDS".

Enhancement 7:

6.1.2 Resource Allocation 6.1.2.1 Resource Allocation in Time Domain

. . .

For PUSCH repetition Type A, when transmitting PUSCH scheduled by DCI format 0_1 or 0_2 in PDCCH with CRC scrambled with C-RNTI, MCS-C-RNTI, or CS-RNTI with NDI=1, the number of repetitions K is determined as if numberOfRepetitions-r16 is present in the resource allocation table, the number of repetitions K is equal to numberOfRepetitions-r16;

elseif the UE is configured with pusch-AggregationFactor and the DCI schedules one PUSCH according to row in PUSCH-TimeDomainResourceAllocationList-r16, if any, in pusch-Config, the number of repetitions K is equal to pusch-AggregationFactor;

otherwise K=1.

For example, Enhancement 7 provides that, if the UE is configured with pusch-AggregationFactor and a DCI (received by the UE, for example) schedules one PUSCH (e.g., not more than one PUSCH) according to a row (e.g., an entry) in pusch-TimeDomainAllocationListForMulti-PUSCH-r16, a number of repetitions K may be set to pusch-AggregationFactor.

Example Scenario 1

A UE receives a configuration from a network (e.g., the configuration is configured by the network) for configuring a list of time resource allocations (e.g., the UE is configured with the list of time resource allocations via the configuration). At least one entry in the list indicates multiple time resource allocations for multiple HARQ process numbers. The UE receives a second configuration from the network (e.g., the second configuration is configured by the network) for configuring an aggregation factor (e.g., the UE is configured with the aggregation factor via the second configuration). The UE receives a DCI indicating an entry (e.g., one entry) in the list. The entry indicates one or more time resource allocations amounting to a number of time resource allocations. The UE performs transmission or reception on one or more time occasions. An association between each time occasion of the one or more time occasions and a TB, a HARQ process number and/or a time resource allocation is determined based on a pattern.

In some examples, a value of the aggregation factor is larger than one.

In some examples, a number of time resource allocations of the one or more time resource allocations indicated by the entry is larger than one.

In some examples, the UE operates with shared spectrum channel access on a carrier and/or a cell.

In some examples, a length of the pattern (e.g., a number of time occasions of the pattern) is equal to (and/or based on) the number of time resource allocations of the one or more time resource allocations indicated by the DCI.

In some examples, the length of the pattern is equal to (and/or based on) the number of time resource allocations of the one or more time resource allocations indicated by the DCI multiplied by the aggregation factor (i.e., the length of the pattern is equal to and/or based on a product of the number of time resource allocations and the aggregation factor).

In some examples, the length of the pattern is fixed, specified and/or configured (e.g., pre-configured) by the network.

In some examples, the pattern is that (and/or comprises) the one or more time resource allocations indicated by the DCI are repeated sequentially (over the one or more time occasions, for example) until a number of time occasions of the pattern is equal to the aggregation factor (such as shown in FIG. 13 with respect to Option 4 in an example in which the one or more time resource allocations are SLIVs and the one or more time occasions are slots).

In some examples, the pattern is that (and/or comprises) an m-th time resource allocation of the one or more time resource allocations is applied on a set of time occasions comprising an m-th time occasion of the one or more time occasions, an n-th time occasion of the one or more time occasions (wherein n is equal to m plus the number of time resource allocations), . . . , an o-th time occasion of the one or more time occasions (wherein o is equal to m plus a product of the number of time resource allocations and a number equal to the aggregation factor minus 1, i.e., o is equal to m+the number of time resource allocations×(the aggregation factor−1)), wherein the set of time occasions are within the length of the pattern.

In some examples, the pattern is that (and/or comprises) one or more first time resource allocations of the one or more time resource allocations indicated by the DCI are repeated cyclically (over the one or more time occasions, for example), such as shown in FIG. 13 with respect to Option 2 in an example in which the one or more time resource allocations are SLIVs and the one or more time occasions are slots.

In some examples, a second number of time resource allocations of the one or more first time resource allocations (of the one or more time resource allocations) is determined based on a length of the pattern divided by the aggregation factor (e.g., with a floor operation, such as where a value equal to the length of the pattern divided by the aggregation factor is rounded down to a nearest integer if the value is not an integer).

In some examples, the length of the pattern is larger than or equal to the aggregation factor.

In some examples, the pattern is that (and/or comprises) an m-th time resource allocation of the one or more first time resource allocations (of the one or more time resource allocations) is applied on a set of time occasions comprising an m-th time occasion of the one or more time occasions, an n-th time occasion of the one or more time occasions (wherein n is equal to m plus a number, such as the second number of time resource allocations), . . . , an o-th time occasion of the one or more time occasions (wherein o is equal to m plus a product of i and a number, such as the second number of time resource allocations), wherein the set of time occasions are within the length of the pattern, and wherein i is a positive integer.

In some examples, the pattern is that (and/or comprises) a subset of time resource allocations of the one or more time resource allocations indicated by the DCI is repeated sequentially (such as shown in FIG. 13 with respect to Option 3 and/or Option 5 in examples in which the one or more time resource allocations are SLIVs and the one or more time occasions are slots), wherein a second number of time resource allocations of the subset of time resource allocation is smaller than or equal to the number of time resource allocations of the one or more time resource allocations.

In some examples, the subset of time resource allocations of the one or more time resource allocations indicated by the DCI comprises a 1st time resource allocation of the one or more time resource allocations, an m-th time resource allocation of the one or more time resource allocations (wherein m is equal to 1 plus a product of i and the aggregation factor, i.e., m is equal to 1+i×the aggregation factor), wherein the subset of time resource allocations are applied to the one or more time occasions within the length of the pattern, and wherein i is a positive integer.

In some examples, the length of the pattern is larger than or equal to the aggregation factor.

In some examples, the pattern comprises a 1st time resource allocation of the one or more time resource allocations repeating from a 1st time occasion of the one or more time occasions to an m-th time occasion of the one or more time occasions (wherein m is equal to the aggregation factor), and an n-th time resource allocation of the one or more time resource allocations repeating from an n-th time occasion to a p-th time occasion (wherein n is equal to 1 plus a product of i and the aggregation factor (i.e., n is equal to 1+i×the aggregation factor), and p is equal to 1 plus a product of a number and the aggregation factor (i.e., p is equal to 1+the number×the aggregation factor), wherein the number is equal to i+1) and/or until the length of the pattern (e.g., i may be a positive integer).

In some examples, the pattern is that (and/or comprises) one time resource allocation of the one or more time resource allocations is repeated one or more times, wherein a number of times of the one or more times is equal to the aggregation factor.

In some examples, the pattern is that (and/or comprises) each time resource allocation of the one or more time resource allocations is repeated one or more times sequentially, wherein a number of times of the one or more times is equal to the aggregation factor.

In some examples, the pattern is that (and/or comprises) an m-th time resource allocation corresponds to a set of time occasions from an n-th time occasion of the one or more time occasions (wherein n is equal to 1 plus a product of the aggregation factor and a number, i.e., n is equal to 1+the aggregation factor×the number, wherein the number is equal to m minus 1) to an o-th time occasion (wherein o is equal to 1 plus a product of the aggregation factor and m, i.e., o is equal to 1+the aggregation factor×m), wherein the set of time occasions are within the length of the pattern.

In some examples, the pattern is that (and/or comprises) one or more first time resource allocations of the one or more time resource allocations indicated by the DCI are repeated sequentially.

In some examples, a second number of time resource allocations of the one or more first time resource allocations (of the one or more time resource allocations) is determined based on a length of the pattern divided by the aggregation factor (e.g., with a floor operation, such as where a value equal to the length of the pattern divided by the aggregation factor is rounded down to a nearest integer if the value is not an integer).

In some examples, the length of the pattern is larger than or equal to the aggregation factor.

In some examples, the pattern is that (and/or comprises) an m-th time resource allocation of the one or more first time resource allocations (of the one or more time resource allocations) is applied on a set of time occasions from an n-th time occasion of the one or more time occasions (wherein n is equal to 1 plus a product of the aggregation factor and a number, i.e., n is equal to 1+the aggregation factor×the number, wherein the number is equal to m minus 1) to a p-th time occasion of the one or more time occasions (wherein p is equal to 1 plus a product of the aggregation factor and m, i.e., p is equal to 1+the aggregation factor×m), wherein the set of time occasions are within the length of the pattern.

Example Scenario 2

In some examples, a UE receives a first information (e.g., a configuration and/or a signal) from a network to configure one or more different time resource allocations for transmission or reception of different data (e.g., different sets of data, such as different TBs).

Alternatively and/or additionally, the UE may receive a second information (e.g., a configuration and/or a signal) from the network to configure a repetition number (e.g. aggregation factor) used for repeatedly transmitting or receiving the same data (e.g. repeatedly transmitting at least one of the same TB, the same MAC PDU, etc.), wherein the same data may be repeatedly transmitted with the same redundancy version or with different redundancy versions.

Alternatively and/or additionally, the UE may receive a DCI from the network indicating a first HARQ process (e.g., a specific HARQ process) for data transmission or reception and indicating information associated with one or more time resource allocations (and/or associated with a first number of time resource allocations of the one or more time resource allocations).

Alternatively and/or additionally, the UE may transmit or receive different sets of data comprising a set of data "data 1" to a set of data "data X" (e.g., data 1, data 2, . . . , data X), repeatedly with the repetition number by using the first HARQ process and one or more other HARQ processes on the one or more time resource allocations.

In some examples, the UE transmits or receives the different sets of data via a data pattern comprising [data 1, data 1, . . . , data 2, data 2, . . . , data X−1, data X−1, . . . , data X, data X, . . . ] or [data 1, data 2, . . . , data X, data 1, data 2, . . . , data X, data 1, data 2, . . . , data X, . . . ].

In some examples, the repetition number is K, an ID of the first HARQ process is N and one or more IDs of the one or more other HARQ processes used for the data pattern are values shown in Example 1, Example 2, and Example 3 below (e.g., the values shown below may be determined using a modulo operation with a third number, such as a number of HARQ process numbers supported and/or used by the UE and/or a number of HARQ process numbers that the UE is configured with):

Example 1: [N, N, . . . , N, N+1, N+1, . . . , N+1, N+2, N+2, . . . ]

Example 2: [N, N, . . . , N, N+K, N+K, . . . , N+K, N+2K, N+2K, . . . ]

Example 3: [N, N+1, N+2, . . . , N+X, N, N+1, N+2, . . . ].

In some examples, the first information and the second information are carried in the same message.

In some examples, the one or more time resource allocations are used for repeating data transmission or reception indicated by the DCI if a total number of data transmissions or receptions is larger than or equal to the first number of time resource allocations.

Example Scenario 3

A network transmits a first signal to a UE for configuring a list of time resource allocations. At least one entry in the list indicates multiple time resource allocations for multiple TBs and/or multiple HARQ process numbers. The network transmits a second signal to the UE for configuring an aggregation factor. The network is not configured to configure (e.g., is not allowed to configure, is prevented from configuring and/or is prohibited from configuring) the aggregation factor. Alternatively and/or additionally, the network may not be configured to configure (e.g., is not allowed to configure, is prevented from configuring and/or is prohibited from configuring) the aggregation factor to be larger than one. The network transmits a DCI, to the UE, indicative of an entry (e.g., one entry) in the list, wherein the entry indicates one or more time resource allocations. The network performs reception or transmission on one or more time occasions. A number of time occasions of the one or more time occasions is equal to (and/or based on) a number of time resource allocations of the one or more time resource allocations.

Example Scenario 4

A UE receives a first configuration, from a network, for configuring a list of time resource allocations. At least one entry in the list indicates multiple time resource allocations for multiple TBs and/or multiple HARQ process numbers. The UE receives a second configuration, from the network (or from a second network), for configuring an aggregation factor. The UE does not expect to be configured with the aggregation factor. Alternatively and/or additionally, the UE may not expect to be configured with the aggregation factor being larger than one. The UE receives a DCI indicating an entry (e.g., one entry) in the list, wherein the entry indicates one or more time resource allocations. The UE performs transmission or reception on one or more time occasions. A number of time occasions of the one or more time occasions is equal to (and/or based on) a number of time resource allocations of the one or more time resource allocations.

With respect to Example Scenario 3 and Example Scenario 4, in some examples, the network and/or the UE operate with shared spectrum channel access on a carrier and/or a cell.

In some examples, the first signal and the second signal are carried in the same message (e.g., the same message, transmitted to the UE, comprises the first signal and the second signal).

In some examples, each TB of the multiple TBs is transmitted or received, by the UE, at least once (via the one or more time occasions, for example).

In some examples, each TB of the multiple TBs is transmitted or received, by the UE, merely once (via the one or more time occasions, for example).

In some examples, TBs of the multiple TBs (e.g., some and/or all TBs of the multiple TBs) are transmitted or received by the UE in consecutive slots in time domain.

In some examples, each TB of the multiple TBs is associated with a time resource allocation of the one or more time resource allocations. For example, each TB of the multiple TBs may be associated with a different time resource allocation of the one or more time resource allocations. For example, each TB of the multiple TBs is associated with a time resource allocation, of the one or more time resource allocations, that is different from other time resource allocations (of the one or more time resource allocations) associated with other TBs of the multiple TBs. For example, at least one of a first TB of the multiple TBs may be associated with a first time resource allocation of the one or more time resource allocations, a second TB of the multiple TBs may be associated with a second time resource allocation of the one or more time resource allocations (wherein the second time resource allocation is different from the first time resource allocation), etc.

Example Scenario 5

A UE receives a configuration from a network (e.g., the configuration is configured by the network) for configuring a list of time resource allocations (e.g., the UE is configured with the list of time resource allocations via the configuration). At least one entry in the list indicates multiple time resource allocations for multiple TBs and/or multiple HARQ process numbers. The UE receives a second configuration from the network (e.g., the second configuration is configured by the network) for configuring an aggregation factor (e.g., the UE is configured with the aggregation factor via the second configuration). The UE receives a DCI indicating an entry (e.g., one entry) in the list. The entry indicates one or more time resource allocations amounting to a number of time resource allocations. The UE determines a repetition number based on the aggregation factor and the number of time resource allocations (and/or based on other information in addition to the aggregation factor and the number of time resource allocations).

In some examples, if the number of time resource allocations is a first defined number, the repetition number is according to the aggregation factor (e.g., the repetition number is equal to and/or based on the aggregation factor).

In some examples, the first defined number is one.

In some examples, if the number of time resource allocations is not the first defined number, the repetition number is 1 and/or is not based on the aggregation factor.

In some examples, the repetition number corresponds to a number of times the UE transmits data (e.g., a TB) in response to the DCI.

In some examples, the UE transmits multiple TBs based on the one or more time resource allocations indicated by the entry.

In some examples, each TB of the multiple TBs is associated with a time resource allocation of the one or more time resource allocations. For example, each TB of the multiple TBs may be associated with a different time resource allocation of the one or more time resource allocations. For example, each TB of the multiple TBs is associated with a time resource allocation, of the one or more time resource allocations, that is different from other time resource allocations (of the one or more time resource allocations) associated with other TBs of the multiple TBs. For example, at least one of a first TB of the multiple TBs may be associated with a first time resource allocation of the one or more time resource allocations, a second TB of the multiple TBs may be associated with a second time resource allocation of the one or more time resource allocations (wherein the second time resource allocation is different from the first time resource allocation), etc.

In some examples, either the UE transmits a single TB multiple times or the UE transmits multiple TBs (e.g., multiple different TBs), wherein a number of TBs of the multiple TBs is based on the number of time resource allocations.

In some examples, if the number of time resource allocations is a first defined number, the UE transmits a single TB multiple times based on the aggregation factor (e.g., the UE may transmit the single TB multiple times based on the DCI).

In some examples, the first defined number is one.

In some examples, if the number of time resource allocations is not the first defined number, the UE transmits multiple TBs (e.g., multiple different TBs), wherein a number of TBs of the multiple TBs is based on the number of time resource allocations (e.g., the UE may transmit the multiple TBs based on the DCI).

In some examples, the multiple TBs are associated with the multiple time resource allocations, respectively. For example, at least one of a first TB of the multiple TBs may be associated with a first time resource allocation of the multiple time resource allocations (e.g., the first TB may be transmitted via the first time resource allocation), a second TB of the multiple TBs may be associated with a second time resource allocation of the multiple time resource allocations (e.g., the second TB may be transmitted via the second time resource allocation), etc.

In some examples, in response to the DCI and/or the one or more time resource allocations indicated by the entry (and/or based on the DCI and/or the one or more time resource allocations indicated by the entry), the UE either transmits (or receives) a single TB multiple times or the UE transmits multiple TBs.

In some examples, the UE transmits or receives a single TB multiple times when the number of time resource allocations is a first defined number, wherein a number of times of the multiple times (that the single TB is transmitted or received) is equal to (and/or based on) the aggregation factor.

In some examples, the first defined number is one.

In some examples, the UE transmits multiple TBs when the number of time resource allocations is not the first defined number, wherein a number of TBs of the multiple TBs is equal to the number of time resource allocations.

In some examples, the UE performs transmission or reception on one or more time occasions.

In some examples, a number of time occasions of the one or more time occasions is equal to (and/or based on) the aggregation factor if the number of time resource allocations (of the one or more time resource allocations indicated by the entry) is a first defined number.

In some examples, the first defined number is one.

In some examples, if the number of time resource allocations indicated by the entry is not the first defined number, the number of time occasions of the one or more time occasions is not equal to (and/or is not based on) the aggregation factor.

In some examples, if the number of time resource allocations indicated by the entry is not the first defined number, the number of time occasions the one or more time occasions is equal to (and/or based on) the number of aggregation factor.

In some examples, the UE performs transmission or reception on one or more time occasions, wherein a number of time occasions of the one or more time occasions is determined based on either the number of time resource allocations or the aggregation factor In some examples, when the number of time resource allocations indicated by the entry is a first defined number, the number of time occasions is equal to (and/or based on) the aggregation factor.

In some examples, the first defined number is one.

In some examples, when the number of time resource allocations indicated by the entry is not the first defined number, the number of time occasions is equal to (and/or based on) the number of time resource allocations.

In some examples, the UE performs transmission or reception on one or more time occasions, wherein whether the one or more time occasions are associated with a single HARQ process number or are associated with multiple HARQ process numbers is based on the number of time resource allocations.

In some examples, the one or more time occasions are associated with the number of time resource allocations and/or the aggregation factor.

In some examples, the one or more time occasions are associated with a single HARQ process number (e.g., each time occasion of the one or more time occasions corresponds to the single HARQ process number), different time occasions (of the one or more time occasions, for example) are associated with a single TB (e.g., each time occasion of the different time occasions corresponds to the same TB), and/or a number of time occasions of the one or more time occasions is equal to (and/or based on) the aggregation factor.

In some examples, when the number of time resource allocations is a first defined number, the one or more time occasions are associated with a single HARQ process number (e.g., each time occasion of the one or more time occasions corresponds to the single HARQ process number), different time occasions (of the one or more time occasions, for example) are associated with a single TB (e.g., each time occasion of the different time occasions corresponds to the same TB), and/or the number of time occasions of the one or more time occasions is equal to (and/or based on) the aggregation factor In some examples, the one or more time occasions are associated with multiple HARQ process numbers, different time occasions (of the one or more time occasions, for example) are associated with multiple TBs (e.g., the different time occasions are associated with different TBs, such as where a first time occasion of the different time occasions is associated with a first TB and a second time occasion of the different time occasions is associated with a second TB), and/or a number of time occasions of the one or more time occasions is equal to (and/or based on) the number of time resource allocations.

In some examples, when the number of time resource allocations is not the first defined number, the one or more time occasions are associated with multiple HARQ process numbers, different time occasions (of the one or more time occasions, for example) are associated with multiple TBs (e.g., the different time occasions are associated with different TBs, such as where a first time occasion of the different time occasions is associated with a first TB and a second time occasion of the different time occasions is associated with a second TB), and/or a number of time occasions of the one or more time occasions is equal to (and/or based on) the number of time resource allocations.

In some examples, the first defined number is one.

In some examples, the number of time resource allocations not being the first defined number implies that the number of time resource allocations is larger than the first defined number.

In some examples, the first defined number is equal to a number (e.g., an integer) divided by the number of time resource allocations (of the one or more time resource allocations). In some examples, the first defined number is an integer (e.g., the number may be divided by the number of time resource allocations with a ceiling operation or a floor operation to determine the first defined number without a remainder). Alternatively and/or additionally, the first defined number may comprise a set of defined numbers (wherein each defined number of the set of defined numbers is an integer, for example).

In some examples, the UE performs retransmission on one or more time occasions, wherein whether the one or more time occasions are associated with a single HARQ process number or are associated with multiple HARQ process numbers is based on a number of time resource allocations of the one or more time resource allocations.

In some examples, the one or more time occasions are associated with the first HARQ process number (e.g., each time occasion of the one or more time occasions corresponds to the first HARQ process number). For example, the one or more time occasions are associated with the first HARQ process number when the number of time resource allocations is one (e.g., each time occasion of the one or more time occasions corresponds to the first HARQ process number when the number of time resource allocations is one).

In some examples, the one or more time occasions are associated with multiple HARQ process numbers, wherein the multiple HARQ process numbers comprise the first HARQ process number (e.g., at least one time occasion of the one or more time occasions corresponds to the first HARQ process number). For example, when the number of time resource allocations is one, the one or more time occasions are associated with multiple HARQ process numbers, wherein the multiple HARQ process numbers comprise the first HARQ process number (e.g., at least one time occasion of the one or more time occasions corresponds to the first HARQ process number).

In some examples, the one or more time occasions are associated with multiple HARQ process numbers, wherein the multiple HARQ process numbers comprise the second HARQ process number (e.g., at least one time occasion of the one or more time occasions corresponds to the second HARQ process number). For example, when the number of time resource allocations is one, the one or more time occasions are associated with multiple HARQ process numbers, wherein the multiple HARQ process numbers comprise the second HARQ process number (e.g., at least one time occasion of the one or more time occasions corresponds to the second HARQ process number).

One, some and/or all of the foregoing techniques and/or embodiments can be formed to a new embodiment.

In some examples, embodiments disclosed herein, such as embodiments described with respect to the first concept, the second concept, the third concept, Example Scenario 1, Example Scenario 2, Example Scenario 3, Example Scenario 4 and Example Scenario 5, may be implemented independently and/or separately. Alternatively and/or additionally, a combination of embodiments described herein, such as embodiments described with respect to the first concept, the second concept, the third concept, Example Scenario 1, Example Scenario 2, Example Scenario 3, Example Scenario 4 and/or Example Scenario 5, may be implemented. Alternatively and/or additionally, a combination of embodiments described herein, such as embodiments described with respect to the first concept, the second concept, the third concept, Example Scenario 1, Example Scenario 2, Example Scenario 3, Example Scenario 4 and/or Example Scenario 5, may be implemented concurrently and/or simultaneously.

Various techniques, embodiments, methods and/or alternatives of the present disclosure may be performed independently and/or separately from one another. Alternatively and/or additionally, various techniques, embodiments, methods and/or alternatives of the present disclosure may be combined and/or implemented using a single system. Alternatively and/or additionally, various techniques, embodiments, methods and/or alternatives of the present disclosure may be implemented concurrently and/or simultaneously.

With respect to one or more embodiments herein, such as one or more techniques, devices, concepts, methods, example scenarios and/or alternatives described above, in some examples, the UE receives the DCI in slot n, and/or the DCI indicates a slot offset.

With respect to one or more embodiments herein, in some examples, the slot offset may indicate a slot for an initial scheduled time occasion associated with a first time resource allocation among the one or more time resource allocations (e.g., multiple time resource allocations) indicated by the DCI (e.g., the DCI is indicative of the entry, of the list, comprising the one or more time resource allocations), if the number of time resource allocation is larger than one.

With respect to one or more embodiments herein, in some examples, the slot offset may indicate a slot for the initial scheduled time occasion associated with a single time resource allocation indicated by the DCI, if the number of time resource allocations is one (e.g., if the one or more time resource allocations merely comprise the single time resource allocation).

With respect to one or more embodiments herein, in some examples, a time resource allocation (e.g., one time resource allocation) corresponds to a starting OFDM symbol, a length of OFDM symbols (e.g., a length of consecutive OFDM symbols), and/or a mapping type. In an example, the length of OFDM symbols may be a number of one or more OFDM symbols corresponding to the time resource allocation.

With respect to one or more embodiments herein, in some examples, a time occasion may be a slot, a mini-slot, a resource associated with a time resource allocation (e.g., one time resource allocation), a PUSCH or a PDSCH.

With respect to one or more embodiments herein, in some examples, a time resource allocation (e.g., one time resource allocation) corresponds to a SLIV index/number (e.g., one SLIV index/number, such as a SLIV index corresponding to a SLIV and/or a SLIV number corresponding to the SLIV).

With respect to one or more embodiments herein, in some examples, a time resource allocation (e.g., one time resource allocation) indicates one or more symbols (e.g., one or more consecutive symbols) in a slot.

With respect to one or more embodiments herein, in some examples, a time resource allocation (e.g., one time resource allocation) is indicated (e.g., represented) by a number of bits of a field (e.g., startSymbolAndLength or startSymbol-AndLength-r16).

With respect to one or more embodiments herein, in some examples, there are 105 time resource allocations (e.g., 105 candidate time resource allocations) within a slot.

With respect to one or more embodiments herein, in some examples, the number of bits is 7.

With respect to one or more embodiments herein, in some examples, the list of time resource allocations is used for indicating time resource allocation for uplink or downlink transmission.

With respect to one or more embodiments herein, in some examples, each entry in the list of time resource allocation indicates (e.g., comprises) up to a maximum number of time resource allocations. In an example, the maximum number of time resource allocations is 8.

With respect to one or more embodiments herein, in some examples, the DCI indicates a first HARQ process number (e.g., a specific HARQ process number).

With respect to one or more embodiments herein, in some examples, the first HARQ process number corresponds to one or more time occasions comprising an initial time occasion (e.g., an initial time occasion of one or more time occasions scheduled by the DCI) in time domain.

With respect to one or more embodiments herein, in some examples, the initial time occasion corresponds to a time resource allocation indicated by the entry (e.g., the one entry), such as an initial time resource allocation indicated by the entry.

With respect to one or more embodiments herein, in some examples, an m-th time resource allocation of the one or more time resource allocations indicated by the DCI corresponds to a HARQ process number equal to the first HARQ process number+m−1.

With respect to one or more embodiments herein, in some examples, one or more operations (e.g., at least one of an addition operation, a subtraction operation, etc.) associated with determining a HARQ process number may be applied with modulo operation of g. For example, in examples in which a HARQ process number is described as being equal to a number, the HARQ process number may be equal to the number modulo g. For example, if a HARQ process number is described herein as being equal to the first HARQ process number+m−1, the HARQ process number may be equal to (the first HARQ process number+m−1) modulo g. In an example in which the first HARQ process number=15, m=3 and g=16, the HARQ process number (described herein as being equal to the first HARQ process number+m−1) may be determined using a modulo operation and may be equal to (15+3−1) modulo 16=1.

With respect to one or more embodiments herein, in some examples, g corresponds to a number of HARQ processes, such as a total number of HARQ processes supported and/or used by the UE and/or a total number of HARQ processes that the UE is configured with (e.g., a number of HARQ processes that the UE can process, and/or a number of HARQ processes that the UE can simultaneously process). In an example, g corresponds to a number of HARQ process numbers, such as a total number of HARQ process numbers supported and/or used by the UE and/or a total number of HARQ process numbers that the UE is configured with (e.g., a number of HARQ process numbers that the UE can process, and/or a number of HARQ process numbers that the UE can simultaneously process).

With respect to one or more embodiments herein, in some examples, g (e.g., the number of HARQ processes and/or the number of HARQ process numbers) is equal to 16.

With respect to one or more embodiments herein, in some examples, the aggregation factor is associated with (e.g., used for) consecutive transmissions, consecutive time occasions and/or consecutive slots for transmitting a single TB. For example, the aggregation factor may be associated with (e.g., used for) configuring a number of consecutive transmissions of the consecutive transmissions (to be used for transmitting the single TB, for example), a number of consecutive time occasions of the consecutive time occasions (to be used for transmitting the single TB, for example) and/or a number of consecutive slots of the consecutive slots (to be used for transmitting the single TB, for example).

With respect to one or more embodiments herein, in some examples, the aggregation factor is associated with (e.g., used for) slot aggregation and/or transmission aggregation for a single TB.

With respect to one or more embodiments herein, in some examples, the aggregation factor is used for downlink transmission or uplink transmission.

With respect to one or more embodiments herein, in some examples, a value of the aggregation factor is a number (e.g., an integer) larger than 1. In an example, the aggregation factor is equal to $2^r$, wherein r is an integer larger than 0 (e.g., the aggregation factor may be one of 2, 4, 8, etc.).

With respect to one or more embodiments herein, in some examples, the aggregation factor is updated based on Radio Resource Control (RRC) signaling.

With respect to one or more embodiments herein, in some examples, an entry of the list (e.g., each entry in the list) does not comprise a parameter for configuring the aggregation factor.

With respect to one or more embodiments herein, in some examples, each entry of the list does not indicate the aggregation factor.

With respect to one or more embodiments herein, in some examples, if an entry of the list comprises one or more parameters for configuring the aggregation factor and/or if the aggregation factor is indicated by one or more entries in the list, the network is limited (e.g., restricted) to configuring the aggregation factor to be one.

With respect to one or more embodiments herein, in some examples, if an entry of the list comprises one or more parameters for configuring the aggregation factor and/or if the aggregation factor is indicated by one or more entries in the list, the network does not configure the aggregation factor (for the UE, for example).

With respect to one or more embodiments herein, in some examples, if an entry of the list comprises one or more parameters for configuring the aggregation factor and/or if the aggregation factor is indicated by one or more entries in the list, the network may make one or more parameters (associated with the aggregation factor, for example) absent (e.g., the network may not include the one or more parameters in a configuration for the UE).

With respect to one or more embodiments herein, in some examples, after the aggregation factor is configured (e.g., upon and/or in response to the aggregation factor being configured) a number of repetitions of a single TB and/or a number of repetitions of a single time resource allocation do not change (e.g., cannot be changed) based on a different entry indicated by the DCI, wherein the number of time resource allocations of the one or more time resource allocations indicated by the DCI may be 1.

With respect to one or more embodiments herein, in some examples, the initial time occasion (e.g., an initial time occasion of one or more time occasions scheduled by the DCI) corresponds to (e.g., comprises and/or is within) slot n+the slot offset (e.g., the slot offset may be "k2").

With respect to one or more embodiments herein, in some examples, the one or more time occasions correspond to (e.g., comprise and/or are within) slots comprising slot n+the slot offset, slot n+the slot offset+1, . . . , slot n+the slot offset+the aggregation factor−1 (e.g., the one or more time occasions may correspond to consecutive slots from slot n+the slot offset to slot n+the slot offset+the aggregation factor−1).

With respect to one or more embodiments herein, in some examples, the one or more time occasions correspond to (e.g., comprise and/or are within) slot n+the slot offset, slot n+the slot offset+1, . . . , slot n+the slot offset+the number of time resource allocations−1 (e.g., the number of time resource allocations is the number of time resource allocations of the one or more time resource allocations indicated by the DCI). For example, the one or more time occasions may correspond to consecutive slots from slot n+the slot offset to slot n+the slot offset+the number of time resource allocations−1.

With respect to one or more embodiments herein, in some examples, the DCI is scrambled by Cell Radio Network Temporary Identifier (C-RNTI) of the UE.

With respect to one or more embodiments herein, in some examples, the DCI indicates one or more new transmissions of one or more TBs. A new transmission may be an initial transmission of data and/or a transmission of data that is not a retransmission of data.

With respect to one or more embodiments herein, in some examples, the DCI indicates one or more transmissions of one or more TBs, wherein the one or more transmissions of the one or more TBs may be one or more new transmissions of the one or more TBs or one or more retransmissions of the one or more TBs. In an example, the DCI indicates four SLIVs (e.g., the DCI is indicative of an entry indicative of four SLIVs), and a first HARQ process number (e.g., a specific HARQ process) equal to 3. In the example, HARQ process numbers {3, 4, 5, 6} may be associated with the four SLIVs, respectively. In some examples, whether the one or more transmissions are one or more new transmissions or the one or more transmissions are one or more retransmissions is determined based on one or more New Data Indicator (NDI) values. A number of NDI values of the one or more NDI values may be equal to (and/or based on) the number of SLIVs (e.g., the number of NDI values may be four based on the number of SLIVs being four). The one or more NDI values are associated with HARQ process numbers {3, 4, 5, 6}, respectively. For example, each NDI value of the one or more NDI values may be associated with a HARQ process number of the HARQ process numbers {3, 4, 5, 6} (e.g., the NDI value may indicate whether the HARQ process number associated with the NDI value is for a new transmission or the HARQ process number is for a retransmission).

With respect to one or more embodiments herein, in some examples, regarding one or more entries (e.g., entry 5) in the list 600 of FIG. 6, the network may configure SLIVs from 0 to 105. For example, although the four SLIVs in entry 5 in the list 600 are shown as being contiguous with each other in FIG. 6 (e.g., the four SLIVs in entry 5 comprise {70, 71, 72, 73}), SLIVs of entry 5 are not limited to being contiguous SLIVs.

With respect to one or more embodiments herein, in some examples, for an uplink transmission in unlicensed spectrum, the uplink transmission may comprise (e.g., deliver and/or carry) an Uplink Control Information (UCI).

With respect to one or more embodiments herein, in some examples, the UCI indicates an NDI, a HARQ process number and/or a Redundancy Version (RV) index associated with the uplink transmission.

With respect to one or more embodiments herein, in some examples, the network indicates a part of an occupancy time to one or more UEs such that the one or more UEs perform uplink transmission during the part of the occupancy time.

With respect to one or more embodiments herein, in some examples, a Bandwidth Part (BWP) on the carrier comprises one or more consecutive LBT bandwidths on the carrier.

With respect to one or more embodiments herein, in some examples, an LBT bandwidth (e.g., one LBT bandwidth) is 20 MHz.

Throughout the present disclosure, if a first number is equal to a second number, this may imply that the first number is the same as the second number. For example, if a number of time resource allocations is equal to a defined number, the number of time resource allocations may be the same as the defined number.

Throughout the present disclosure, if a first number is a second number, this may imply that the first number is equal to the second number. For example, if a number of time resource allocations is a defined number, the number of time resource allocations may be equal to the defined number.

Throughout the present disclosure, one, some and/or all instances of "equal" may be replaced with "equivalent".

Figure 18:
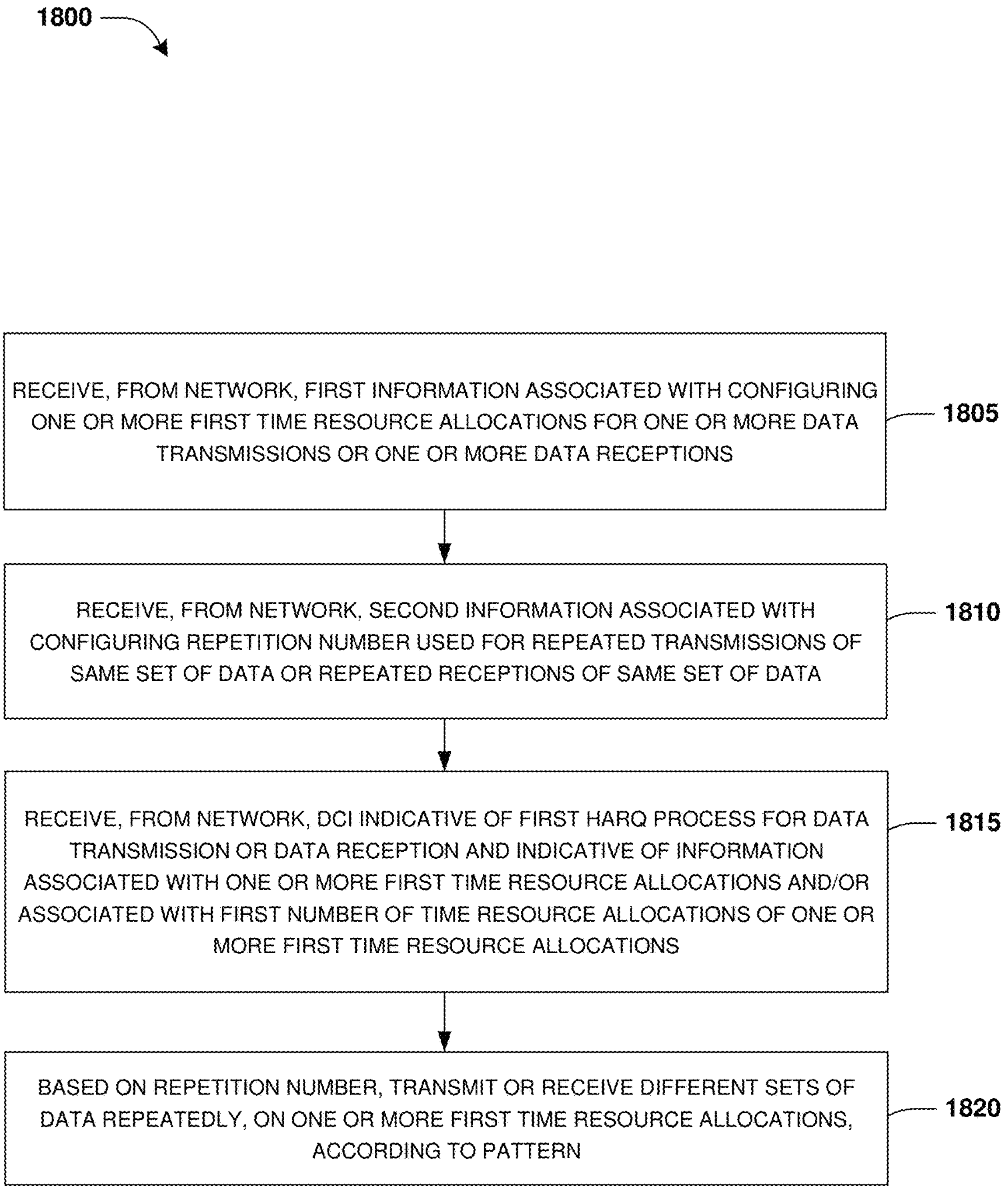
FIG. 18 is a flow chart according to one exemplary embodiment.

FIG. 18 is a flow chart 1800 according to one exemplary embodiment from the perspective of a UE. In step 1805, the UE receives first information, from a network, associated with configuring one or more first time resource allocations for one or more data transmissions or one or more data receptions. In an example, the one or more data transmissions may comprise different data transmissions (e.g., the one or more data transmissions may comprise transmissions of different sets of data). In an example, the one or more data receptions may comprise different data receptions (e.g., the one or more data receptions may comprise receptions of different sets of data). In an example, the UE is configured with the one or more first time resource allocations via the first information. In step 1810, the UE receives second information, from the network, associated with configuring a repetition number (e.g., an aggregation factor) used for repeated transmissions of a same set of data (e.g., repeatedly transmitting the same set of data) or repeated receptions of the same set of data (e.g., repeatedly receiving the same set of data). In an example, the same set of data is (and/or comprises) at least one of a TB, a MAC PDU, etc. In an example, the repeated transmissions or the repeated receptions are performed with a same redundancy version. In an example, the repeated transmissions or the repeated receptions are performed with different redundancy versions. In step 1815, the UE receives a DCI from the network, wherein the DCI is indicative of a first HARQ process (e.g., a specific HARQ process) for data transmission or data reception and is indicative of information associated with the one or more first time resource allocations and/or associated with a first number of time resource allocations of the one or more first time resource allocations. In an example, the information (indicated by the DCI) comprises the one or more first time resource allocations (e.g., the DCI is indicative of the one or more first time resource allocations). In step 1820, based on the repetition number, the UE transmits or receives different sets of data repeatedly, on the one or more first time resource allocations, according to a pattern (e.g., a data transmission pattern or a data reception pattern). In an example, a number of times that the UE transmits or receives a set of data of the different sets of data (and/or a number of times that the UE transmits or receives each set of data of the different sets of data) is equal to the repetition number.

In one embodiment, the different sets of data comprise data 1~X. In an example in which X=3 (e.g., a number of sets of data of the different sets of data is 3), the different sets of data may comprise a first set of data "data 1", a second set of data "data 2" and "a third set of data "data 3".

In one embodiment, the pattern is [data 1, data 1, . . . , data 2, data 2, . . . , data X−1, data X−1, . . . , data X, data X, . . . ]. In an example in which X=2 (e.g., a number of sets of data of the different sets of data is 2), the pattern may be [data 1, data 1, . . . , data 2, data 2, . . . ]. In an example in which X=3 (e.g., a number of sets of data of the different sets of data is 3), the pattern may be [data 1, data 1, . . . , data 2, data 2, . . . , data 3, data 3, . . . ]. For example, the pattern may be [p repetitions of data 1, p repetitions of data 2, . . . , p repetitions of data X−1, p repetitions of data X]. In an example in which p=2 and X=3, the pattern may be [data 1, data 1, data 2, data 2, data 3, data 3]. In an example in which p=3 and X=3, the pattern may be [data 1, data 1, data 1, data 2, data 2, data 2, data 3, data 3, data 3]. In an example, p may be the repetition number.

In an example in which the pattern is [data 1, data 1, data 2, data 2, data 3, data 3], transmission or reception of the different sets of data (of step 1820) may comprise a transmission or reception of a set of data "data 1", followed by a transmission or reception of the set of data "data 1", followed by a transmission or reception of a set of data "data 2", followed by a transmission or reception of the set of data "data 2", followed by a transmission or reception of a set of data "data 3", followed by a transmission or reception of the set of data "data 3".

In one embodiment, the pattern is [data 1, data 2, . . . , data X−1, data X, data 1, data 2, . . . ]. In an example in which X=2 (e.g., a number of sets of data of the different sets of data is 2), the pattern may be [data 1, data 2, data 1, data 2, . . . ]. In an example in which X=3 (e.g., a number of sets of data of the different sets of data is 3), the pattern may be [data 1, data 2, data 3, data 1, data 2, data 3, . . . ]. For example, the pattern may be p repetitions of [data 1, data 2, . . . , data X−1, data X]. In an example in which p=2 and X=3, the pattern may be [data 1, data 2, data 3, data 1, data 2, data 3]. In an example in which p=3 and X=3, the pattern may be [data 1, data 2, data 3, data 1, data 2, data 3, data 1, data 2, data 3]. In an example, p may be the repetition number.

In one embodiment, the repetition number is K and an ID (e.g., a HARQ process number) of the first HARQ process is N, wherein IDs of HARQ processes of transmissions or receptions of the different sets of data according to the pattern are values shown below in HARQ Process ID Pattern 1, HARQ Process ID Pattern 2, HARQ Process ID Pattern 3, HARQ Process ID Pattern 4, HARQ Process ID Pattern 5 and/or HARQ Process ID Pattern 6 (e.g., at least some of the values shown below may be determined using a modulo operation with a second number, such as a number of HARQ process IDs supported and/or used by the UE and/or a number of HARQ process IDs that the UE is configured with, such as where value "N+1" of the values shown below is equal to (N+1) modulo R, wherein R is the second number):

HARQ Process ID Pattern 1: [N, N, . . . , N, N+1, N+1, . . . , N+1, N+2, N+2, . . . ]

HARQ Process ID Pattern 2: [K repetitions of N, K repetitions of N+1, K repetitions of N+2, . . . ]

HARQ Process ID Pattern 3: [N, N, . . . , N, N+K, N+K, . . . , N+K, N+2K, N+2K, . . . ]

HARQ Process ID Pattern 4: [K repetitions of N, K repetitions of N+K, K repetitions of N+2K, . . . ]

HARQ Process ID Pattern 5: [N, N+1, N+2, . . . , N+X, N, N+1, N+2, . . . ]

HARQ Process ID Pattern 6: K repetitions of [N, N+1, N+2, . . . , N+X]

In one embodiment, the first information and the second information are carried in the same message (e.g., the same message comprises the first information and the second information).

In one embodiment, the one or more first time resource allocations are used for repeatedly performing data transmissions or data receptions indicated by the DCI if a total number of data transmissions of the data transmissions or a total number of data receptions of the data receptions is larger than or equal to the first number of time resource allocations.

Referring back to FIGS. 3 and 4, in one exemplary embodiment of a UE, the device 300 includes a program code 312 stored in the memory 310. The CPU 308 may execute program code 312 to enable the UE (i) to receive, from a network, first information associated with configuring one or more first time resource allocations for one or more data transmissions or one or more data receptions, (ii) to receive, from the network, second information associated with configuring a repetition number (e.g., an aggregation factor) used for repeated transmissions of a same set of data (e.g., repeatedly transmitting the same set of data) or repeated receptions of the same set of data (e.g., repeatedly receiving the same set of data), (iii) to receive, from the network, a DCI indicative of a first HARQ process (e.g., a specific HARQ process) for data transmission or data reception and indicative of information associated with the one or more first time resource allocations and/or associated with a first number of time resource allocations of the one or more first time resource allocations, and (iv) to transmit or receive, based on repetition number, different sets of data repeatedly, on the one or more first time resource allocations, according to a pattern (e.g., a data transmission pattern or a data reception pattern). Furthermore, the CPU 308 can execute the program code 312 to perform one, some and/or all of the above-described actions and steps and/or others described herein.

Figure 19:
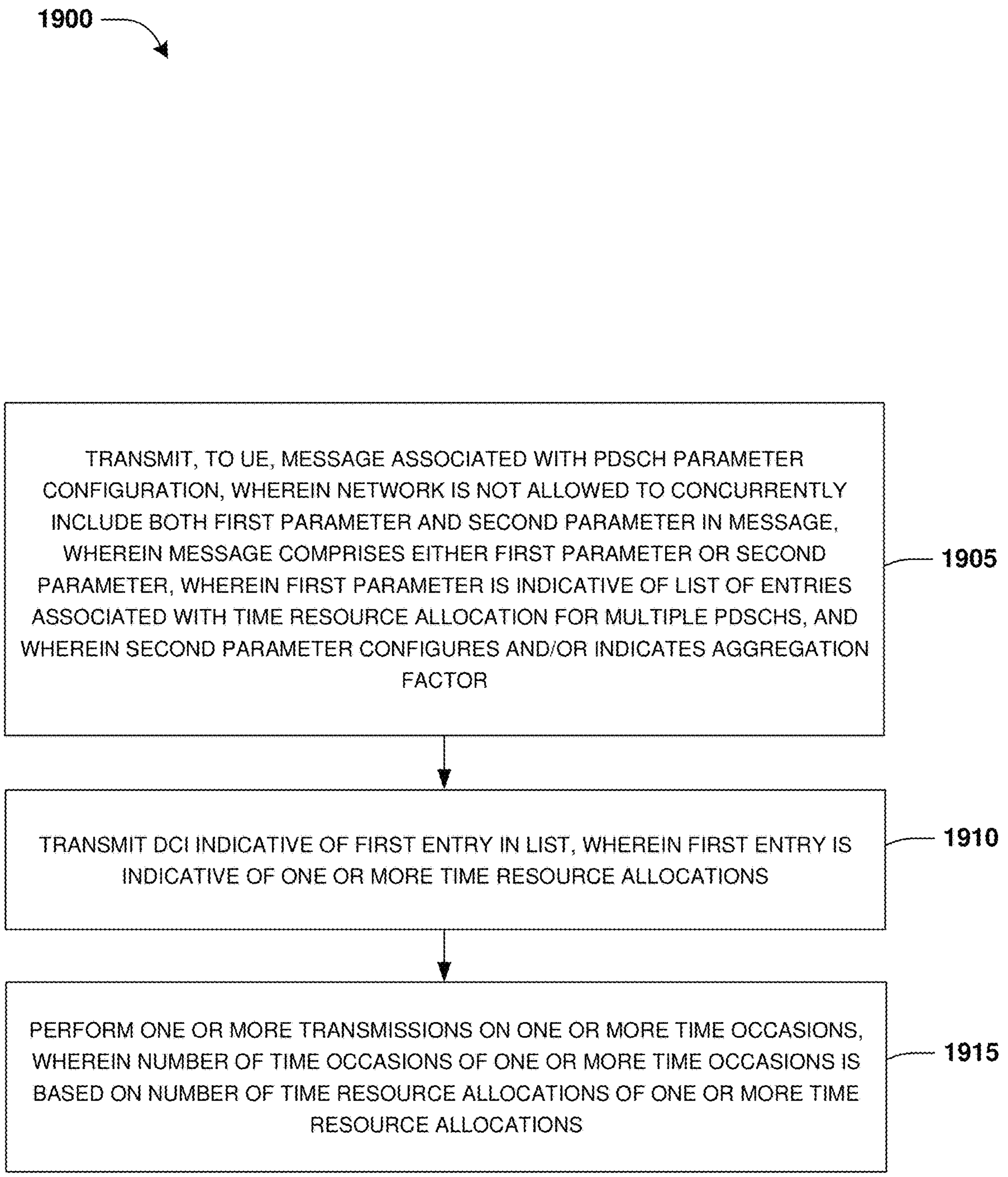
FIG. 19 is a flow chart according to one exemplary embodiment.

FIG. 19 is a flow chart 1900 according to one exemplary embodiment from the perspective of a network. In step 1905, the network transmits, to a UE, a message associated with PDSCH parameter configuration (e.g., the message is for configuring one or more PDSCH parameters). The network is not allowed to concurrently (e.g., simultaneously) include both a first parameter and a second parameter in the message. For example, the network is not allowed to configure the message to concurrently (e.g., simultaneously) comprise both the first parameter and the second parameter. For example, the network is not configured to concurrently (e.g., simultaneously) include both the first parameter and the second parameter in the message and/or the network is prevented and/or prohibited from concurrently (e.g., simultaneously) including both the first parameter and the second parameter in the message. For example, the network may not concurrently (e.g., simultaneously) include both the first parameter and the second parameter in the message. The message comprises either the first parameter or the second parameter. For example, the message comprises merely a single parameter of the first parameter and the second parameter and the message does not comprise both the first parameter and the second parameter. In some examples, the message comprises one or more parameters (other than the single parameter) and/or information in addition to the single parameter (e.g., the single parameter is either the first parameter or the second parameter). In an example, the message comprises the first parameter and does not comprise the second parameter. In an example, the message comprises the second parameter and does not comprise the first parameter. The first parameter indicates (e.g., configures) a list of entries associated with time resource allocation for multiple PDSCHs. In an example, the UE may be configured with the list of entries using the first parameter. The second parameter may indicate (e.g., configure) an aggregation factor. In an example, the UE may be configured with the aggregation factor using the second parameter. In step 1910, the network transmits a DCI indicative of a first entry in the list, wherein the first entry is indicative of one or more time resource allocations. In step 1915, the network performs one or more transmissions on one or more time occasions, wherein a number of time occasions of the one or more time occasions is based on a number of time resource allocations of the one or more time resource allocations. In an example, the number of time occasions is equal to the number of time resource allocations. In an example, the network performs the one or more transmissions to the UE.

In one embodiment, the network operates with shared spectrum channel access on a carrier and/or a cell. For example, the network operates with shared spectrum channel access on the carrier and/or the cell during a period of time in which the network transmits the message, transmits the DCI, and/or performs the one or more transmissions.

In one embodiment, the message is a RRC message.

In one embodiment, for each TB of a plurality of TBs, the one or more transmissions comprise a transmission of the TB. For example, each TB of the plurality of TBs is transmitted at least one time via the one or more transmissions. Alternatively and/or additionally, each TB of the plurality of TBs is transmitted merely one time via the one or more transmissions.

In one embodiment, the one or more transmissions comprise transmitting TBs of the plurality of TBs (e.g., all TBs of the plurality of TBs) in consecutive slots in time domain (e.g., slots that are contiguous with each other).

In one embodiment, each TB of the plurality of TBs is associated with a time resource allocation of the one or more time resource allocations. For example, the one or more time resource allocations may comprise multiple time resource allocations, wherein TBs of the plurality of TBs (e.g., all TBs of the plurality of TBs) are associated with time resource allocations of the multiple time resource allocations, respectively (e.g., each TB of the plurality of TBs is associated with each time resource allocation of the multiple time resource allocations, respectively). In an example, each TB of the plurality of TBs may be associated with a different time resource allocation of the multiple time resource allocations. For example, each TB of the plurality of TBs is associated with a time resource allocation, of the multiple time resource allocations, that is different from other time resource allocations (of the multiple time resource allocations) associated with other TBs of the plurality of TBs. For example, at least one of a first TB of the plurality of TBs may be associated with a first time resource allocation of the multiple time resource allocations, a second TB of the plurality of TBs may be associated with a second time resource allocation of the multiple time resource allocations (wherein the second time resource allocation is different from the first time resource allocation), etc.

In one embodiment, a time resource allocation (e.g., one time resource allocation) of the one or more time resource allocations corresponds to a starting OFDM symbol, a length of consecutive OFDM symbols and/or a mapping type.

In one embodiment, a time occasion of the one or more time occasions (and/or each time occasion of the one or more time occasions) is a slot, a mini-slot, a resource associated with a time resource allocation (e.g., one time resource allocation) of the one or more time resource allocations, and/or a PDSCH.

In one embodiment, a time resource allocation (e.g., one time resource allocation) of the one or more time resource allocations corresponds to a SLIV. For example, the time resource allocation may correspond to a SLIV index/number (e.g., one SLIV index/number, such as a SLIV index corresponding to the SLIV and/or a SLIV number corresponding to the SLIV).

In one embodiment, a time resource allocation (e.g., one time resource allocation) of the one or more time resource allocations corresponds to a SLIV and a mapping type.

In one embodiment, a time resource allocation (e.g., one time resource allocation) of the one or more time resource allocations indicates one or more symbols (e.g., one or more consecutive symbols) in a slot (e.g., a transmission of the one or more transmissions may be performed via the one or more symbols based on the time resource allocation).

In one embodiment, the list is associated with time resource allocation for downlink transmission. For example, the list may be used for indicating time resource allocations for downlink transmission.

In one embodiment, each entry in the list indicates (e.g., comprises) at most a threshold number of time resource allocations. In an example, the threshold number of time resource allocations is eight.

In one embodiment, time resource allocations of the one or more time resource allocations (e.g., all time resource allocations of the one or more time resource allocations) correspond to different starting OFDM symbols, different lengths of consecutive OFDM symbols and/or different mapping types. For example, the one or more time resource allocations may comprise multiple time resource allocations, wherein time resource allocations of the multiple time resource allocations (e.g., all time resource allocations of the multiple time resource allocations) correspond to different starting OFDM symbols, different lengths of consecutive OFDM symbols and/or different mapping types. In an example, each time resource allocation of the multiple time resource allocations corresponds to a different (e.g., unique) starting OFDM symbol, a different (e.g., unique) length of consecutive OFDM symbols and/or a different (e.g., unique) mapping type. For example, a time resource allocation of the multiple time resource allocations (and/or each time resource allocation of the multiple time resource allocations) may correspond to a starting OFDM symbol that is different from other starting OFDM symbols corresponding to other time resource allocations of the multiple time resource allocations. Alternatively and/or additionally, a time resource allocation of the multiple time resource allocations (and/or each time resource allocation of the multiple time resource allocations) may correspond to a length of consecutive OFDM symbols that is different from other lengths of consecutive OFDM symbols corresponding to other time resource allocations of the multiple time resource allocations. Alternatively and/or additionally, a time resource allocation of the multiple time resource allocations (and/or each time resource allocation of the multiple time resource allocations) may correspond to a mapping type that is different from other mapping types corresponding to other time resource allocations of the multiple time resource allocations.

In one embodiment, time resource allocations of the one or more time resource allocations (e.g., all time resource allocations of the one or more time resource allocations) correspond to a same starting OFDM symbol, a same length of consecutive OFDM symbols and/or a same mapping type. For example, each time resource allocation of the one or more time resource allocations corresponds to the same starting OFDM symbol, the same length of consecutive OFDM symbols and/or the same mapping type.

In one embodiment, time resource allocations of the one or more time resource allocations (e.g., all time resource allocations of the one or more time resource allocations) correspond to different slots and/or different time occasions. For example, the one or more time resource allocations may comprise multiple time resource allocations, wherein time resource allocations of the multiple time resource allocations (e.g., all time resource allocations of the multiple time resource allocations) correspond to different slots and/or different time occasions. In an example, each time resource allocation of the multiple time resource allocations corresponds to a different (e.g., unique) slot and/or a different (e.g., unique) time occasion. For example, a time resource allocation of the multiple time resource allocations (and/or each time resource allocation of the multiple time resource allocations) may correspond to a slot that is different from other slots corresponding to other time resource allocations of the multiple time resource allocations. Alternatively and/or additionally, a time resource allocation of the multiple time resource allocations (and/or each time resource allocation of the multiple time resource allocations) may correspond to a time occasion that is different from other time occasions corresponding to other time resource allocations of the multiple time resource allocations.

In one embodiment, the aggregation factor is associated with (e.g., used for) configuring consecutive transmissions, consecutive time occasions and/or consecutive slots for transmitting a single TB. For example, the aggregation factor may be associated with (e.g., used for) configuring a number of transmissions of consecutive transmissions of the single TB, a number of time occasions of consecutive time occasions for transmitting the single TB multiple times, and/or a number of slots of consecutive slots for transmitting the single TB multiple times.

In one embodiment, the aggregation factor is associated with (e.g., used for) slot aggregation and/or transmission aggregation for a single TB.

In one embodiment, the aggregation factor is associated with (e.g., used for) downlink transmission.

In one embodiment, the aggregation factor is updated based on RRC signaling (e.g., the aggregation factor may be updated by setting the aggregation factor to a value indicated by the RRC signaling).

Referring back to FIGS. 3 and 4, in one exemplary embodiment of a network, the device 300 includes a program code 312 stored in the memory 310. The CPU 308 may execute program code 312 to enable the network (i) to transmit, to a UE, a message associated with PDSCH parameter configuration, wherein the network is not allowed to concurrently include both a first parameter and a second parameter in the message, wherein the message comprises either the first parameter or the second parameter, wherein the first parameter is indicative of a list of entries associated with time resource allocation for multiple PDSCHs, and wherein the second parameter indicates an aggregation factor, (ii) to transmit a DCI indicative of a first entry in the list, wherein the first entry is indicative of one or more time resource allocations, and (iii) to perform one or more transmissions on one or more time occasions, wherein a number of time occasions of the one or more time occasions is based on a number of time resource allocations of the one or more time resource allocations. Furthermore, the CPU 308 can execute the program code 312 to perform one, some and/or all of the above-described actions and steps and/or others described herein.

Figure 20:
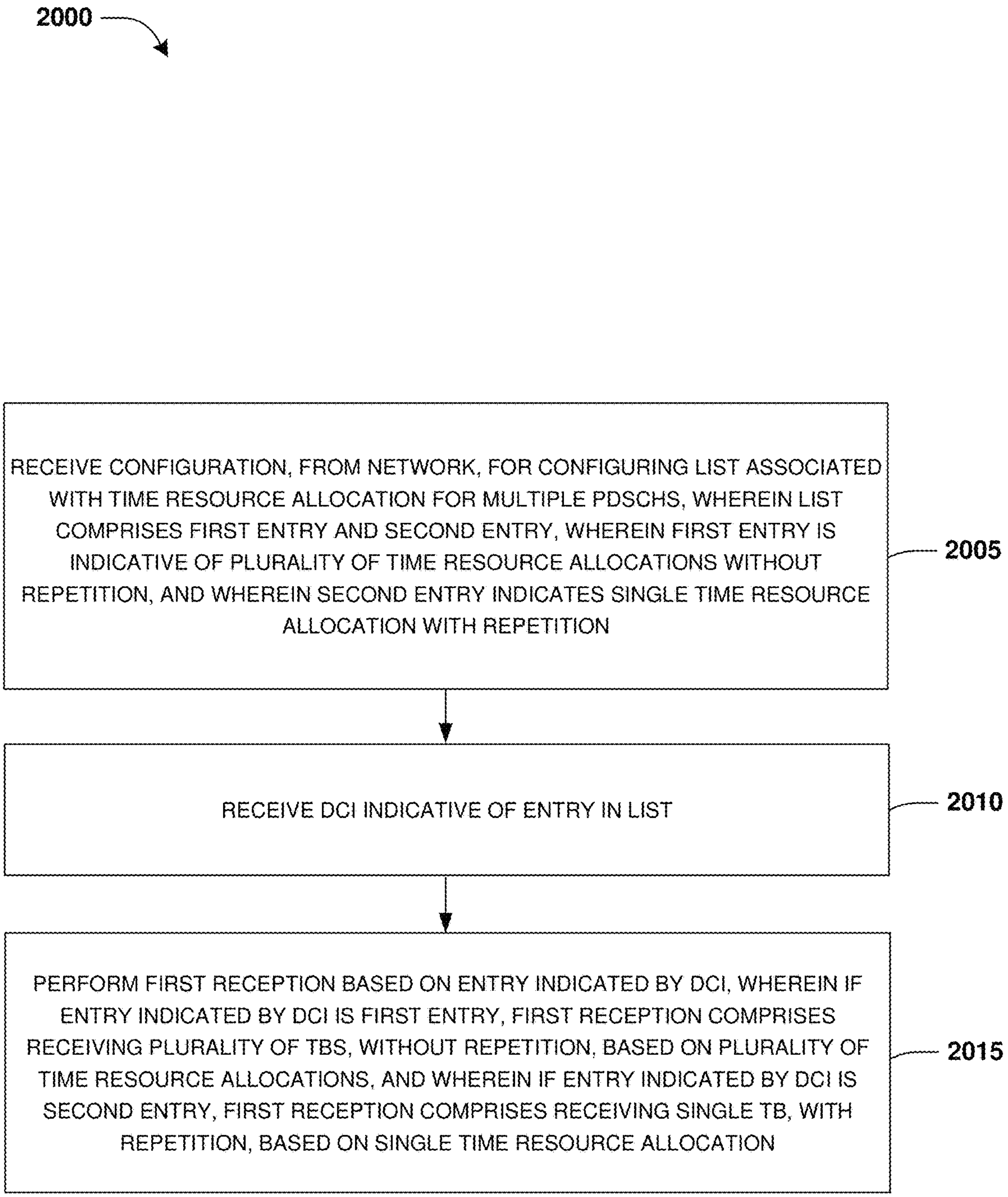
FIG. 20 is a flow chart according to one exemplary embodiment.

FIG. 20 is a flow chart 2000 according to one exemplary embodiment from the perspective of a UE. In step 2005, the UE receives a configuration, from a network, for configuring a list associated with time resource allocation for multiple PDSCHs (e.g., a list of time resource allocations). In an example, the UE is configured with the list via the configuration (e.g., the configuration may be indicative of the list). The list comprises a first entry and a second entry (and/or one or more other entries in addition to the first entry and the second entry). The first entry is indicative of a plurality of time resource allocations without repetition. In an example, the first entry is indicative of performing receptions, without repetitions (e.g., without repeated receptions), using the plurality of time resource allocations. The second entry is indicative of a single time resource allocation with repetition. For example, the second entry may indicate merely the single time resource allocation and/or may not indicate one or more other time resource allocations other than the single time resource allocation. In an example, the second entry is indicative of performing receptions, with repetitions (e.g., with repeated receptions), using the single time resource allocation. In step 2010, the UE receives a DCI indicative of an entry (e.g., one entry) in the list. In an example, the UE receives the DCI from the network. In step 2015, the UE performs first reception based on the entry (e.g., the one entry) indicated by the DCI. If the entry (e.g., the one entry) indicated by the DCI is the first entry, the first reception comprises receiving a plurality of TBs, without repetition (e.g., without repeated receptions of a TB), based on the plurality of time resource allocations. If the entry (e.g., the one entry) indicated by the DCI is the second entry, the first reception comprises receiving a single TB, with repetition (e.g., with repeated receptions of the single TB), based on the single time resource allocation (e.g., the first reception may comprise merely receptions of the single TB based on the single time resource allocation and/or may not comprise reception of one or more other TBs other than the single TB).

In one embodiment (in which the entry indicated by the DCI is the first entry), receiving the plurality of TBs without repetition based on the plurality of time resource allocations comprises performing one or more receptions on one or more time occasions, wherein a number of time occasions of the one or more time occasions is based on a number of time resource allocations of the plurality of time resource allocations. In an example, the number of time occasions is equal to the number of time resource allocations.

In one embodiment, for each TB of the plurality of TBs, the one or more receptions comprise a reception of the TB. For example, each TB of the plurality of TBs is received at least one time via the one or more receptions. Alternatively and/or additionally, each TB of the plurality of TBs is received merely one time via the one or more receptions.

In one embodiment, the one or more receptions comprise receiving TBs of the plurality of TBs (e.g., all TBs of the plurality of TBs) in consecutive slots in time domain (e.g., slots that are contiguous with each other).

In one embodiment, each TB of the plurality of TBs is associated with a time resource allocation of the plurality of time resource allocations. For example, TBs of the plurality of TBs (e.g., all TBs of the plurality of TBs) are associated with time resource allocations of the plurality of time resource allocations, respectively (e.g., each TB of the plurality of TBs is associated with each time resource allocation of the plurality of time resource allocations, respectively). In an example, each TB of the plurality of TBs may be associated with a different time resource allocation of the plurality of time resource allocations. For example, each TB of the plurality of TBs is associated with a time resource allocation, of the plurality of time resource allocations, that is different from other time resource allocations (of the plurality of time resource allocations) associated with other TBs of the plurality of TBs. For example, at least one of a first TB of the plurality of TBs may be associated with a first time resource allocation of the plurality of time resource allocations, a second TB of the plurality of TBs may be associated with a second time resource allocation of the plurality of time resource allocations (wherein the second time resource allocation is different from the first time resource allocation), etc.

In one embodiment, time resource allocations of the plurality of time resource allocations (e.g., all time resource allocations of the plurality of time resource allocations) correspond to different starting OFDM symbols, different lengths of consecutive OFDM symbols and/or different mapping types. In an example, each time resource allocation of the plurality of time resource allocations corresponds to a different (e.g., unique) starting OFDM symbol, a different (e.g., unique) length of consecutive OFDM symbols and/or a different (e.g., unique) mapping type. For example, a time resource allocation of the plurality of time resource allocations (and/or each time resource allocation of the plurality of time resource allocations) may correspond to a starting OFDM symbol that is different from other starting OFDM symbols corresponding to other time resource allocations of the plurality of time resource allocations. Alternatively and/or additionally, a time resource allocation of the plurality of time resource allocations (and/or each time resource allocation of the plurality of time resource allocations) may correspond to a length of consecutive OFDM symbols that is different from other lengths of consecutive OFDM symbols corresponding to other time resource allocations of the plurality of time resource allocations. Alternatively and/or additionally, a time resource allocation of the plurality of time resource allocations (and/or each time resource allocation of the plurality of time resource allocations) may correspond to a mapping type that is different from other mapping types corresponding to other time resource allocations of the plurality of time resource allocations.

In one embodiment, time resource allocations of the plurality of time resource allocations (e.g., all time resource allocations of the plurality of time resource allocations) correspond to a same starting OFDM symbol, a same length of consecutive OFDM symbols and/or a same mapping type. For example, each time resource allocation of the plurality of time resource allocations corresponds to the same starting OFDM symbol, the same length of consecutive OFDM symbols and/or the same mapping type.

In one embodiment, time resource allocations of the plurality of time resource allocations (e.g., all time resource allocations of the plurality of time resource allocations) correspond to different slots and/or different time occasions. In an example, each time resource allocation of the plurality of time resource allocations corresponds to a different (e.g., unique) slot and/or a different (e.g., unique) time occasion. For example, a time resource allocation of the plurality of time resource allocations (and/or each time resource allocation of the plurality of time resource allocations) may correspond to a slot that is different from other slots corresponding to other time resource allocations of the plurality of time resource allocations. Alternatively and/or additionally, a time resource allocation of the plurality of time resource allocations (and/or each time resource allocation of the plurality of time resource allocations) may correspond to a time occasion that is different from other time occasions corresponding to other time resource allocations of the plurality of time resource allocations.

In one embodiment (in which the entry indicated by the DCI is the second entry), receiving the single TB with repetition based on the single time resource allocation comprises performing one or more receptions on one or more time occasions, wherein a number of time occasions of the one or more time occasions is based on a repetition number. In an example, the number of time occasions is equal to the number of time resource allocations. In an example, the one or more receptions comprise multiple receptions of the single TB.

In one embodiment, the repetition number is based on (e.g., configured by) an aggregation factor.

In one embodiment, the aggregation factor is associated with (e.g., used for) configuring consecutive transmissions, consecutive time occasions and/or consecutive slots for receiving a second single TB. For example, the aggregation factor may be associated with (e.g., used for) configuring a number of transmissions of consecutive transmissions of the second single TB, a number of time occasions of consecutive time occasions for receiving the second single TB multiple times, and/or a number of slots of consecutive slots for receiving the second single TB multiple times.

In one embodiment, the aggregation factor is associated with (e.g., used for) slot aggregation and/or transmission aggregation for a third single TB.

In one embodiment, the aggregation factor is associated with (e.g., used for) downlink transmission.

In one embodiment, a time resource allocation (e.g., one time resource allocation) of one or more time resource allocations indicated by the list (e.g., all time resource allocations indicated by the list) corresponds to a starting OFDM symbol, a length of consecutive OFDM symbols and/or a mapping type.

In one embodiment, the first reception comprises performing one or more receptions on one or more time occasions.

In one embodiment, a time occasion of the one or more time occasions (and/or each time occasion of the one or more time occasions) is a slot, a mini-slot, a resource associated with a time resource allocation (e.g., one time resource allocation) of the one or more time resource allocations, and/or a PDSCH.

In one embodiment, a time resource allocation (e.g., one time resource allocation) of the one or more time resource allocations corresponds to a SLIV. For example, the time resource allocation may correspond to a SLIV index/number (e.g., one SLIV index/number, such as a SLIV index corresponding to the SLIV and/or a SLIV number corresponding to the SLIV).

In one embodiment, a time resource allocation (e.g., one time resource allocation) of the one or more time resource allocations corresponds to a SLIV and a mapping type.

In one embodiment, a time resource allocation (e.g., one time resource allocation) of the one or more time resource allocations indicates one or more symbols (e.g., one or more consecutive symbols) in a slot (e.g., a reception of the one or more receptions may be performed via the one or more symbols based on the time resource allocation).

Referring back to FIGS. 3 and 4, in one exemplary embodiment of a UE, the device 300 includes a program code 312 stored in the memory 310. The CPU 308 may execute program code 312 to enable the UE (i) to receive, from a network, a configuration for configuring a list associated with time resource allocation for multiple PDSCHs, wherein the list comprises a first entry and a second entry, wherein the first entry is indicative of a plurality of time resource allocations without repetition, and wherein the second entry indicates a single time resource allocation with repetition, (ii) to receive a DCI indicative of an entry in the list, and (iii) to perform first reception based on the entry indicated by the DCI, wherein if the entry indicated by the DCI is the first entry, the first reception comprises receiving a plurality of TBs without repetition based on the plurality of time resource allocations, and wherein if the entry indicated by the DCI is the second entry, the first reception comprises receiving a single TB with repetition based on the single time resource allocation. Furthermore, the CPU 308 can execute the program code 312 to perform one, some and/or all of the above-described actions and steps and/or others described herein.

Figure 21:
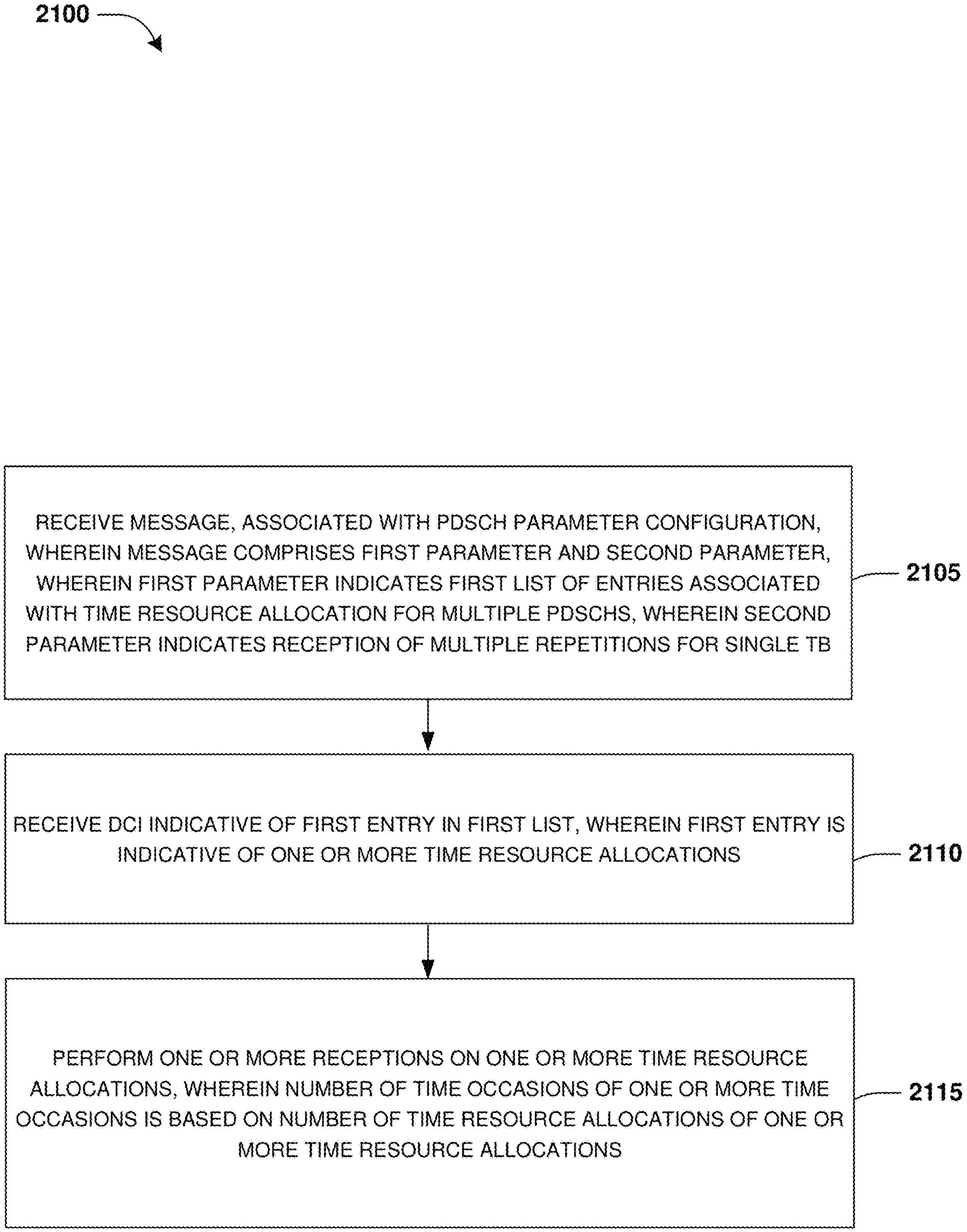
FIG. 21 is a flow chart according to one exemplary embodiment.

FIG. 21 is a flow chart 2100 according to one exemplary embodiment from the perspective of a UE. In step 2105, the UE receives a message associated with PDSCH parameter configuration (e.g., the message is for configuring one or more PDSCH parameters). The message comprises a first parameter and a second parameter. In some examples, the message comprises one or more parameters (other than the first and second parameter) and/or information in addition to the first and second parameter. The first parameter indicates (e.g., configures) a first list of entries associated with time resource allocation for multiple PDSCHs. In an example, the UE may be configured with the first list of entries using the first parameter. The second parameter indicates (e.g., configures) reception of multiple repetitions for a single TB (e.g., the second parameter indicates multiple repetitions of receiving a single TB). In step 2110, the UE receives a DCI indicative of a first entry in the first list, wherein the first entry is indicative of one or more time resource allocations. In step 2115, the UE performs one or more receptions on one or more time occasions, wherein a number of time occasions of the one or more time occasions is based on a number of time resource allocations of the one or more time resource allocations. In an example, the number of time occasions is equal to the number of time resource allocations.

In one embodiment, the message is a RRC message.

In one embodiment, the UE performs the one or more receptions (e.g., one or more TB receptions) on the one or more time occasions without applying the multiple repetitions associated with the second parameter. Alternatively and/or additionally, the UE may not apply the multiple repetitions associated with the second parameter for performing the one or more receptions on the one or more time occasions. Alternatively and/or additionally, the UE may ignore the multiple repetitions associated with the second parameter for performing the one or more receptions on the one or more time occasions. Alternatively and/or additionally, the UE may determine (e.g., consider) a number of repetitions for a single TB to be one for performing the one or more receptions on the one or more time occasions (e.g., the UE may not receive a single TB more than once via the one or more receptions). Alternatively and/or additionally, the one or more receptions may not comprise a time occasion for TB repetition. Alternatively and/or additionally, the UE may determine (e.g., consider) a number of repetitions for a single TB to be one for each time resource allocation of the one or more time resource allocations.

In one embodiment, the DCI is DCI format 1_1.

In one embodiment, a number of repetitions of the multiple repetitions for the single TB corresponds to a number of time occasions (e.g., a total number of time occasions) for the single TB. Alternatively and/or additionally, if the number of repetitions of the multiple repetitions for the single TB is two, the number of time occasions (e.g., the total number of time occasions) for the single TB is two. Alternatively and/or additionally, a number of repetitions for a single TB corresponds to a number of time occasions (e.g., a total number of time occasions) for the single TB. Alternatively and/or additionally, if the number of the repetitions for a single TB is one, the number of time occasions (e.g., the total number of time occasions) for the single TB is one.

In one embodiment, the number of time occasions of the one or more time occasions is equal to (e.g., identical to) the number of time resource allocations of the one or more time resource allocations. Alternatively and/or additionally, the number of time occasions of the one or more time occasions is determined to be the number of time resource allocations of the one or more time resource allocations.

In one embodiment, the one or more time occasions do not comprise a time occasion associated with the multiple repetitions associated with the second parameter. Alternatively and/or additionally, the number of time occasions of the one or more time occasions is not based on the multiple repetitions associated with the second parameter. Alternatively and/or additionally, time occasions of the one or more time occasions may correspond to different TBs (e.g., each time occasion of the one or more time occasions corresponds to a different TB, such as where a first time occasion corresponds to a first TB, a second time occasion corresponds to a second TB different than the first TB, etc.). Alternatively and/or additionally, each time occasion of the one or more time occasions may be without the multiple repetitions associated with the second parameter. Alternatively and/or additionally, each time occasion of the one or more time occasions may be associated with a repetition number equal to one. Alternatively and/or additionally, each time occasion of the one or more time occasions may not be associated with the multiple repetitions associated with the second parameter.

In one embodiment, for each TB of a plurality of TBs, the one or more TB receptions comprise a reception of the TB. Alternatively and/or additionally, the one or more TB receptions may comprise receiving TBs of the plurality of TBs in different slots. Alternatively and/or additionally, each TB of the plurality of TBs may be associated with a time resource allocation of the one or more time resource allocations. Alternatively and/or additionally, an entry in the first list (e.g., at least one entry in the first list) is indicative of a plurality of time resource allocations for a plurality of TBs and/or a plurality of HARQ process numbers.

In one embodiment, time resource allocations of the one or more time resource allocations (e.g., all time resource allocations of the one or more time resource allocations) correspond to different starting OFDM symbols, different lengths of consecutive OFDM symbols and/or different mapping types. For example, the one or more time resource allocations may comprise multiple time resource allocations, wherein time resource allocations of the multiple time resource allocations (e.g., all time resource allocations of the multiple time resource allocations) correspond to different starting OFDM symbols, different lengths of consecutive OFDM symbols and/or different mapping types. In an example, each time resource allocation of the multiple time resource allocations corresponds to a different (e.g., unique) starting OFDM symbol, a different (e.g., unique) length of consecutive OFDM symbols and/or a different (e.g., unique) mapping type. For example, a time resource allocation of the multiple time resource allocations (and/or each time resource allocation of the multiple time resource allocations) may correspond to a starting OFDM symbol that is different from other starting OFDM symbols corresponding to other time resource allocations of the multiple time resource allocations. Alternatively and/or additionally, a time resource allocation of the multiple time resource allocations (and/or each time resource allocation of the multiple time resource allocations) may correspond to a length of consecutive OFDM symbols that is different from other lengths of consecutive OFDM symbols corresponding to other time resource allocations of the multiple time resource allocations. Alternatively and/or additionally, a time resource allocation of the multiple time resource allocations (and/or each time resource allocation of the multiple time resource allocations) may correspond to a mapping type that is different from other mapping types corresponding to other time resource allocations of the multiple time resource allocations.

In one embodiment, time resource allocations of the one or more time resource allocations (e.g., all time resource allocations of the one or more time resource allocations) correspond to a same starting OFDM symbol, a same length of consecutive OFDM symbols and/or a same mapping type. For example, each time resource allocation of the one or more time resource allocations corresponds to the same starting OFDM symbol, the same length of consecutive OFDM symbols and/or the same mapping type.

In one embodiment, time resource allocations of the one or more time resource allocations (e.g., all time resource allocations of the one or more time resource allocations) correspond to different slots and/or different time occasions. For example, the one or more time resource allocations may comprise multiple time resource allocations, wherein time resource allocations of the multiple time resource allocations (e.g., all time resource allocations of the multiple time resource allocations) correspond to different slots and/or different time occasions. In an example, each time resource allocation of the multiple time resource allocations corresponds to a different (e.g., unique) slot and/or a different (e.g., unique) time occasion. For example, a time resource allocation of the multiple time resource allocations (and/or each time resource allocation of the multiple time resource allocations) may correspond to a slot that is different from other slots corresponding to other time resource allocations of the multiple time resource allocations. Alternatively and/or additionally, a time resource allocation of the multiple time resource allocations (and/or each time resource allocation of the multiple time resource allocations) may correspond to a time occasion that is different from other time occasions corresponding to other time resource allocations of the multiple time resource allocations.

In one embodiment, the first list is associated with time resource allocation for downlink transmission. Alternatively and/or additionally, each entry in the first list may be indicative of at most eight time resource allocations. Alternatively and/or additionally, time resource allocations of the one or more time resource allocations may correspond to different starting OFDM symbols, different lengths of consecutive OFDM symbols and/or different mapping types. Alternatively and/or additionally, time resource allocations of the one or more time resource allocations may correspond to a same starting OFDM symbol, a same length of consecutive OFDM symbols and/or a same mapping type. Alternatively and/or additionally, time resource allocations of the one or more time resource allocations may correspond to different slots and/or different time occasions.

In one embodiment, the second parameter is pdsch-AggregationFactor. Alternatively and/or additionally, the multiple repetitions is associated with configuring consecutive receptions (e.g., consecutive receptions for receiving a single TB), consecutive time occasions (e.g., consecutive time occasions for receiving a single TB) and/or consecutive slots (e.g., consecutive slots for receiving a single TB). Alternatively and/or additionally, the multiple repetitions is associated with slot aggregation and/or transmission aggregation for a single TB. Alternatively and/or additionally, the multiple repetitions is associated with downlink transmission. Alternatively and/or additionally, the multiple repetitions is updated based on RRC signaling.

In one embodiment, the message comprises a third parameter indicative of a second list of entries associated with time resource allocation, wherein each entry in the second list is indicative of a single time resource allocation. Alternatively and/or additionally, the UE may receive a second DCI indicative of an entry in the second list, and the UE may perform one or more receptions on one or more time occasions, wherein a number of time occasions of the one or more time occasions is based on the second parameter. Alternatively and/or additionally, the second list is associated with time resource allocation for downlink transmission.

In one embodiment, the UE performs the one or more receptions on one or more time occasions by applying the multiple repetitions associated with the second parameter. Alternatively and/or additionally, the UE apply the multiple repetitions associated with the second parameter for performing the one or more receptions on one or more time occasions. Alternatively and/or additionally, for performing the one or more receptions on one or more time occasions, the UE may determine (e.g., consider) a number of repetitions for a single TB (of the one or more receptions, for example) to be a number of repetitions of the multiple repetitions associated with the second parameter. Alternatively and/or additionally, the one or more receptions may comprise one or more time occasions for TB repetition. Alternatively and/or additionally, the UE may determine (e.g., consider) a number of repetitions for a single TB to be a number of repetitions of the multiple repetitions associated with the second parameter.

In one embodiment, the number of time occasions of the one or more time occasions is equal to (e.g., identical to) the multiple repetitions associated with the second parameter (e.g., the number of time occasions of the one or more time occasions is equal to a number of repetitions of the multiple repetitions). Alternatively and/or additionally, each time occasion of the one or more time occasions may be associated with a time resource allocation signaled by the entry in the second list. Alternatively and/or additionally, each time occasion of the one or more time occasions may correspond to the same TB.

Referring back to FIGS. 3 and 4, in one exemplary embodiment of a UE, the device 300 includes a program code 312 stored in the memory 310. The CPU 308 may execute program code 312 to enable the UE (i) to receive a message associated with PDSCH parameter configuration, wherein the message comprises a first parameter and a second parameter, wherein the first parameter is indicative of a first list of entries associated with time resource allocation for multiple PDSCHs, and wherein the second parameter indicates (e.g., configures) reception of multiple repetitions for a single TB (e.g., the second parameter indicates multiple repetitions of receiving a single TB), (ii) to receive a DCI indicative of a first entry in the first list, wherein the first entry is indicative of one or more time resource allocations, and (iii) to perform one or more receptions on one or more time occasions, wherein a number of time occasions of the one or more time occasions is based on a number of time resource allocations of the one or more time resource allocations. Furthermore, the CPU 308 can execute the program code 312 to perform one, some and/or all of the above-described actions and steps and/or others described herein.

Figure 22:
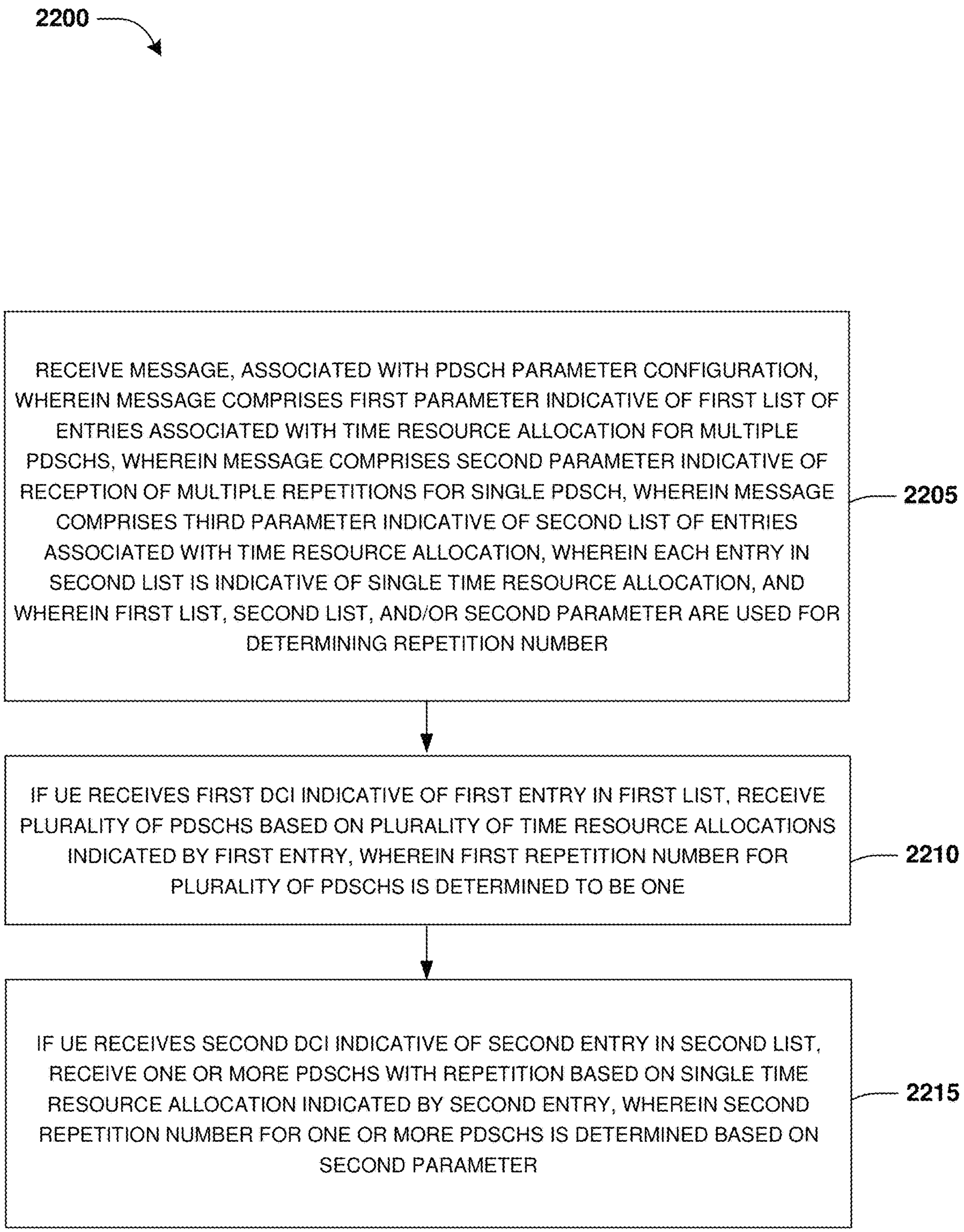
FIG. 22 is a flow chart according to one exemplary embodiment.

FIG. 22 is a flow chart 2200 according to one exemplary embodiment from the perspective of a UE. In step 2205, the UE receives a message associated with PDSCH parameter configuration (e.g., the message is for configuring one or more PDSCH parameters). The message comprises a first parameter, a second parameter and a third parameter. In some examples, the message comprises one or more parameters (other than the first, second and third parameter) and/or information in addition to the first, second and third parameter. The first parameter indicates (e.g., configures) a first list of entries associated with time resource allocation for multiple PDSCHs. In an example, the UE may be configured with the first list of entries using the first parameter. The second parameter indicates (e.g., configures) reception of multiple repetitions for a single PDSCH (e.g., one PDSCH) (e.g., the second parameter indicates multiple repetitions of receiving a single TB). In an example, the UE may be configured with reception of the multiple repetitions for a single PDSCH using the second parameter. The third parameter indicates (e.g., configures) a second list of entries associated with time resource allocation. In an example, the UE may be configured with the second list of entries using the third parameter. Each entry in the second list is indicative of a single time resource allocation. The first list, the second list and/or the second parameter (and/or other information in addition to the first list, the second list and/or the second parameter) are used for determining a repetition number (e.g., the repetition number may correspond to a repetition number of PDSCH reception). In an example, the UE determines a repetition number based on the second parameter and the first list or the second list (or based on the first list or based on the second list and the second parameter) (e.g., the repetition number may correspond to a repetition number of PDSCH reception). In step 2210, if the UE receives a first DCI indicative of a first entry in the first list, the UE receives a plurality of PDSCHs based on a plurality of time resource allocations indicated by the first entry, wherein a first repetition number for the plurality of PDSCHs is determined to be one (e.g., the first repetition number equal to one is for each PDSCH of the plurality of PDSCHs, such as where the first repetition number corresponds to a number of receptions of each PDSCH of the plurality of PDSCHs). In step 2215, if the UE receives a second DCI indicative of a second entry in the second list, the UE receives one or more PDSCHs with repetition based on a single time resource allocation indicated by the second entry, wherein a second repetition number for the one or more PDSCHs is determined based on the second parameter (e.g., the second repetition number is for each PDSCH of the one or more PDSCHs, such as where the second repetition number corresponds to a number of receptions of each PDSCH of the one or more PDSCHs).

In one embodiment, a number of PDSCHs of the plurality of PDSCHs is based on a number of time resource allocations of the plurality of time resource allocations. Alternatively and/or additionally, the number of PDSCHs of the plurality of PDSCHs is equal to (e.g., identical to) a number of time resource allocations of the plurality of time resource allocations. Alternatively and/or additionally, the number of PDSCHs of the plurality of PDSCHs is determined to be the number of time resource allocations of the plurality of time resource allocations.

In one embodiment, a number of PDSCHs of the one or more PDSCHs (with repetition) is equal to (e.g., identical to) a number of repetitions of the multiple repetitions associated with the second parameter (e.g., the multiple repetitions signalled by the second parameter).

In one embodiment, the first DCI is DCI format 1_1.

In one embodiment, the second DCI is not DCI format 1_1.

In one embodiment, the first repetition number corresponds to a number of time occasions (e.g., a total number of time occasions) for each PDSCH of the plurality of PDSCHs. Alternatively and/or additionally, the second repetition number may correspond to a second number of time occasions (e.g., a total number of time occasions) for each PDSCH of the one or more PDSCHs.

In one embodiment, a repetition number for a PDSCH corresponds to a number of time occasions (e.g., a total number of time occasions) for the PDSCH. In an example, if the repetition number for the PDSCH is two, a number of time occasions (e.g., a total number of time occasions) for the PDSCH is two.

In one embodiment, one PDSCH corresponds to one TB. Alternatively and/or additionally, PDSCHs of the plurality of PDSCHs correspond to different TBs (e.g., each PDSCH of the plurality of PDSCHs corresponds to a different TB, such as where a first PDSCH of the plurality of PDSCHs corresponds to a first TB, a second PDSCH of the plurality of PDSCHs corresponds to a second TB different than the first TB, etc.). Alternatively and/or additionally, PDSCHs of the plurality of PDSCHs are associated with different Hybrid Automatic Repeat Request (HARQ) process numbers (e.g., each PDSCH of the plurality of PDSCHs is associated with a different HARQ process number, such as where a first PDSCH of the plurality of PDSCHs is associated with a first HARQ process number, a second PDSCH of the plurality of PDSCHs is associated with a second HARQ process number different than the first HARQ process number, etc.). Alternatively and/or additionally, PDSCHs of the plurality of PDSCHs are associated with time resource allocations of the plurality of time resource allocations indicated by the first DCI (e.g., each PDSCH of the plurality of PDSCHs is associated with each time resource allocation of the plurality of time resource allocations indicated by the first DCI, respectively). Alternatively and/or additionally, each PDSCH of the plurality of PDSCHs is associated with (e.g., received in) a time occasion. Alternatively and/or additionally, each PDSCH of the plurality of PDSCHs is associated with (e.g., received in) a slot. Alternatively and/or additionally, the UE receives the plurality of PDSCHs without applying the multiple repetitions associated with the second parameter (e.g., the UE may not receive the plurality of PDSCHs based upon the multiple repetitions and/or a number of repetitions of the multiple repetitions).

In one embodiment, each PDSCH of the one or more PDSCHs (with repetition) corresponds to one TB. Alternatively and/or additionally, each PDSCH of the one or more PDSCHs is associated with a same HARQ process number. Alternatively and/or additionally, each PDSCH of the one or more PDSCHs is associated with (e.g., received in) a time occasion. Alternatively and/or additionally, each PDSCH of the one or more PDSCHs is associated with (e.g., received in) a slot. Alternatively and/or additionally, each PDSCH of the one or more PDSCHs is associated with the single time resource allocation (e.g., the single time resource allocation signalled by the second DCI).

In one embodiment, a time resource allocation (e.g., the single time resource allocation and/or a time resource allocation of the plurality of time resource allocations) corresponds to a starting OFDM symbol, a length of consecutive OFDM symbols and/or a mapping type. Alternatively and/or additionally, a time resource allocation (e.g., the single time resource allocation and/or a time resource allocation of the plurality of time resource allocations) corresponds to a SLIV. Alternatively and/or additionally, a time resource allocation (e.g., the single time resource allocation and/or a time resource allocation of the plurality of time resource allocations) corresponds to a SLIV and a mapping type.

In one embodiment, the first list is associated with time resource allocation for downlink transmission. Alternatively and/or additionally, the second list is associated with time resource allocation for downlink transmission. Alternatively and/or additionally, each entry in the first list is indicative of at most eight time resource allocations. Alternatively and/or additionally, time resource allocations of the plurality of time resource allocations correspond to different starting OFDM symbols, different lengths of consecutive OFDM symbols and/or different mapping types. Alternatively and/or additionally, time resource allocations of the plurality of time resource allocations correspond to a same starting OFDM symbol, a same length of consecutive OFDM symbols and/or a same mapping type. Alternatively and/or additionally, time resource allocations of the plurality of time resource allocations correspond to different slots and/or different time occasions.

In one embodiment, the second parameter is pdsch-AggregationFactor. Alternatively and/or additionally, the multiple repetitions associated with the second parameter is associated with configuring consecutive transmissions, consecutive time occasions and/or consecutive slots for transmitting a single TB. Alternatively and/or additionally, the multiple repetitions is associated with slot aggregation and/or transmission aggregation for a single TB. Alternatively and/or additionally, the multiple repetitions is associated with downlink transmission. Alternatively and/or additionally, the multiple repetitions is updated based on RRC signaling (e.g., the multiple repetitions may be updated to indicate an updated number of multiple repetitions based on the RRC signaling).

Referring back to FIGS. 3 and 4, in one exemplary embodiment of a UE, the device 300 includes a program code 312 stored in the memory 310. The CPU 308 may execute program code 312 to enable the UE (i) to receive a message associated with PDSCH parameter configuration, wherein the message comprises a first parameter, a second parameter, and a third parameter, wherein the first parameter is indicative of (e.g., configures) a first list of entries associated with time resource allocation for multiple PDSCHs, the second parameter indicates (e.g., configures) reception of multiple repetitions for a single PDSCH, and the third parameter is indicative of a second list of entries associated with time resource allocation, wherein each entry in the second list is indicative of a single time resource allocation, and wherein the first list, the second list and/or the second parameter are used for determining a repetition number, (ii) to receive, if the UE receives a first DCI indicative of a first entry in the first list, a plurality of PDSCHs based on a plurality of time resource allocations indicated by the first entry, wherein a first repetition number for the plurality of PDSCHs is determined to be one, and (iii) to receive, if the UE receives a second DCI indicative of a second entry in the second list, one or more PDSCHs with repetition based on a single time resource allocation indicated by the second entry, wherein a second repetition number for the one or more PDSCHs is determined based on the second parameter. Furthermore, the CPU 308 can execute the program code 312 to perform one, some and/or all of the above-described actions and steps and/or others described herein.

A communication device (e.g., a UE, a base station, a network, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 18-22. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 18-22, and/or one, some and/or all of the above-described actions and steps and/or others described herein.

It may be appreciated that applying one or more of the techniques presented herein may result in one or more benefits including, but not limited to, increased efficiency of communication between devices (e.g., a UE and/or a network), such as by enabling the UE and/or the network to interpret and/or determine time resource allocation for multi-TB PDSCH with repetition number and/or slot aggregation for PDSCH. For example, by enabling the UE and/or the network to perform (e.g., correctly perform) communication using multi-PDSCHs functionality and/or PDSCH aggregation/repetition functionality, the UE and the network may communicate with each other with at least one of less control signaling overhead, improved PDSCH transmission reliability, etc.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE), the method comprising:
receiving a first configuration for configuring a first list of entries associated with time resource allocation for Physical Downlink Shared Channel (PDSCH), wherein each entry in the first list is indicative of one or more time resource allocations;
receiving a second configuration for configuring a repetition number for PDSCH;
receiving a third configuration for configuring a second list of entries associated with time resource allocation for PDSCH, wherein each entry in the second list is indicative of a single time resource allocation;
receiving, if the UE receives a first Downlink Control Information (DCI) indicative of a first entry in the first list, a plurality of PDSCHs based on a plurality of time resource allocations indicated by the first entry, wherein a first repetition number for the plurality of PDSCHs is determined to be one; and
receiving, if the UE receives a second DCI indicative of a second entry in the second list, one or more PDSCHs with repetition based on a single time resource allocation indicated by the second entry, wherein a second repetition number for the one or more PDSCHs is determined based on the second configuration.

2. The method of claim 1, wherein at least one of:
a number of PDSCHs of the plurality of PDSCHs is based on a number of time resource allocations of the plurality of time resource allocations;
the number of PDSCHs of the plurality of PDSCHs is equal to the number of time resource allocations of the plurality of time resource allocations; or
the number of PDSCHs of the plurality of PDSCHs is determined to be the number of time resource allocations of the plurality of time resource allocations.

3. The method of claim 1, wherein a number of PDSCHs of the one or more PDSCHs is equal to the repetition number associated with the second configuration.

4. The method of claim 1, wherein at least one of:
the first DCI is DCI format 1_1; or
the second DCI is not DCI format 1_1.

5. The method of claim 1, wherein at least one of:
the first repetition number corresponds to a number of time occasions for each PDSCH of the plurality of PDSCHs; or
the second repetition number corresponds to a second number of time occasions for each PDSCH of the one or more PDSCHs.

6. The method of claim 1, wherein at least one of:
one PDSCH corresponds to one Transport Block (TB);
PDSCHs of the plurality of PDSCHs correspond to different TBs;
PDSCHs of the plurality of PDSCHs are associated with different Hybrid Automatic Repeat Request (HARQ) process numbers;
PDSCHs of the plurality of PDSCHs are associated with time resource allocations of the plurality of time resource allocations indicated by the first DCI;
each PDSCH of the plurality of PDSCHs is associated with a time occasion;
each PDSCH of the plurality of PDSCHs is associated with a slot; or
the UE receives the plurality of PDSCHs without applying the repetition number associated with the second configuration.

7. The method of claim 1, wherein at least one of:
each PDSCH of the one or more PDSCHs corresponds to one Transport Block (TB);
each PDSCH of the one or more PDSCHs is associated with a same Hybrid Automatic Repeat Request (HARQ) process number;
each PDSCH of the one or more PDSCHs is associated with a time occasion;
each PDSCH of the one or more PDSCHs is associated with a slot; or
each PDSCH of the one or more PDSCHs is associated with the single time resource allocation indicated by the second entry.

8. The method of claim 1, wherein at least one of:
a time resource allocation of the plurality of time resource allocations corresponds to at least one of a starting Orthogonal Frequency Division Multiplexing (OFDM) symbol, a length of consecutive OFDM symbols or a mapping type;
a time resource allocation of the plurality of time resource allocations corresponds to a start and length indicator value (SLIV);
a time resource allocation of the plurality of time resource allocations corresponds to a SLIV and a mapping type;
the single time resource allocation indicated by the second entry corresponds to at least one of a starting OFDM symbol, a length of consecutive OFDM symbols or a mapping type;
the single time resource allocation indicated by the second entry corresponds to a SLIV; or
the single time resource allocation indicated by the second entry corresponds to a SLIV and a mapping type.

9. The method of claim 1, wherein at least one of:
the first list is associated with time resource allocation for downlink transmission;
the second list is associated with time resource allocation for downlink transmission;
each entry in the first list is indicative of at most eight time resource allocations;
time resource allocations of the plurality of time resource allocations correspond to at least one of different starting Orthogonal Frequency Division Multiplexing (OFDM) symbols, different lengths of consecutive OFDM symbols or different mapping types;
time resource allocations of the plurality of time resource allocations correspond to at least one of a same starting OFDM symbol, a same length of consecutive OFDM symbols or a same mapping type; or
time resource allocations of the plurality of time resource allocations correspond to at least one of different slots or different time occasions.

10. The method of claim 1, wherein at least one of:
the second configuration is pdsch-AggregationFactor;
the repetition number associated with the second configuration is associated with configuring at least one of consecutive transmissions, consecutive time occasions or consecutive slots for transmitting a single Transport Block (TB);
the repetition number associated with the second configuration is associated with at least one of slot aggregation or transmission aggregation for a single TB;
the repetition number associated with the second configuration is associated with downlink transmission; or the repetition number associated with the second configuration is updated based on Radio Resource Control (RRC) signaling.

11. A User Equipment (UE), comprising:

a control circuit;

a processor installed in the control circuit; and a memory installed in the control circuit and operatively coupled to the processor, wherein the processor is configured to execute a program code stored in the memory to perform operations, the operations comprising:

receiving a first configuration for configuring a first list of entries associated with time resource allocation for Physical Downlink Shared Channel (PDSCH), wherein each entry in the first list is indicative of one or more time resource allocations;

receiving a second configuration for configuring a repetition number for PDSCH;

receiving a third configuration for configuring a second list of entries associated with time resource allocation for PDSCH, wherein each entry in the second list is indicative of a single time resource allocation;

receiving, if the UE receives a first Downlink Control Information (DCI) indicative of a first entry in the first list, a plurality of PDSCHs based on a plurality of time resource allocations indicated by the first entry, wherein a first repetition number for the plurality of PDSCHs is determined to be one; and receiving, if the UE receives a second DCI indicative of a second entry in the second list, one or more PDSCHs with repetition based on a single time resource allocation indicated by the second entry, wherein a second repetition number for the one or more PDSCHs is determined based on the second configuration.

12. The UE of claim 11, wherein at least one of:

a number of PDSCHs of the plurality of PDSCHs is based on a number of time resource allocations of the plurality of time resource allocations;

the number of PDSCHs of the plurality of PDSCHs is equal to the number of time resource allocations of the plurality of time resource allocations; or the number of PDSCHs of the plurality of PDSCHs is determined to be the number of time resource allocations of the plurality of time resource allocations.

13. The UE of claim 11, wherein a number of PDSCHs of the one or more PDSCHs is equal to the repetition number associated with the second configuration.

14. The UE of claim 11, wherein at least one of:

the first repetition number corresponds to a number of time occasions for each PDSCH of the plurality of PDSCHs; or the second repetition number corresponds to a second number of time occasions for each PDSCH of the one or more PDSCHs.

15. The UE of claim 11, wherein at least one of:

one PDSCH corresponds to one Transport Block (TB);

PDSCHs of the plurality of PDSCHs correspond to different TBs;

PDSCHs of the plurality of PDSCHs are associated with different Hybrid Automatic Repeat Request (HARQ) process numbers;

PDSCHs of the plurality of PDSCHs are associated with time resource allocations of the plurality of time resource allocations indicated by the first DCI;

each PDSCH of the plurality of PDSCHs is associated with a time occasion;

each PDSCH of the plurality of PDSCHs is associated with a slot; or the UE receives the plurality of PDSCHs without applying the repetition number associated with the second configuration.

16. The UE of claim 11, wherein at least one of:

the first list is associated with time resource allocation for downlink transmission;

the second list is associated with time resource allocation for downlink transmission;

each entry in the first list is indicative of at most eight time resource allocations;

time resource allocations of the plurality of time resource allocations correspond to at least one of different starting Orthogonal Frequency Division Multiplexing (OFDM) symbols, different lengths of consecutive OFDM symbols or different mapping types;

time resource allocations of the plurality of time resource allocations correspond to at least one of a same starting OFDM symbol, a same length of consecutive OFDM symbols or a same mapping type; or time resource allocations of the plurality of time resource allocations correspond to at least one of different slots or different time occasions.

17. The UE of claim 11, wherein at least one of:

the second configuration is pdsch-AggregationFactor;

the repetition number associated with the second configuration is associated with configuring at least one of consecutive transmissions, consecutive time occasions or consecutive slots for transmitting a single Transport Block (TB);

the repetition number associated with the second configuration is associated with at least one of slot aggregation or transmission aggregation for a single TB;

the repetition number associated with the second configuration is associated with downlink transmission; or the repetition number associated with the second configuration is updated based on Radio Resource Control (RRC) signaling.

18. A non-transitory computer-readable medium comprising processor-executable instructions that when executed cause performance of operations, the operations comprising:

receiving a first configuration for configuring a first list of entries associated with time resource allocation for Physical Downlink Shared Channel (PDSCH), wherein each entry in the first list is indicative of one or more time resource allocations;

receiving a second configuration for configuring a repetition number for PDSCH;

receiving a third configuration for configuring a second list of entries associated with time resource allocation for PDSCH;

receiving, if a User Equipment (UE) receives a first Downlink Control Information (DCI) indicative of a first entry in the first list, a plurality of PDSCHs based on a plurality of time resource allocations indicated by the first entry; and receiving, if the UE receives a second DCI indicative of a second entry in the second list, one or more PDSCHs with repetition based on a single time resource allocation indicated by the second entry, wherein a second repetition number for the one or more PDSCHs is determined based on the second configuration.

19. The non-transitory computer-readable medium of claim 18, wherein at least one of:

a number of PDSCHs of the plurality of PDSCHs is based on a number of time resource allocations of the plurality of time resource allocations;

the number of PDSCHs of the plurality of PDSCHs is equal to the number of time resource allocations of the plurality of time resource allocations; or the number of PDSCHs of the plurality of PDSCHs is determined to be the number of time resource allocations of the plurality of time resource allocations.

20. The non-transitory computer-readable medium of claim 18, wherein a number of PDSCHs of the one or more PDSCHs is equal to the repetition number associated with the second configuration.

* * * * *